United States Patent
Arai et al.

(10) Patent No.: US 9,593,238 B2
(45) Date of Patent: *Mar. 14, 2017

(54) PREPREG AND CARBON FIBER REINFORCED COMPOSITE MATERIAL

(71) Applicant: TORAY INDUSTRIES, INC., Tokyo (JP)

(72) Inventors: Nobuyuki Arai, Iyo-gun (JP); Tomoko Ichikawa, Iyo-gun (JP); Hiroshi Taiko, Iyo-gun (JP); Makoto Endo, Iyo-gun (JP); Masanobu Kobayashi, Iyo-gun (JP); Jun Misumi, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 85 days.

This patent is subject to a terminal disclaimer.

(21) Appl. No.: 14/429,222

(22) PCT Filed: Jul. 16, 2013

(86) PCT No.: PCT/JP2013/069321
§ 371 (c)(1),
(2) Date: Mar. 18, 2015

(87) PCT Pub. No.: WO2014/050264
PCT Pub. Date: Apr. 3, 2014

(65) Prior Publication Data
US 2015/0252184 A1    Sep. 10, 2015

(30) Foreign Application Priority Data

Sep. 28, 2012  (JP) .................................. 2012-218168
Jan. 30, 2013  (JP) .................................. 2013-016162

(51) Int. Cl.
*C08J 5/24*    (2006.01)
*C08L 63/00*   (2006.01)
(Continued)

(52) U.S. Cl.
CPC ................. *C08L 63/00* (2013.01); *C08J 5/24* (2013.01); *D06M 13/11* (2013.01); *D06M 15/55* (2013.01);
(Continued)

(58) Field of Classification Search
CPC .. D06M 13/11; D06M 2101/40; D06M 15/55; C08L 63/00–63/10;
(Continued)

(56) References Cited

U.S. PATENT DOCUMENTS 4,420,512 A    12/1983  Ogawa et al.
5,462,799 A    10/1995  Kobayashi et al.
(Continued)

FOREIGN PATENT DOCUMENTS

CN    104011288 A    8/2014
CN    104487495 A    4/2015
(Continued)

OTHER PUBLICATIONS

Machine translation of JP 2012-082394 A.*
(Continued)

*Primary Examiner* — Kregg Brooks
(74) *Attorney, Agent, or Firm* — Birch, Stewart, Kolasch & Birch, LLP

(57) ABSTRACT

A prepreg includes; agent-coated carbon fibers coated with a sizing agent; and a thermosetting resin composition impregnated into the sizing agent-coated carbon fibers. The sizing agent includes an aliphatic epoxy compound (A) and an aromatic epoxy compound (B1). The sizing agent-coated carbon fibers are in a shape of woven fabric or braid. The thermosetting resin composition includes a thermosetting resin (D), a thermoplastic resin (F), and a latent hardener (G). The sizing agent-coated carbon fibers have an (a)/(b) ratio in a certain range where (a) is the height of a compo- (Continued)

nent at a binding energy assigned to CHx, C—C, and C=C and (b) is the height of a component at a binding energy assigned to C—O in a $C_{1s}$ core spectrum of the surfaces of the sizing agent-coated carbon fibers analyzed by X-ray photoelectron spectroscopy.

20 Claims, 2 Drawing Sheets

(51) Int. Cl.
  *D06M 13/11* (2006.01)
  *D06M 15/55* (2006.01)
  *D06M 101/40* (2006.01)
  *B29B 15/10* (2006.01)
  *C08K 7/02* (2006.01)

(52) U.S. Cl.
  CPC ........ *C08J 2300/24* (2013.01); *C08J 2363/00* (2013.01); *C08J 2481/06* (2013.01); *C08L 2205/025* (2013.01); *C08L 2205/035* (2013.01); *D06M 2101/40* (2013.01)

(58) Field of Classification Search
  CPC .......... C08L 2205/025; C08L 2205/03; C08L 2205/035; C09D 163/00–163/10; C09J 163/00–163/10
  See application file for complete search history.

(56) References Cited

U.S. PATENT DOCUMENTS

| | | | |
|---|---|---|---|
| 5,587,240 | A | 12/1996 | Kobayashi et al. |
| 5,589,055 | A | 12/1996 | Kobayashi et al. |
| 5,691,055 | A | 11/1997 | Kobayashi et al. |
| 6,894,113 | B2 | 5/2005 | Court et al. |
| 7,084,213 | B2 | 8/2006 | McGrail et al. |
| 7,402,269 | B2 | 7/2008 | Brown |
| 8,276,850 | B2 | 10/2012 | Brown |
| 2006/0240239 | A1 | 10/2006 | McGrail et al. |
| 2009/0162653 | A1* | 6/2009 | Sakata ............... C08J 5/042 428/367 |
| 2011/0009528 | A1* | 1/2011 | Tomioka ............ C08G 59/184 523/428 |
| 2014/0329075 | A1 | 11/2014 | Ichikawa et al. |
| 2015/0210813 | A1 | 7/2015 | Arai et al. |

FOREIGN PATENT DOCUMENTS

| | | |
|---|---|---|
| EP | 0 524 054 B1 | 3/1997 |
| EP | 0 749 987 B1 | 3/1999 |
| EP | 2412742 A1 | 2/2012 |
| JP | 58-41973 A | 3/1983 |
| JP | 59-71479 A | 4/1984 |
| JP | 61-29613 B2 | 7/1986 |
| JP | 62-34251 B2 | 7/1987 |
| JP | 2-307979 A | 12/1990 |
| JP | 7-279040 A | 10/1995 |
| JP | 2002-173873 A | 6/2002 |
| JP | 2002-309487 A | 10/2002 |
| JP | 2003-535181 A | 11/2003 |
| JP | 2004-506789 A | 3/2004 |
| JP | 2004-315572 A | 11/2004 |
| JP | 2005-179826 A | 7/2005 |
| JP | 2005-213687 A | 8/2005 |
| JP | 2005-256226 A | 9/2005 |
| JP | 2006-219078 A | 8/2006 |
| JP | 2008-280624 A | 11/2008 |
| JP | 2009-513438 A | 4/2009 |
| JP | 2009-280669 A | 12/2009 |
| JP | 2010-59300 A | 3/2010 |
| JP | 2012-67190 A | 4/2012 |
| JP | 2012-82394 A | 4/2012 |
| JP | 2012-197414 A | 10/2012 |
| WO | WO 03/010383 A1 | 2/2003 |
| WO | WO 2006/077153 A2 | 7/2006 |
| WO | WO 2013/099707 A1 | 7/2013 |

OTHER PUBLICATIONS

Machine translation of JP 2005-213687 A.*
Chinese Office Action and Search Report, dated May 5, 2016, for Chinese Application No. 201380050660.4.
Extended European Search Report dated Aug. 31, 2015, for European Application No. 13841308.3.
Korean Office Action, dated Jun. 25, 2015, for Korean Application No. 10-2015-7006488.
International Search Report, issued in PCT/JP2013/069321, dated Oct. 29, 2013.
Written Opinion of the International Searching Authority, issued in PCT/JP2013/069321, dated Oct. 29, 2013.

* cited by examiner

PREPREG AND CARBON FIBER REINFORCED COMPOSITE MATERIAL

FIELD

The present invention relates to a prepreg and a carbon fiber reinforced composite material that are suitably used for aircraft members, spacecraft members, automobile members, ship members, sporting goods such as golf shafts and fishing rods, and other general industrial goods. More specifically, the present invention relates to a prepreg and a carbon fiber reinforced composite material that are excellent in adhesion between a matrix resin and carbon fibers and microcrack resistance and can reduce the deterioration of mechanical characteristics such as tensile strength during long-term storage.

BACKGROUND

Fiber reinforced composite materials formed of reinforcing fibers such as glass fibers, carbon fibers, and aramid fibers and a matrix resin are excellent in mechanical characteristics such as strength and elastic modulus despite of being lighter in weight than competing metal or the like and thus are used in various fields including aircraft members, spacecraft members, automobile members, ship members, constructional materials, and sporting goods. For applications necessitating high performance in particular, carbon fibers, which are excellent in specific strength and specific modulus, are often used as the reinforcing fibers. Thermosetting resins such as unsaturated polyester resins, vinyl ester resins, epoxy resins, phenol resins, cyanate ester resins, and bismaleimide resins are often used as the matrix resin, and among them, epoxy resins, which are excellent in adhesion with carbon fibers, are often used. For applications necessitating high performance, fiber reinforced composite materials containing continuous fibers are used, and prepregs obtained by combining reinforcing fibers and uncured thermosetting resins are widely used as intermediate bases for producing structures.

Transport applications such as aircraft and automobiles and large structural member applications such as windmills are applications in which the excellence in the specific strength and specific elastic modulus of carbon fiber reinforced composite materials are effectively exhibited. In these applications, measures against damage or deterioration caused by harsh natural environments such as temperature changes, weather, and lightning strikes have been considered important, and various methods have been considered.

When carbon fiber reinforced composite materials are used in commercial aircraft or the like, for example, they are exposed to largely different temperature environments between the duration of flight in the upper air and the duration of stay on the ground. Specifically, the upper air is in an extremely low temperature environment of about −50° C., whereas the temperature during the stay on the ground reaches a temperature of 70° C. or more in some regions. Every time takeoffs and landings are repeated, aircraft are repeatedly exposed to such temperature rises and drops between the extremely low temperature and the high temperature. When carbon fiber reinforced composite materials are used in such an environment, the coefficient of linear expansion of carbon fibers is extremely small, and given this situation, a large difference in the coefficient of linear expansion is present between the carbon fibers and the matrix resin, and expansion and contraction caused by the temperature changes add distortion, that is, thermal distortion to the matrix resin. This thermal distortion may cause minute cracks (microcracks) of about a few tens of to a few hundreds of micrometers in a resin part of the carbon fiber reinforced composite material. When repeatedly exposed to loads by temperature changes (hereinafter, may be referred to as a heat cycle) in a range of from high temperatures to low temperatures, the microcracks are likely to occur (refer to Non Patent Literature 1, for example). When environmental fatigue is further added to the resin part in the state where the microcracks have occurred, the microcracks grow to larger cracks, and the cracks can decrease the mechanical characteristics of the carbon fiber reinforced composite materials.

Resin cured products obtained by curing thermosetting resins, especially epoxy resin compositions are generally brittler than thermoplastic resins, and when used as a matrix resin for the carbon fiber reinforced composite materials, internal thermal distortion is likely to cause microcracks. In order to impart resistance to the thermal distortion to the carbon fiber reinforced composite materials using the thermosetting resins, that is, to suppress the occurrence of microcracks caused by the load of the heat cycle and to suppress the development of cracks having occurred, increasing the elongation and toughness of thermosetting resins is an important issue.

As a method to increase the toughness of matrix resins, especially epoxy resin cured products, a method is known that adds rubber to epoxy resin compositions. As the method that adds rubber, a method has been disclosed that uses reactive carboxy-terminated butadiene-acrylonitrile copolymer rubber (CTBN) or nitrile rubber, for example (refer to Patent Literatures 1 and 2, for example). However, this method has disadvantages in that a process is undergone in which, after the rubber is once dissolved in the epoxy resin composition, phase separation occurs at curing, the epoxy resin cured product changes in morphology due to differences in the type of the epoxy resin composition or curing conditions, and a desired effect of increasing toughness cannot be obtained and that a rubber component being partially dissolved in an epoxy resin phase of the epoxy resin cured product brings about an increase in the viscosity of the epoxy resin compositions, a decrease in the heat resistance (glass transition temperature (Tg)) of the epoxy resin cured products, and a decrease in elastic modulus, leading to a reduced degree of freedom in designing the setting of molding conditions and amounts. Some of the amounts and the molding conditions can reduce the mechanical characteristics of the carbon fiber reinforced composite materials such as tensile strength and compressive strength. In view of these circumstances, it has been required to achieve both an increase in the toughness of the resin and the maintenance and improvement of the mechanical characteristics of the carbon fiber reinforced composite materials.

With regard to these disadvantages, in order to suppress the increase in the viscosity of the epoxy resin compositions and the decrease in Tg of the epoxy resin cured products, a method is disclosed that achieves both mechanical characteristics such as compressive strength and microcrack resistance in carbon fiber reinforced composite materials obtained by molding by resin transfer molding (RTM) using core-shell polymer particles that are substantially insoluble to the epoxy resin (refer to Patent Literatures 3 and 4, for example). However, these techniques are designed for RTM molding and are hence limited in the viscoelasticity of the resin. In addition, no solution is presented for a case containing wires having electric conductivity such as metal.

In the carbon fiber reinforced composite materials, because the carbon fibers are used in combination with the matrix resins, which generally have high insulation properties, their electric conductivity is lower than that of metallic materials, and when a large current occurs by a lightning strike, the large current cannot be instantly diffused. As a result, structural members containing the carbon fiber reinforced composite materials can have severer damage to the structural members when receiving lightning strikes than cases using conventional metallic materials. In the use for aircraft or the like, lightning strikes can cause ignition of fuel or adversely affect internal electronic devices. In order to solve these disadvantages, a prepreg is known that combines reinforcing fibers and a metallic mesh (refer to Patent Literature 5, for example), and a method is known that manufactures a structure with a carbon fiber reinforced composite material containing a prepreg that combines a carbon fiber woven fabric in which metallic wires are woven and a matrix resin (refer to Patent Literature 6, for example).

In the above-described composite materials that combine the metallic wires, the carbon fibers, and the matrix resin for the purpose of imparting lightning strike resistance, the metal differs in a coefficient of linear expansion from both the carbon fibers and the matrix resin, and it is considered that the influence of the thermal distortion cause by the load of the heat cycle is more complicated than a system containing no metallic wire and that the possibility of the occurrence of microcracks further increases. Microcracks from interfaces of the metallic wires can occur caused by faulty adhesion between the metal and the matrix resin and deterioration of adhesion along with corrosion of the metallic wires.

In an area (hereinafter, may be referred to as a resin rich part) in which the matrix resin within the carbon fiber reinforced composite material concentrates, the difference in the coefficient of linear expansion is remarkable, and microcracks are likely to occur by the load of environmental fatigue (refer to Patent Literature 3 and Non Patent Literature 1). A carbon fiber fabric base has overwhelmingly large crimping (fibers being wavy) compared to a case in which carbon fibers are arranged in one direction because of crossing of the warp and the weft. As a result, carbon fiber reinforced composite materials molded by stacking a fabric base of two or more axes as a prepreg have many resin rich parts. In other words, the carbon fiber reinforced composite materials containing a fabric base are more likely to cause microcracks by the heat cycle than ones using a unidirectional base. When containing metallic wires having different fiber diameters or the like, the resin rich part may further increase, and microcracks are considered to be more likely to occur. In other words, an important object is to increase the resistance of the carbon fiber reinforced composite materials containing bases containing such a fabric base and metallic wires to environments.

For the purpose of improving the adhesion and bindability of carbon fibers, various sizing agents for carbon fibers have been disclosed. Examples of the disclosed sizing agents include a compound having a plurality of epoxy groups of an aliphatic type, an epoxy adduct of a polyalkylene glycol, diglycidyl ether of bisphenol A, a polyalkyleneoxide adduct of bisphenol A, and a polyalkyleneoxide adduct of bisphenol A with an epoxy group added. However, no sizing agent formed of one type of epoxy compound imparts sufficient adhesion or bindability to carbon fibers. A method using two or more types of epoxy compounds in combination according to required functions has been disclosed in recent years.

For example, a disclosed sizing agent includes two or more epoxy compounds each having a defined surface energy (see Patent Literatures 7 to 10). Patent Literature 7 discloses a combination of an aliphatic epoxy compound and an aromatic epoxy compound. Patent Literature 7 discloses that a sizing agent present in the outer layer in a large amount has an effect of shielding another sizing agent present in the inner layer in a large amount from air, and this prevents the epoxy group form undergoing ring-opening by water in air. Patent Literature 7 also discloses that the sizing agent preferably contains the aliphatic epoxy compound and the aromatic epoxy compound in a ratio of 10/90 to 40/60, and the aromatic epoxy compound is preferably contained in a larger amount.

Patent Literatures 9 and 10 disclose sizing agents containing two or more types of epoxy compounds having different surface energy. Patent Literatures 9 and 10, which have an object of improving adhesion with a matrix resin, do not specify the combined use of an aromatic epoxy compound and an aliphatic epoxy compound as a combination of two or more types of epoxy compounds and provide no general exemplification of aliphatic epoxy compounds selected from the viewpoint of adhesion.

Another disclosed sizing agent contains a bisphenol A epoxy compound and an aliphatic polyepoxy resin in a mass ratio of 50/50 to 90/10 (see Patent Literature 11). However, the sizing agent disclosed in Patent Literature 11 also contains the bisphenol A epoxy compound as an aromatic epoxy compound in a large amount.

A disclosed sizing agent specifying the combination of an aromatic epoxy compound and an aliphatic epoxy compound is a combination of a multifunctional aliphatic compound on the surfaces of carbon fiber bundles and an epoxy resin, a condensate of an alkylene oxide adduct with an unsaturated dibasic acid, and an alkylene oxide adduct of a phenol on the surface of the multifunctional aliphatic compound (see Patent Literature 12).

A disclosed combination of two or more epoxy compounds is a combination of an aliphatic epoxy compound and a bisphenol A epoxy compound as an aromatic epoxy compound. The aliphatic epoxy compound is a cyclic aliphatic epoxy compound and/or a long chain aliphatic epoxy compound (see Patent Literature 13).

A combination of epoxy compounds having different properties has also been disclosed. A disclosed combination contains two epoxy compounds that are liquid and solid at 25° C. (see Patent Literature 14). Furthermore, a combination of epoxy resins having different molecular weights and a combination of a monofunctional aliphatic epoxy compound and an epoxy resin have been developed (see Patent Literatures 15 and 16).

However, the sizing agents (for example, Patent Literatures 13 to 16) containing two or more components practically fail to achieve both the adhesion between carbon fibers and a matrix resin and the stability of a prepreg during long-term storage. The reason is considered as follows: The following three requirements are needed to be satisfied in order to simultaneously achieve the high adhesion and the suppression of the reduction in mechanical characteristics of a prepreg during long-term storage, but a conventional combination of any epoxy resins has failed to satisfy these requirements. Of the tree requirements, the first is that an epoxy component having high adhesion is present in the inner side (carbon fiber side) of a sizing layer, and the carbon fibers and the epoxy compound in the sizing interact strongly; the second is that the surface layer (matrix resin side) of the sizing layer has a function of suppressing the reaction between a matrix resin and the epoxy compound that is present in the inner layer and that has high adhesion to carbon fibers; and the third is that the surface layer (matrix resin side) of the sizing agent necessitates a chemical composition capable of strongly interacting with a matrix resin in order to improve the adhesion to the matrix resin.

For example, Patent Literature 7 discloses a sizing agent having an inclined structure for increasing the adhesion between carbon fibers and the sizing agent, but Patent Literature 7 and any other literatures (for example, Patent Literatures 8 to 11) have no idea that the sizing layer surface simultaneously suppresses the reaction between an epoxy compound having high adhesion to carbon fibers and a component in a matrix and achieves high adhesion to the matrix resin.

Patent Literature 12 discloses a sizing agent including an inner layer containing a multifunctional aliphatic compound and an outer layer containing an aromatic epoxy resin and an aromatic reaction product each having low reactivity. The sizing agent should prevent a prepreg stored for a long period of time from suffering change with time, but the surface layer of the sizing agent contains no multifunctional aliphatic compound having high adhesion, and this makes it difficult to achieve high adhesion to a matrix resin.

CITATION LIST

Patent Literature

Patent Literature 1: Japanese Examined Patent Application Publication No. 61-29613
Patent Literature 2: Japanese Examined Patent Application Publication No. 62-34251
Patent Literature 3: Japanese Patent Application Laid-open No. 2010-59300
Patent Literature 4: Japanese Patent Application Laid-open No. 2009-280669
Patent Literature 5: Japanese Patent Application Laid-open No. 2006-219078
Patent Literature 6: Japanese Translation of PCT Application No. 2009-513438
Patent Literature 7: Japanese Patent Application Laid-open No. 2005-179826
Patent Literature 8: Japanese Patent Application Laid-open No. 2005-256226
Patent Literature 9: International Publication WO 03/010383
Patent Literature 10: Japanese Patent Application Laid-open No. 2008-280624
Patent Literature 11: Japanese Patent Application Laid-open No. 2005-213687
Patent Literature 12: Japanese Patent Application Laid-open No. 2002-309487
Patent Literature 13: Japanese Patent Application Laid-open No. 2-307979
Patent Literature 14: Japanese Patent Application Laid-open No. 2002-173873
Patent Literature 15: Japanese Patent Application Laid-open No. 59-71479
Patent Literature 16: Japanese Patent Application Laid-open No. 58-41973

Non Patent Literature

Non Patent Literature 1: Journal of Advanced Materials, 26(4), pp. 48-62 (1995)

SUMMARY

Technical Problem

In view of the above-described disadvantages, it is an object of the present invention to provide a prepreg and a carbon fiber reinforced composite material that are excellent in adhesion between a matrix resin and carbon fibers and long-term storage stability and also in microcrack resistance.

Solution to Problem

To solve the above-described problem and achieve the object, a prepreg according to the present invention includes sizing agent-coated carbon fibers coated with a sizing agent; and a thermosetting resin composition impregnated into the sizing agent-coated carbon fibers, wherein the sizing agent includes an aliphatic epoxy compound (A) and an aromatic compound (B) at least containing an aromatic epoxy compound (B1). The sizing agent-coated carbon fibers have an (a)/(b) ratio of 0.50 to 0.90 where (a) is a height (cps) of a component at a binding energy (284.6 eV) assigned to CHx, C—C, and C=C and (b) is a height (cps) of a component at a binding energy (286.1 eV) assigned to C—O in a $C_{1s}$ core spectrum of a surface of the sizing agent applied onto the carbon fibers analyzed by X-ray photoelectron spectroscopy using $AlK\alpha_{1,2}$ as an X-ray source at a photoelectron takeoff angle of 15°. The sizing agent-coated carbon fibers are in a shape of woven fabric or braid. The thermosetting resin composition at least includes the following components: (D): a thermosetting resin; (F): a thermoplastic resin soluble to the thermosetting resin (D); and (G): a latent hardener.

In the above-described prepreg according to the present invention, the thermosetting resin composition further includes the following component: (E): core-shell rubber particles that include particulate core parts and in which at least part of a surface of each of the core parts is covered with a shell.

In the above-described prepreg according to the present invention, the thermosetting resin composition further includes the following component: (H): at least one block copolymer selected from the group consisting of S-B-M, B-M, and M-B-M (where the blocks represented by S, B, and M are linked through covalent bond or linked through covalent bonds with an intermediate molecule having any chemical structure interposed therebetween, the block M is a homopolymer of methyl methacrylate or a copolymer containing methyl methacrylate in an amount of at least 50% by mass, the block B is incompatible with the block M and has a glass transition temperature of 20° C. or lower, and the block S is incompatible with the blocks B and M and has a glass transition temperature higher than that of the block B).

In the above-described prepreg according to the present invention, such shells of the core-shell rubber particles (E) are formed of a resin having a functional group that is capable of reacting with the latent hardener (G) or a functional group that is capable of reacting with the thermosetting resin (D).

In the above-described prepreg according to the present invention, a resin contained in the shells of the core-shell rubber particles (E) has an epoxy group.

In the above-described prepreg according to the present invention, a volume average particle diameter of the core-shell rubber particles (E) is 50 to 150 nm.

In the above-described prepreg according to the present invention, a mesh or a nonwoven fabric formed of metallic wires is arranged on one side or both sides of a woven fabric or a braid formed of the sizing agent-coated carbon fibers.

In the above-described prepreg according to the present invention, the woven fabric or the braid formed of the sizing agent-coated carbon fibers is woven by arranging metallic wires on side faces of carbon fiber bundles in a longitudinal direction and a transverse direction and interlacing the carbon fiber bundles and/or the metallic wires and carbon fiber bundles and/or metallic wires arranged in a different direction.

In the above-described prepreg according to the present invention, the woven fabric or the braid formed of the sizing agent-coated carbon fibers is a woven fabric or a braid formed of sizing agent-coated carbon fibers of two or more axes.

In the above-described prepreg according to the present invention, the thermoplastic resin (F) is polyethersulfone.

In the above-described prepreg according to the present invention, an average molecular weight of the polyethersulfone is 15,000 to 30,000 g/mol.

In the above-described prepreg according to the present invention, wherein K1c of a thermosetting resin cured product obtained by curing the thermosetting resin composition is 0.65 to 1.5 MPa·m$^{1/2}$.

In the above-described prepreg according to the present invention, an epoxy equivalent of the applied sizing agent is 350 to 550 g/eq.

In the above-described prepreg according to the present invention, the sizing agent at least contains the aliphatic epoxy compound (A) in an amount of 35 to 65% by mass and the aromatic compound (B) in an amount of 35 to 60% by mass relative to a total amount of the sizing agent except a solvent.

In the above-described prepreg according to the present invention, a mass ratio of the aliphatic epoxy compound (A) and the aromatic epoxy compound (B1) is 52/48 to 80/20.

In the above-described prepreg according to the present invention, the aliphatic epoxy compound (A) is a polyether polyepoxy compound having two or more epoxy groups in a molecule and/or a polyol polyepoxy compound having two or more epoxy groups in a molecule.

In the above-described prepreg according to the present invention, the aliphatic epoxy compound (A) is a glycidyl ether epoxy compound obtained by a reaction of epichlorohydrin with a compound selected from ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, glycerol, diglycerol, polyglycerol, trimethylolpropane, pentaerythritol, sorbitol, and arabitol.

In the above-described prepreg according to the present invention, the aromatic epoxy compound (B1) is a bisphenol A epoxy compound or a bisphenol F epoxy compound.

In the above-described prepreg according to the present invention, the sizing agent contains an ester compound (C) having no epoxy group in a molecule in an amount of 2 to 35% by mass relative to the total amount of the sizing agent except the solvent.

In the above-described prepreg according to the present invention, relation (III) is satisfied with (I) and (II) obtained from a ratio (a)/(b):

$$0.50 \leq (I) \leq 0.90 \text{ and } 0.60 < (II)/(I) < 1.0 \quad \text{(III)}$$

where (I) is a value of (a)/(b) of surfaces of the sizing agent-coated carbon fibers before ultrasonication, (II) is the value of (a)/(b) of the surfaces of the sizing agent-coated carbon fibers where an adhesion amount of the sizing agent is reduced to 0.09 to 0.20% by mass by ultrasonic cleaning of the sizing agent-coated carbon fibers in an acetone solvent, and in a $C_{1s}$ core spectrum of the sizing agent-coated carbon fibers analyzed by X-ray photoelectron spectroscopy using an X-ray at 400 eV at a photoelectron takeoff angle of 55°, (a) is a height (cps) of a component at a binding energy (284.6 eV) assigned to CHx, C—C, and C═C, and (b) is a height (cps) of a component at a binding energy (286.1 eV) assigned to C—O.

In the above-described prepreg according to the present invention, the sizing agent is a mixture of a water emulsion liquid containing at least the aromatic epoxy compound (B1) and a composition containing at least the aliphatic epoxy compound (A).

In the above-described prepreg according to the present invention, the sizing agent and the latent hardener (G) are used in a combination that gives an increase in glass transition point when the sizing agent and the latent hardener (G) are stored in an atmosphere of 25° C. and 60% RH for 20 days after being mixed at an amine equivalent/epoxy equivalent rate of 0.9 is 25° C. or lower.

A carbon fiber-reinforced composite material is formed by molding the prepreg according to any one of the above.

Advantageous Effects of Invention

The present invention can provide a prepreg and a carbon fiber reinforced composite material that are excellent in the adhesion between the carbon fibers and the matrix resin, undergo a small change with time during long-term storage, and are excellent in microcrack resistance.

DESCRIPTION OF EMBODIMENTS

Figure 1:
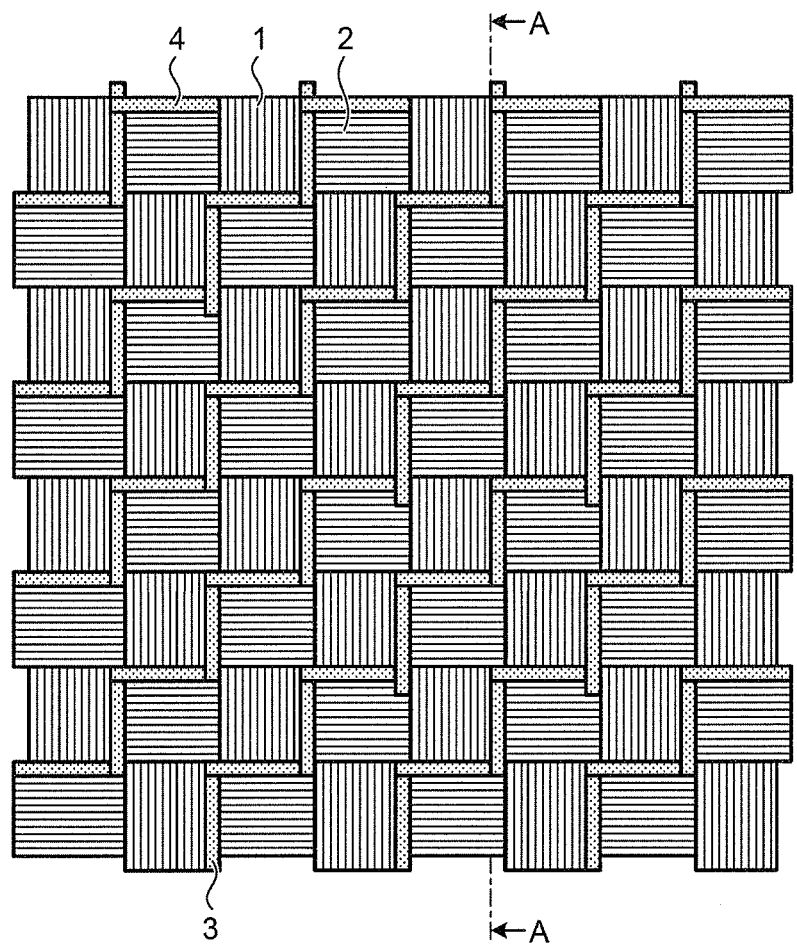
FIG. 1 is a plan view illustrating a plain fabric of carbon fibers in which metal leads are interwoven.

Embodiments for achieving a prepreg and a carbon fiber reinforced composite material of the present invention will now be described in more detail.

The present invention provides a prepreg including sizing agent-coated carbon fibers coated with a sizing agent, and a thermosetting resin composition impregnated into the sizing agent-coated carbon fibers. The sizing agent includes an aliphatic epoxy compound (A) and an aromatic compound (B) at least containing an aromatic epoxy compound (B1). The sizing agent-coated carbon fibers has an (a)/(b) ratio of 0.50 to 0.90 where (a) is the height (cps) of a component at a binding energy (284.6 eV) assigned to CHx, C—C, and C═C, and (b) is the height (cps) of a component at a binding energy (286.1 eV) assigned to C—O in a $C_{1s}$ core spectrum of a surface of the sizing agent applied onto the carbon fibers analyzed by X-ray photoelectron spectroscopy using AlKα$_{1,2}$ as an X-ray source at a photoelectron takeoff angle of 15°. The sizing agent-coated carbon fibers are in a shape of woven fabric or braid. The thermosetting resin composition includes at least the following components: (D): a thermosetting resin; (F): a thermoplastic resin soluble to the thermosetting resin (D); and (G): a latent hardener.

First, the sizing agent used in the prepreg of the present invention will be described. The sizing agent of the present invention includes an aliphatic epoxy compound (A) and an aromatic compound (B) containing at least an aromatic epoxy compound (B1).

On the basis of findings by the inventors of the present invention, a sizing agent within the range has excellent interfacial adhesion between carbon fibers and a thermosetting resin as a matrix resin, and the sizing agent-coated carbon fibers are used to prepare a prepreg, which undergoes a small change with time during long-term storage. The sizing agent is thus preferably used for carbon fibers for a composite material.

When the sizing agent of the present invention is applied to carbon fibers, the inner side (carbon fiber side) of the sizing layer contains the aliphatic epoxy compound (A) in a larger amount, and thus the carbon fibers and the aliphatic epoxy compound (A) strongly interact to increase the adhesion. The surface layer (matrix resin side) of the sizing layer contains the aromatic compound (B) containing the aromatic epoxy compound (B1) in a larger amount, and this prevents the aliphatic epoxy compound (A) in the inner layer from reacting with a matrix resin. In addition, the surface layer (matrix resin side) of the sizing agent contains the aromatic epoxy compound (B1) containing a certain number of epoxy groups and the aliphatic epoxy compound (A) containing a certain number of epoxy groups in a certain ratio as a chemical composition capable of achieving strong interaction with the matrix resin, and this also improves the adhesion to the matrix resin.

A sizing agent containing the aromatic epoxy compound (B1) alone but containing no aliphatic epoxy compound (A) advantageously has low reactivity with a matrix resin, and a prepreg to be prepared undergoes a small change in mechanical characteristics during long-term storage. Such a sizing agent also has an advantage of capable of forming a rigid interface layer. However, the aromatic epoxy compound (B1), which is a rigid compound, is ascertained to be slightly inferior in the adhesion between carbon fibers and a matrix resin to the aliphatic epoxy compound (A).

When coated with a sizing agent containing the aliphatic epoxy compound (A) alone, the carbon fibers are ascertained to have high adhesion to a matrix resin. Although not certain, the mechanism is supposed as follows: the aliphatic epoxy compound (A) has a flexible skeleton and a structure having a high degree of freedom; and thus the aliphatic epoxy compound (A) can form a strong interaction with functional groups such as a carboxy group and a hydroxy group on the surfaces of carbon fibers. However, the aliphatic epoxy compound (A) exhibits high adhesion due to the interaction with the carbon fiber surface but has high reactivity with a compound having a functional group, such as a curing agent in the matrix resin. If the aliphatic epoxy compound (A) is stored in a prepreg state for a long period of time, it is ascertained that the interaction between the matrix resin and the sizing agent changes the structure of an interface layer, and this unfortunately reduces mechanical characteristics of a carbon fiber reinforced composite material obtained from the prepreg.

In the present invention, when the aliphatic epoxy compound (A) is mixed with the aromatic compound (B), the following phenomenon occurs: the aliphatic epoxy compound (A) having higher polarity is likely to be present in the carbon fiber side in a larger amount, and the aromatic compound (B) having lower polarity is likely to be present in a larger amount in the outermost layer of the sizing layer opposite to the carbon fibers. As a result of this inclined structure of the sizing layer, the aliphatic epoxy compound (A) present near the carbon fibers has a strong interaction with the carbon fibers and thus can increase the adhesion between the carbon fibers and a matrix resin. In addition, when the sizing agent-coated carbon fibers are processed into a prepreg, the aromatic compound (B) present in the outer layer in a large amount plays a roll of blocking the aliphatic epoxy compound (A) from a matrix resin. This prevents the aliphatic epoxy compound (A) from reacting with a component having high reactivity in the matrix resin, thus achieving stability during long-term storage. If the aliphatic epoxy compound (A) is almost completely covered with the aromatic compound (B), the interaction between the sizing agent and a matrix resin is reduced to lower the adhesion, and thus the ratio of the aliphatic epoxy compound (A) and the aromatic compound (B) present on the surface of the sizing agent is important.

The sizing agent of the present invention preferably at least contains the aliphatic epoxy compound (A) in an amount of 35 to 65% by mass and the aromatic compound (B) in an amount of 35 to 60% by mass relative to the total amount of the sizing agent except solvents. If 35% by mass or more of the aliphatic epoxy compound (A) is contained relative to the total amount of the sizing agent except solvents, the adhesion between the carbon fibers and a matrix resin is improved. If 65% by mass or less of the aliphatic epoxy compound (A) is contained, even when a prepreg is stored in a long period of time, a carbon fiber reinforced composite material subsequently produced obtains good mechanical characteristics. The amount of the aliphatic epoxy compound (A) is more preferably 38% by mass or more and even more preferably 40% by mass or more. The amount of the aliphatic epoxy compound (A) is more preferably 60% by mass or less and even more preferably 55% by mass or less.

If the sizing agent of the present invention contains 35% by mass or more of the aromatic compound (B) relative to the total amount of the sizing agent except solvents, the outer layer of the sizing agent can maintain the aromatic compound (B) at a high composition, and this can reduce the deterioration of mechanical characteristics of a prepreg during long-term storage due to the reaction of the aliphatic epoxy compound (A) having high reactivity with a reactive compound in the matrix resin. If 60% by mass or less of the aromatic compound (B), the sizing agent exhibits an inclined structure in the sizing agent and thus can maintain the adhesion between the carbon fibers and the matrix resin. The amount of the aromatic compound (B) is more preferably 37% by mass or more and even more preferably 39% by mass or more. The amount of the aromatic compound (B) is more preferably 55% by mass or less and even more preferably 45% by mass or less.

The sizing agent in the present invention includes, as epoxy components, an aromatic epoxy compound (B1) as the aromatic compound (B) in addition to the aliphatic epoxy compound (A). The mass ratio (A)/(B1) of the aliphatic epoxy compound (A) and the aromatic epoxy compound (B1) is preferably 52/48 to 80/20. A sizing agent having a ratio (A)/(B1) of 52/48 or more increases the ratio of the aliphatic epoxy compound (A) present on the surfaces of carbon fibers, and this improves the adhesion between the carbon fibers and a matrix resin. As a result, a carbon fiber reinforced composite material to be produced obtains higher mechanical characteristics such as tensile strength. A sizing agent having a ratio (A)/(B1) of 80/20 or less reduces the amount of the aliphatic epoxy compound (A) having high reactivity present on the surfaces of carbon fibers, and this can suppress the reactivity with a matrix resin. Such a ratio is thus preferred. The mass ratio (A)/(B1) is more preferably 55/45 or more and even more preferably 60/40 or more. The mass ratio (A)/(B1) is more preferably 75/35 or less and even more preferably 73/37 or less.

The aliphatic epoxy compound (A) in the present invention is an epoxy compound containing no aromatic ring. The epoxy compound, which has a flexible skeleton with a high degree of freedom, can have strong interaction with carbon fibers. As a result, the epoxy compound can improve the adhesion between carbon fibers coated with the sizing agent and a matrix resin.

In the present invention, the aliphatic epoxy compound (A) has one or more epoxy groups in the molecule. This allows a strong binding to be formed between carbon fibers and the epoxy group in the sizing agent. The number of the epoxy groups in the molecule is preferably two or more and more preferably three or more. In the aliphatic epoxy compound (A) that is an epoxy compound having two or more epoxy groups in the molecule, even when one epoxy group forms a covalent bond with an oxygen-containing functional group on the surfaces of carbon fibers, remaining epoxy groups can form a covalent bond or a hydrogen bond with a matrix resin, and this can further improve the adhesion between the carbon fibers and the matrix resin. Although the upper limit of the number of epoxy groups is not particular limited, a compound having ten epoxy groups is sufficient for the adhesion.

In the present invention, the aliphatic epoxy compound (A) is preferably an epoxy compound having two or more types of functional groups, where the number of the functional groups is three or more. The aliphatic epoxy compound (A) is more preferably an epoxy compound having two or more types of functional groups, where the number of the functional groups is four or more. The functional group contained in the epoxy compound is, in addition to the epoxy group, preferably selected from a hydroxy group, an amido group, an imido group, a urethane group, a urea group, a sulfonyl group, or a sulfo group. In the aliphatic epoxy compound (A) that is an epoxy compound having three or more epoxy groups or other functional groups in the molecule, even when one epoxy group forms a covalent bond with an oxygen-containing functional group on the surfaces of carbon fibers, two or more remaining epoxy groups or other functional groups can form a covalent bond or a hydrogen bond with a matrix resin. This further improves the adhesion between the carbon fibers and the matrix resin. Although the upper limit of the number of functional groups including epoxy groups is not particular limited, a compound having ten functional groups is sufficient for the adhesion.

In the present invention, the aliphatic epoxy compound (A) preferably has an epoxy equivalent of less than 360 g/eq., more preferably less than 270 g/eq., and even more preferably less than 180 g/eq. An aliphatic epoxy compound (A) having an epoxy equivalent of less than 360 g/eq. forms an interaction with carbon fibers at high-density and further improves the adhesion between the carbon fibers and a matrix resin. Although the lower limit of the epoxy equivalent is not particularly limited, an aliphatic epoxy compound having an epoxy equivalent of 90 g/eq. or more is sufficient for the adhesion.

In the present invention, specific examples of the aliphatic epoxy compound (A) include glycidyl ether epoxy compounds derived from polyols, glycidylamine epoxy compounds derived from amines having a plurality of active hydrogens, glycidyl ester epoxy compounds derived from polycarboxylic acids, and epoxy compounds obtained by oxidation of compounds having a plurality of double bonds in the molecule.

Examples of the glycidyl ether epoxy compound include glycidyl ether epoxy compounds obtained by reaction of polyols with epichlorohydrin. The glycidyl ether epoxy compound is exemplified by a glycidyl ether epoxy compound obtained by reaction of epichlorohydrin with a polyol selected from ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, hydrogenated bisphenol A, hydrogenated bisphenol F, glycerol, diglycerol, polyglycerol, trimethylolpropane, pentaerythritol, sorbitol, and arabitol. The glycidyl ether epoxy compound is also exemplified by glycidyl ether epoxy compounds having a dicyclopentadiene skeleton.

Examples of the glycidylamine epoxy compound include 1,3-bis(aminomethyl)cyclohexane.

Examples of the glycidyl ester epoxy compound include glycidyl ester epoxy compounds obtained by reaction of dimer acids with epichlorohydrin.

Examples of the epoxy compound obtained by oxidation of a compound having a plurality of double bonds in the molecule include epoxy compounds having an epoxycyclohexane ring in the molecule. The epoxy compound is specifically exemplified by epoxidized soybean oil.

In addition to these epoxy compounds, the aliphatic epoxy compound (A) used in the present invention is exemplified by epoxy compounds such as triglycidyl isocyanurate.

The aliphatic epoxy compound (A) of the present invention preferably has one or more epoxy groups and at least one or more functional groups selected from a hydroxy group, an amido group, an imido group, a urethane group, a urea group, a sulfonyl group, a carboxy group, an ester group, and a sulfo group. Specific examples of the functional group of the aliphatic epoxy compound (A) include compounds having an epoxy group and a hydroxy group, compounds having an epoxy group and an amido group, compounds having an epoxy group and an imido group, compounds having an epoxy group and a urethane group, compounds having an epoxy group and a urea group, compounds having an epoxy group and a sulfonyl group, and compounds having an epoxy group and a sulfo group.

Examples of the aliphatic epoxy compound (A) having a hydroxy group in addition to an epoxy group include sorbitol polyglycidyl ethers and glycerol polyglycidyl ethers and specifically include Denacol (registered trademark) EX-611, EX-612, EX-614, EX-614B, EX-622, EX-512, EX-521, EX-421, EX-313, EX-314, and EX-321 (manufactured by Nagase ChemteX Corporation).

Examples of the aliphatic epoxy compound (A) having an amido group in addition to an epoxy group include amide-modified epoxy compounds. The amide-modified epoxy compound can be obtained by reaction of a carboxy group of an aliphatic dicarboxylic acid amide with an epoxy group of an epoxy compound having two or more epoxy groups.

Examples of the aliphatic epoxy compound (A) having an urethane group in addition to an epoxy group include urethane-modified epoxy compounds and specifically include Adeka Resin (registered trademark) EPU-78-13S, EPU-6, EPU-11, EPU-15, EPU-16A, EPU-16N, EPU-17T-6, EPU-1348, and EPU-1395 (manufactured by ADEKA). In addition, the compound can be prepared by causing the terminal hydroxy group of a polyethylene oxide monoalkyl ether to react with a polyvalent isocyanate in an amount equivalent to that of the hydroxy group and then causing the isocyanate residue of the obtained reaction product to react with a hydroxy group of a polyvalent epoxy compound. Examples of the polyvalent isocyanate used here include hexamethylene diisocyanate, isophorone diisocyanate, and norbornane diisocyanate.

Examples of the aliphatic epoxy compound (A) having a urea group in addition to an epoxy group include urea-modified epoxy compounds. The urea-modified epoxy compound can be prepared by causing a carboxy group of an aliphatic dicarboxylic acid urea to react with an epoxy group of an epoxy compound having two or more epoxy groups.

Among the compounds described above, from the viewpoint of high adhesion, the aliphatic epoxy compound (A) used in the present invention is more preferably a glycidyl ether epoxy compound obtained by reaction of epichlorohydrin with a compound selected from ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, glycerol, diglycerol, polyglycerol, trimethylolpropane, pentaerythritol, sorbitol, and arabitol.

Among them, the aliphatic epoxy compound (A) in the present invention is preferably a polyether polyepoxy compound and/or a polyol polyepoxy compound having two or more epoxy groups in the molecule from the viewpoint of high adhesion.

In the present invention, the aliphatic epoxy compound (A) is more preferably polyglycerol polyglycidyl ether.

In the present invention, the aromatic compound (B) has one or more aromatic rings in the molecule. The aromatic ring may be an aromatic hydrocarbon ring containing carbons alone or may be a heteroaromatic ring containing a hetero atom including nitrogen or oxygen, such as furan, thiophene, pyrrole, and imidazole. The aromatic ring may also be polycyclic aromatic rings such as naphthalene and anthracene. In a carbon fiber reinforced composite material including carbon fibers coated with a sizing agent and a matrix resin, what is called an interface layer near the carbon fibers is affected by the carbon fibers or the sizing agent and thus may have different characteristics from those of the matrix resin. When the sizing agent contains the aromatic compound (B) having one or more aromatic rings, a rigid interface layer is formed to improve the stress transmission capacity between the carbon fibers and the matrix resin, and this improves mechanical characteristics such as 0° tensile strength of a carbon fiber reinforced composite material. Due to the hydrophobicity of the aromatic ring, the aromatic compound (B) has a lower interaction with carbon fibers than that of the aliphatic epoxy compound (A). As a result of the interaction with carbon fibers, the carbon fiber side contains the aliphatic epoxy compound (A) in a larger amount, and the outer layer of the sizing layer contains the aromatic compound (B) in a larger amount. This is preferred because the aromatic compound (B) prevents the aliphatic epoxy compound (A) from reacting with a matrix resin, and this can suppress a change during long-term storage of a prepreg produced by using carbon fibers coated with the sizing agent of the present invention. By selecting an aromatic compound (B) having two or more aromatic rings, long-term storage stability of a prepreg to be produced can be further improved. Examples of the upper limit of the number of aromatic rings include, but are not limited to, ten, which is sufficient for mechanical characteristics and suppression of the reaction with a matrix resin.

In the present invention, the aromatic compound (B) may have one or more types of functional groups in the molecule. A single type of aromatic compound (B) may be used, or a plurality of compounds may be used in combination. The aromatic compound (B) at least contains an aromatic epoxy compound (B1) having one or more epoxy groups and one or more aromatic rings in the molecule. The functional group except the epoxy group is preferably selected from a hydroxy group, an amido group, an imido group, a urethane group, a urea group, a sulfonyl group, a carboxy group, an ester group, and a sulfo group, and two or more types of functional groups may be contained in one molecule. The aromatic compound (B) preferably contains, in addition to the aromatic epoxy compound (B1), an aromatic ester compound and an aromatic urethane compound because such a compound is stable and improves high-order processability.

In the present invention, the aromatic epoxy compound (B1) preferably has two or more epoxy groups and more preferably three or more epoxy groups. The aromatic epoxy compound (B1) preferably has ten or less epoxy groups.

In the present invention, the aromatic epoxy compound (B1) is preferably an epoxy compound having two or more types of functional groups, where the number of the functional groups is three or more. The aromatic epoxy compound (B1) is more preferably an epoxy compound having two or more types of functional groups, where the number of the functional groups is four or more. The functional group of the aromatic epoxy compound (B1) is preferably, in addition to the epoxy group, a functional group selected from a hydroxy group, an amido group, an imido group, a urethane group, a urea group, a sulfonyl group, and a sulfo group. In the aromatic epoxy compound (B1) that is an epoxy compound having three or more epoxy groups, or having an epoxy group and two or more other functional groups, or having two epoxy groups and another functional group, in the molecule, even when one epoxy group forms a covalent bond with an oxygen-containing functional group on the surfaces of carbon fibers, two or more remaining epoxy groups or other functional groups can form a covalent bond or a hydrogen bond with a matrix resin. This further improves the adhesion between the carbon fibers and the matrix resin. Although the upper limit of the number of functional groups including epoxy groups is not particular limited, a compound having ten functional groups is sufficient for the adhesion.

In the present invention, the aromatic epoxy compound (B1) preferably has an epoxy equivalent of less than 360 g/eq., more preferably less than 270 g/eq., and even more preferably less than 180 g/eq. An aromatic epoxy compound (B1) having an epoxy equivalent of less than 360 g/eq. forms a covalent bond at high density and further improves the adhesion between carbon fibers and a matrix resin. Although the lower limit of the epoxy equivalent is not particularly limited, an aromatic epoxy compound having an epoxy equivalent of 90 g/eq. or more is sufficient for the adhesion.

In the present invention, specific examples of the aromatic epoxy compound (B1) include glycidyl ether epoxy compounds derived from aromatic polyols, glycidylamine epoxy compounds derived from aromatic amines having a plurality of active hydrogens, glycidyl ester epoxy compounds derived from aromatic polycarboxylic acids, and epoxy compounds obtained by oxidation of aromatic compounds (B) having a plurality of double bonds in the molecule.

The glycidyl ether epoxy compound is exemplified by a glycidyl ether epoxy compound obtained by reaction of epichlorohydrin with a compound selected from bisphenol A, bisphenol F, bisphenol AD, bisphenol S, tetrabromobisphenol A, phenol novolac, cresol novolac, hydroquinone, resorcinol, 4,4'-dihydroxy-3,3',5,5'-tetramethylbiphenyl, 1,6-dihydroxynaphthalene, 9,9-bis(4-hydroxyphenyl)fluorene, tris(p-hydroxyphenyl)methane, and tetrakis(p-hydroxyphenyl)ethane. The glycidyl ether epoxy compound is also exemplified by a glycidyl ether epoxy compound having a biphenylaralkyl skeleton.

Examples of the glycidylamine epoxy compound include N,N-diglycidylaniline, N,N-diglycidyl-o-toluidine, and glycidyl amine epoxy compounds obtained by reaction of epichlorohydrin with a compound selected from m-xylenediamine, m-phenylenediamine, 4,4'-diaminodiphenylmethane, and 9,9-bis(4-aminophenyl)fluorene.

The glycidylamine epoxy compound is also exemplified by an epoxy compound obtained by reaction of epichlorohydrin with both a hydroxy group and an amino group of an aminophenol such as m-aminophenol, p=aminophenol, and 4-amino-3-methylphenol.

Examples of the glycidyl ester epoxy compound include glycidyl ester epoxy compounds obtained by reaction of epichlorohydrin with phthalic acid, terephthalic acid, and hexahydrophthalic acid.

Examples of the aromatic epoxy compound (B1) used in the present invention include, in addition to these epoxy compounds, epoxy compounds synthesized from the epoxy compound exemplified above as a raw material, and the epoxy compound is exemplified by an epoxy compound synthesized by an oxazolidone ring formation reaction of bisphenol A diglycidyl ether and tolylene diisocyanate.

In the present invention, the aromatic epoxy compound (B1) preferably has, in addition to one or more epoxy groups, at least one or more functional groups selected from a hydroxy group, an amido group, an imido group, a urethane group, a urea group, a sulfonyl group, a carboxy group, an ester group, and a sulfo group. Examples of the compound include compounds having an epoxy group and a hydroxy group, compounds having an epoxy group and an amido group, compounds having an epoxy group and an imido group, compounds having an epoxy group and a urethane group, compounds having an epoxy group and a urea group, compounds having an epoxy group and a sulfonyl group, and compounds having an epoxy group and a sulfo group.

Examples of the aromatic epoxy compound (B1) having an amido group in addition to an epoxy group include glycidylbenzamide and amide-modified epoxy compounds. The amide-modified epoxy compound can be obtained by reaction of a carboxy group of a dicarboxylic amide containing an aromatic ring with an epoxy group of an epoxy compound having two or more epoxy groups.

Examples of the aromatic epoxy compound (B1) having an imido group in addition to an epoxy group include glycidylphthalimide. Specific examples of the compound include Denacol (registered trademark) EX-731 (manufactured by Nagase ChemteX Corporation).

The aromatic epoxy compound (B1) having a urethane group in addition to an epoxy group can be prepared by causing the terminal hydroxy group of a polyethylene oxide monoalkyl ether to react with a polyvalent isocyanate having an aromatic ring in an amount equivalent to that of the hydroxy group and then reacting the isocyanate residue of the obtained reaction product with a hydroxy group of a polyvalent epoxy compound. Examples of the polyvalent isocyanate used here include 2,4-tolylene diisocyanate, m-phenylene diisocyanate, p-phenylene diisocyanate, diphenylmethane diisocyanate, triphenylmethane triisocyanate, and biphenyl-2,4,4'-triisocyanate.

Examples of the aromatic epoxy compound (B1) having a urea group in addition to an epoxy group include urea-modified epoxy compounds. The urea-modified epoxy compound can be prepared by causing a carboxy group of a dicarboxylic acid urea to react with an epoxy group of an aromatic ring-containing epoxy compound having two or more epoxy groups.

Examples of the aromatic epoxy compound (B1) having a sulfonyl group in addition to an epoxy group include bisphenol S epoxy.

Examples of the aromatic epoxy compound (B1) having a sulfo group in addition to an epoxy group include glycidyl p-toluenesulfonate and glycidyl 3-nitrobenzenesulfonate.

In the present invention, the aromatic epoxy compound (B1) is preferably any of a phenol novolac epoxy compound, a cresol novolac epoxy compound, and tetraglycidyl-diaminodiphenylmethane. These epoxy compounds have a large number of epoxy groups, a small epoxy equivalent, and two or more aromatic rings, thus improve the adhesion between carbon fibers and a matrix resin, and also improve the mechanical characteristics such as 0° tensile strength of a carbon fiber reinforced composite material. The aromatic epoxy compound (B1) is more preferably a phenol novolac epoxy compound and a cresol novolac epoxy compound.

In the present invention, the aromatic epoxy compound (B1) is preferably a phenol novolac epoxy compound, a cresol novolac epoxy compound, tetraglycidyldiaminodiphenylmethane, a bisphenol A epoxy compound, or a bisphenol F epoxy compound from the viewpoint of the stability of a prepreg during long-term storage and adhesion between carbon fibers and a matrix resin, and is more preferably a bisphenol A epoxy compound or a bisphenol F epoxy compound.

The sizing agent used in the present invention may further include one or more components in addition to the aliphatic epoxy compound (A) and the aromatic epoxy compound (B1) as the aromatic compound (B). If including an adhesion promoting component that improves the adhesion between carbon fibers and the sizing agent or including a material that imparts bindability or flexibility to sizing agent-coated carbon fibers, the sizing agent can increase handleability, abrasion resistance, and fuzz resistance and can improve impregnation properties of a matrix resin. In the present invention, in order to improve the long-term storage stability of a prepreg, the sizing agent may contain additional compounds except the compounds (A) and (B1). The sizing agent may contain auxiliary components such as a dispersant and a surfactant in order to stabilize the sizing agent during long-term storage.

The sizing agent used in the present invention may include, in addition to the aliphatic epoxy compound (A) and the aromatic epoxy compound (B1), an ester compound (C) having no epoxy group in the molecule. The sizing agent of the present invention can contain the ester compound (C) in an amount of 2 to 35% by mass relative to the total amount of the sizing agent except solvents. The amount is more preferably 15 to 30% by mass. If including the ester compound (C), the sizing agent can improve the bindability and the handling properties and can reduce the deterioration of mechanical characteristics of a prepreg during long-term storage due to a reaction of a matrix resin with the sizing agent.

The ester compound (C) may be an aliphatic ester compound having no aromatic ring or may be an aromatic ester compound having one or more aromatic rings in the molecule. When an aromatic ester compound (C1) is used as the ester compound (C), the aromatic ester compound (C1) is included in both the ester compound (C) having no epoxy compound in the molecule and the aromatic compound (B) in the present invention. In such a case, the aromatic compound (B) is not composed of the aromatic ester compound (C1) alone, but the aromatic compound (B) includes the aromatic epoxy compound (B1) and the aromatic ester compound (C1). When the aromatic ester compound (C1) is used as the ester compound (C), the sizing agent-coated carbon fibers obtain higher handling properties, and the aromatic ester compound (C1), which has a small interaction with carbon fibers, is present in the outer layer of a matrix resin, and this improves the suppressive effect of deterioration of mechanical characteristics of a prepreg during long-term storage. The aromatic ester compound (C1) may have, in addition to the ester group, any functional groups except the epoxy group, such as a hydroxy group, an amido group, an imido group, a urethane group, a urea group, a sulfonyl group, a carboxy group, and a sulfo group. Specifically, the aromatic ester compound (C1) preferably used is an ester compound that is a condensate of an unsaturated dibasic acid and an alkylene oxide adduct of a bisphenol. The unsaturated dibasic acid includes lower alkyl esters of acid anhydrides, and fumaric acid, maleic acid, citraconic acid, and itaconic acid are preferably used, for example. Preferably used alkylene oxide adducts of bisphenols are an ethylene oxide adduct of bisphenol, a propylene oxide adduct of bisphenol, and a butylene oxide adduct of bisphenol, for example. Among the condensates, condensates of fumaric acid or maleic acid with an ethylene oxide adduct or/and a propylene oxide adduct of bisphenol A are preferably used.

The addition method of an alkylene oxide to a bisphenol is not limited, and a known method can be employed. The unsaturated dibasic acid may partly contain a saturated dibasic acid or a small amount of a monobasic acid, as necessary, as long as adhesion and other characteristics are not impaired. The alkylene oxide adduct of a bisphenol may contain, for example, a common glycol, a common polyether glycol, a small amount of a polyhydric alcohol, and a small amount of a monovalent alcohol as long as adhesion and other characteristics are not impaired. The alkylene oxide adduct of a bisphenol with the unsaturated dibasic acid may be condensed by a known method.

In order to increase the adhesion between carbon fibers and an epoxy compound in the sizing agent, the sizing agent of the present invention can contain at least one compound selected from tertiary amine compounds and/or tertiary amine salts, quaternary ammonium salts having a cation site, and quaternary phosphonium salts and/or phosphine compounds as a component accelerating the adhesion. The sizing agent of the present invention preferably contains the compound in an amount of 0.1 to 25% by mass relative to the total amount of the sizing agent except solvents. The amount is more preferably 2 to 8% by mass.

When the sizing agent containing the aliphatic epoxy compound (A) and the aromatic epoxy compound (B1) and further containing at least one compound selected from tertiary amine compounds and/or tertiary amine salts, quaternary ammonium salts having a cation site, and quaternary phosphonium salts and/or phosphine compounds as the adhesion promoting component is applied to carbon fibers and subjected to heat treatment under particular conditions, the adhesion to the carbon fibers is further improved. Although not certain, the mechanism is supposed as follows: First, the compound reacts with an oxygen-containing functional group such as a carboxy group and a hydroxy group of carbon fibers used in the present invention and abstracts a hydrogen ion contained in the functional group to form an anion; and then the anionic functional group undergoes a nucleophilic reaction with an epoxy group contained in the aliphatic epoxy compound (A) or the aromatic epoxy compound (B1). This is supposed to generate a strong binding between the carbon fibers used in the present invention and the epoxy group in the sizing agent, thus improving the adhesion.

Specific examples of the adhesion promoting component preferably include N-benzylimidazole, 1,8-diazabicyclo[5,4,0]-7-undecene (DBU) and salts thereof, and 1,5-diazabicyclo[4,3,0]-5-nonene (DBN) and salts thereof. In particular, 1,8-diazabicyclo[5,4,0]-7-undecene (DBU) and salts thereof and 1,5-diazabicyclo[4,3,0]-5-nonene (DBN) and salts thereof are preferred.

Specific examples of the DBU salt include a phenolate of DBU (U-CAT SA1, manufactured by San-Apro Ltd.), an octanoate of DBU (U-CAT SA102, manufactured by San-Apro Ltd.), a p-toluenesulfonate of DBU (U-CAT SA506, manufactured by San-Apro Ltd.), a formate of DBU (U-CAT SA603, manufactured by San-Apro Ltd.), an orthophthalate of DBU (U-CAT SA810), and a phenol novolac resin salt of DBU (U-CAT SA810, SA831, SA841, SA851, and 881, manufactured by San-Apro Ltd.).

In the present invention, the adhesion promoting component to be added to the sizing agent is preferably tributylamine, N,N-dimethylbenzylamine, diisopropylethylamine, triisopropylamine, dibutylethanolamine, diethylethanolamine, triisopropanolamine, triethanolamine, and N,N-diisopropylethylamine and particularly preferably triisopropylamine, dibutylethanolamine, diethylethanolamine, triisopropanolamine, and diisopropylethylamine.

In addition to the compounds above, examples of the additive such as a surfactant include nonionic surfactants including polyalkylene oxides such as polyethylene oxide and polypropylene oxide; adducts of higher alcohols, polyhydric alcohols, alkylphenols, styrenated phenols, and other adduct compounds with polyalkylene oxides such as polyethylene oxide and polypropylene oxide; and block copolymers of ethylene oxide and propylene oxide. A polyester resin, an unsaturated polyester compound, and other additives may be appropriately added to an extent not impairing the effect of the present invention.

Next, the carbon fibers used in the present invention will be described. Examples of the carbon fibers used in the present invention include polyacrylonitrile (PAN) carbon fibers, rayon carbon fibers, and pitch carbon fibers. Among them, the PAN carbon fibers are preferably used due to excellent balance between strength and elastic modulus.

The carbon fibers of the present invention give carbon fiber bundles that preferably have a strand tensile strength of 3.5 GPa or more, more preferably 4 GPa or more, and even more preferably 5 GPa or more. The obtained carbon fiber bundles preferably have a strand elastic modulus of 220 GPa or more, more preferably 240 GPa or more, and even more preferably 280 GPa or more. The strand tensile strength and the strand elastic modulus within the above ranges achieve a carbon fiber reinforced composite material with excellent impact resistance and having high rigidity and mechanical characteristics.

In the present invention, the strand tensile strength and the elastic modulus of carbon fiber bundles can be determined by the test method of resin-impregnated strand described in JIS-R-7608 (2004) in accordance with the procedure below. The resin formulation is "Celloxide (registered trademark)" 2021P (manufactured by Daicel Chemical Industries, Ltd.)/ boron trifluoride monoethylamine (manufactured by Tokyo Chemical Industry Co., Ltd.)/acetone=100/3/4 (parts by mass), and the curing conditions are at normal pressure at 130° C. for 30 minutes. Ten strands of carbon fiber bundles are tested, and mean values are calculated as the strand tensile strength and the strand elastic modulus.

The carbon fibers used in the present invention preferably have a surface roughness (Ra) of 6.0 to 100 nm. The surface roughness (Ra) is more preferably 15 to 80 nm and even more preferably 30 to 60 nm. Carbon fibers having a surface roughness (Ra) of 6.0 to 60 nm have a surface with a highly active edge part, which increases the reactivity with an epoxy group and other functional groups of the sizing agent described above. This can improve the interfacial adhesion, and such carbon fibers are thus preferred. Carbon fibers having a surface roughness (Ra) of 6.0 to 100 nm have an uneven surface, which can improve the interfacial adhesion due to an anchor effect of the sizing agent. Such carbon fibers are thus preferred.

In order to control the surface roughness (Ra) of the carbon fibers within the above range, wet spinning is preferably used as a spinning method described below. The surface roughness (Ra) of the carbon fibers can also be controlled by combining the type (for example, an aqueous solution of an organic solvent such as dimethyl sulfoxide, dimethylformamide, and dimethylacetamide or an aqueous solution of an inorganic compound such as zinc chloride and sodium thiocyanate) and concentration of a coagulation liquid and the temperature of the coagulation liquid, a take-up speed and a draw ratio of coagulated yarn in a spinning process, and respective draw ratios in flameproofing, pre-carbonization, and carbonization processes. Furthermore, combining electrolytic treatment can control the carbon fibers to predetermined surface roughness (Ra).

The surface roughness (Ra) of carbon fibers can be determined by using an atomic force microscope (AFM). For example, carbon fibers are cut into pieces having a length of several millimeters; then the fiber pieces are fixed onto a substrate (silicon wafer) with a silver paste; and a three-dimensional surface shape image of the central part of each single fiber is observed under an atomic force microscope (AFM). Usable examples of the atomic force microscope include NanoScope IIIa with Dimension 3000 stage system manufactured by Digital Instruments, and the observation can be performed in the following observation conditions:

Scan mode: tapping mode
Probe: silicon cantilever
Scan field: 0.6 μm×0.6
Scan speed: 0.3 Hz
Number of pixels: 512×512
Measurement environment: at room temperature in the atmosphere For each sample, in the image obtained by the observation of a single area on an individual single fiber, the curve of the fiber cross section is approximated with a three-dimensional curved surface. From the obtained whole image, the average roughness (Ra) is calculated. It is preferable that the average roughness (Ra) of five single fibers be determined, and the average is evaluated.

In the present invention, the carbon fibers preferably have a total fineness of 400 to 3,000 tex. The carbon fibers preferably have a filament number of 1,000 to 100,000 and more preferably 3,000 to 50,000.

In the present invention, the carbon fibers preferably have a single fiber diameter of 4.5 to 7.5 μm. If having a single fiber diameter of 7.5 μm or less, the carbon fibers can have high strength and high elastic modulus and thus are preferred. The single fiber diameter is more preferably 6 μm or less and even more preferably 5.5 μm or less. If having a single fiber diameter of 4.5 μm or more, the carbon fibers are unlikely to cause single fiber breakage and to reduce the productivity and thus are preferred.

In the present invention, the carbon fibers preferably have a surface oxygen concentration (O/C) ranging from 0.05 to 0.50, more preferably ranging from 0.06 to 0.30, and even more preferably ranging from 0.07 to 0.25, where the surface oxygen concentration (O/C) is the ratio of the number of oxygen (O) atoms and that of carbon (C) atoms on the surfaces of the fibers and is determined by X-ray photoelectron spectroscopy. If having a surface oxygen concentration (O/C) of 0.05 or more, the carbon fibers maintain an oxygen-containing functional group on the surfaces of the carbon fibers and thus can achieve a strong adhesion to a matrix resin. If having a surface oxygen concentration (O/C) of 0.50 or less, the carbon fibers can suppress the reduction in strength of the carbon fiber itself by oxidation.

The surface oxygen concentration of carbon fibers is determined by X-ray photoelectron spectroscopy in accordance with the procedure below. First, a solvent is used to remove dust and the like adhering to the surfaces of carbon fibers; then the carbon fibers are cut into 20-mm pieces; and the pieces are spread and arranged on a copper sample holder. The measurement is carried out by using AlK$\alpha_{1,2}$ as the X-ray source while the inside of a sample chamber is maintained at $1 \times 10^{-8}$ Torr. The photoelectron takeoff angle is adjusted to 90°. As the correction value for the peak associated with electrification during measurement, the binding energy value of the main peak (peak top) of $C_{1s}$ is set to 284.6 eV. The $C_{1s}$ peak area is determined by drawing a straight base line in a range from 282 to 296 eV. The $O_{1s}$ peak area is determined by drawing a straight base line in a range from 528 to 540 eV. The surface oxygen concentration (O/C) is expressed as an atom number ratio calculated by dividing the ratio of the $O_{1s}$ peak area by a sensitivity correction value inherent in an apparatus. For ESCA-1600 manufactured by Ulvac-Phi, Inc. used as the X-ray photoelectron spectrometer, the sensitivity correction value inherent in the apparatus is 2.33.

The carbon fibers used in the present invention preferably have a carboxy group concentration (COOH/C) on the surfaces of the carbon fibers ranging from 0.003 to 0.015, where the surface carboxy group concentration (COOH/C) is expressed by the ratio of the numbers of atoms of the carboxy group (COOH) and the carbon (C) on the surfaces of carbon fibers determined by chemical modification X-ray photoelectron spectroscopy. The carboxy group concentration (COOH/C) on the surfaces of carbon fibers is more preferably in a range from 0.004 to 0.010. The carbon fibers used in the present invention preferably have a surface hydroxy group concentration (COH/C) ranging from 0.001 to 0.050, where the surface hydroxy group concentration (COH/C) is expressed by the ratio of the numbers of atoms of the hydroxy group (OH) and the carbon (C) on the surfaces of carbon fibers determined by chemical modification X-ray photoelectron spectroscopy. The surface hydroxy group concentration (COH/C) on the surfaces of carbon fibers is more preferably in a range from 0.010 to 0.040.

The carboxy group concentration (COOH/C) and the hydroxy group concentration (COH/C) on the surfaces of carbon fibers are determined by X-ray photoelectron spectroscopy in accordance with the procedure below.

The surface hydroxy group concentration (COH/C) is determined by chemical modification X-ray photoelectron spectroscopy in accordance with the procedure below. First, carbon fiber bundles from which a sizing agent and the like have been removed with a solvent are cut into pieces, and the pieces are spread and arranged on a platinum sample holder. The pieces are exposed to a dry nitrogen gas containing 0.04 mol/L of trifluoroacetic anhydride gas at room temperature for 10 minutes, undergoing chemical modification treatment. Then, the treated pieces are mounted on an X-ray photoelectron spectrometer at a photoelectron takeoff angle of 35°. AlK$\alpha_{1,2}$ is used as the X-ray source, and the inside of the sample chamber is maintained at a degree of vacuum of $1\times10^{-8}$ Torr. As the correction for the peak associated with electrification during measurement, the binding energy value of the main peak of $C_{1s}$ is set to 284.6 eV, first. The $C_{1s}$ peak area [$C_{1s}$] is determined by drawing a straight base line in a range from 282 to 296 eV, and the $F_{1s}$ peak area [$F_{1s}$] is determined by drawing a straight base line in a range from 682 to 695 eV. The reaction rate r can be determined from $C_{1s}$ peak splitting of polyvinyl alcohol simultaneously subjected to chemical modification treatment.

The surface hydroxy group concentration (COH/C) is expressed by the value calculated in accordance with the equation below.

COH/C={[$F_{1s}$]/($3k$[$C_{1s}$]−2[$F_{1s}$])$r$}×100(%)

In the equation, k is a sensitivity correction value inherent in the apparatus for the $F_{1s}$ peak area relative to the $C_{1s}$ peak area, and the sensitivity correction value inherent in an apparatus is 3.919 for model SSX-100-206 manufactured by SSI, USA.

The surface carboxy group concentration COOH/C is determined by chemical modification X-ray photoelectron spectroscopy in accordance with the procedure below. First, carbon fiber bundles from which a sizing agent and the like have been removed with a solvent are cut into pieces, and the pieces are spread and arranged on a platinum sample holder. The pieces are is exposed to air containing 0.02 mol/L of trifluoroethanol gas, 0.001 mol/L of dicyclohexylcarbodiimide gas, and 0.04 mol/L of pyridine gas at 60° C. for 8 hours, undergoing chemical modification treatment. Then, the treated pieces are mounted on an X-ray photoelectron spectrometer at a photoelectron takeoff angle of 35°. AlK$\alpha_{1,2}$ is used as the X-ray source, and the inside of the sample chamber is maintained at a degree of vacuum of $1\times10^{-8}$ Torr. As the correction for the peak associated with electrification during measurement, the binding energy value of the main peak of $C_{1s}$ is set to 284.6 eV, first. The $C_{1s}$ peak area [$C_{1s}$] is determined by drawing a straight base line in a range from 282 to 296 eV, and the $F_{1s}$ peak area [$F_{1s}$] is determined by drawing a straight base line in a range from 682 to 695 eV. The reaction rate r can be determined from $C_{1s}$ peak splitting of polyacrylic acid simultaneously subjected to chemical modification treatment, and the residual rate m of a dicyclohexylcarbodiimide derivative can be determined from $O_{1s}$ peak splitting.

The surface carboxy group concentration COOH/C is expressed by the value calculated in accordance with the equation below.

COOH/C={[$F_{1s}$]/($3k$[$C_{1s}$]−(2+13$m$)[$F_{1s}$])$r$}×100(%)

In the equation, k is a sensitivity correction value inherent in the apparatus for the $F_{1s}$ peak area relative to the $C_{1s}$ peak area, and the sensitivity correction value inherent in an apparatus is 3.919 for model SSX-100-206 manufactured by SSI, USA.

The carbon fibers used in the present invention preferably have a polar component of surface free energy of 8 mJ/m$^2$ or more and 50 mJ/m$^2$ or less. Carbon fibers having a polar component of surface free energy of 8 mJ/m$^2$ or more are preferred because the aliphatic epoxy compound (A) comes closer to the surfaces of carbon fibers to improve the adhesion, and a sizing layer has an uneven structure. Carbon fibers having a polar component of surface free energy of 50 mJ/m$^2$ or less are preferred because the bindability among carbon fibers increases to improve impregnation properties with a matrix resin, and this expands the application of a carbon fiber reinforced composite material to be produced.

The surfaces of carbon fibers more preferably have a polar component of surface free energy of 15 mJ/m$^2$ or more and 45 mJ/m$^2$ or less and most preferably 25 mJ/m$^2$ or more and 40 mJ/m$^2$ or less. The polar component of surface free energy of carbon fibers is the polar component of surface free energy calculated by using the Owens equation for approximation on the basis of the contact angle of carbon fibers with a corresponding liquid of water, ethylene glycol, and tricresyl phosphate determined by the Wilhelmy method.

The aliphatic epoxy compound (A) used in the present invention may be employed as long as it has a polar component of surface free energy of 9 mJ/m$^2$ or more and 50 mJ/m$^2$ or less. The aromatic epoxy compound (B1) may be employed as long as it has a polar component of surface free energy of 0 mJ/m$^2$ or more and less than 9 mJ/m$^2$.

The polar components of surface free energy of the aliphatic epoxy compound (A) and the aromatic epoxy compound (B1) are determined as follows: carbon fiber bundles are immersed in a solution containing the aliphatic epoxy compound (A) or the aromatic epoxy compound (B1) alone and pulled up; the carbon fiber bundles are dried at 120 to 150° C. for 10 minutes; and each polar component of surface free energy is calculated by using the Owens equation for approximation on the basis of each contact angle of the carbon fiber bundles with a corresponding liquid of water, ethylene glycol, and tricresyl phosphate determined by the Wilhelmy method as described above.

In the present invention, the polar component of surface free energy of carbon fibers, $E_{CF}$, the polar component of surface free energy of an aliphatic epoxy compound (A), $E_A$, and the polar component of surface free energy of an aromatic epoxy compound (B1), $E_{B1}$, are preferably satisfy the relation, $E_{CF} \geq E_A > E_{B1}$.

A method for producing the PAN carbon fibers will next be described.

Usable examples of the spinning method for preparing precursor fibers of carbon fibers include dry spinning, wet spinning, and dry-wet spinning. To readily produce high-strength carbon fibers, the wet spinning or the dry-wet spinning is preferably employed.

In order to further improve the adhesion between carbon fibers and a matrix resin, the carbon fibers preferably have a surface roughness (Ra) of 6.0 to 100 nm, and in order to prepare carbon fibers having such a surface roughness, the wet spinning is preferably employed to spin precursor fibers.

A spinning solution to be used may be a solution in which a homopolymer or copolymer of polyacrylonitrile is dissolved in a solvent. The solvent used is an organic solvent such as dimethyl sulfoxide, dimethylformamide, and dimethylacetamide or an aqueous solution of an inorganic compound such as nitric acid, sodium rhodanate, zinc chloride, and sodium thiocyanate. Preferred solvents are dimethyl sulfoxide and dimethylacetamide.

The spinning solution is passed through a spinneret for spinning, discharged into a spinning bath or air, and then solidified in the spinning bath. The spinning bath to be used may be an aqueous solution of the same solvent as the solvent used for the spinning solution. The spinning liquid preferably contains the same solvent as the solvent for the spinning solution, and an aqueous dimethyl sulfoxide solution and an aqueous dimethylacetamide solution are preferred. The fibers solidified in the spinning bath are subjected to water-washing and drawing to yield precursor fibers. The obtained precursor fibers are subjected to flame resistant treatment and carbonization treatment and, if desired, further subjected to graphite treatment, yielding carbon fibers. The carbonization treatment and the graphite treatment are preferably carried out under conditions of a maximum heat treatment temperature of 1,100° C. or more and more preferably 1,400 to 3,000° C.

To improve the adhesion to a matrix resin, the obtained carbon fibers are typically subjected to oxidation treatment, which introduces an oxygen-containing functional group. The oxidation treatment method may be gas phase oxidation, liquid phase oxidation, and liquid phase electrolytic oxidation, and the liquid phase electrolytic oxidation is preferably employed from the viewpoint of high productivity and uniform treatment.

In the present invention, the electrolytic solution used for the liquid phase electrolytic oxidation is exemplified by an acid electrolytic solution and an alkaline electrolytic solution. From the viewpoint of adhesion between carbon fibers and a matrix resin, carbon fibers are more preferably subjected to the liquid phase electrolytic oxidation in an alkaline electrolytic solution and then coated with a sizing agent.

Examples of the acid electrolytic solution include inorganic acids such as sulfuric acid, nitric acid, hydrochloric acid, phosphoric acid, boric acid, and carbonic acid; organic acids such as acetic acid, butyric acid, oxalic acid, acrylic acid, and maleic acid; and salts such as ammonium sulfate and ammonium hydrogen sulfate. Among them, sulfuric acid and nitric acid, which exhibit strong acidity, are preferably used.

Examples of the alkaline electrolytic solution specifically include aqueous solutions of hydroxides such as sodium hydroxide, potassium hydroxide, magnesium hydroxide, calcium hydroxide, and barium hydroxide; aqueous solutions of carbonates such as sodium carbonate, potassium carbonate, magnesium carbonate, calcium carbonate, barium carbonate, and ammonium carbonate; aqueous solutions of hydrogen carbonates such as sodium hydrogen carbonate, potassium hydrogen carbonate, magnesium hydrogen carbonate, calcium hydrogen carbonate, barium hydrogen carbonate, and ammonium hydrogen carbonate; and aqueous solutions of ammonia, tetraalkylammonium hydroxide, and hydrazine. Among them, preferably used electrolytic solutions are aqueous solutions of ammonium carbonate and ammonium hydrogen carbonate because such a solution is free from an alkali metal that interferes with the curing of a matrix resin, or an aqueous solution of tetraalkylammonium hydroxide exhibiting strong alkalinity is preferably used.

The electrolytic solution used in the present invention preferably has a concentration ranging from 0.01 to 5 mol/L and more preferably ranging from 0.1 to 1 mol/L. If the electrolytic solution has a concentration of 0.01 mol/L or more, the electrolytic treatment can be performed at a lower electrical voltage, which is advantageous in operating cost. An electrolytic solution having a concentration of 5 mol/L or less is advantageous in terms of safety.

The electrolytic solution used in the present invention preferably has a temperature ranging from 10 to 100° C. and more preferably ranging from 10 to 40° C. An electrolytic solution having a temperature of 10° C. or more improves the efficiency of electrolytic treatment, and this is advantageous in operating cost. An electrolytic solution having a temperature of less than 100° C. is advantageous in terms of safety.

In the present invention, the quantity of electricity during liquid phase electrolytic oxidation is preferably optimized depending on the carbonization degree of carbon fibers, and the treatment of carbon fibers having a high elastic modulus necessitates a larger quantity of electricity.

In the present invention, the current density during liquid phase electrolytic oxidation is preferably in a range from 1.5 to 1,000 $A/m^2$ and more preferably from 3 to 500 $A/m^2$ relative to 1 $m^2$ of the surface area of carbon fibers in an electrolytic treatment solution. If the current density is 1.5 $A/m^2$ or more, the efficiency of electrolytic treatment is improved, and this is advantageous in operating cost. A current density of 1,000 $A/m^2$ or less is advantageous in terms of safety.

In the present invention, the carbon fibers after electrolytic treatment are preferably washed with water and dried. The washing method may be dipping or spraying, for example. Among them, from the viewpoint of easy washing, the dipping is preferably employed, and the dipping is preferably performed while carbon fibers are vibrated by ultrasonic waves. An excessively high drying temperature readily causes thermal decomposition of a functional group on the outermost surfaces of carbon fibers, thus decomposing the functional group. The drying is thus preferably performed at a temperature as low as possible. Specifically, the drying temperature is preferably 260° C. or lower, more preferably 250° C. or lower, and even more preferably 240° C. or lower.

Next, sizing agent-coated carbon fibers prepared by coating the carbon fibers with a sizing agent will be described. The sizing agent of the present invention includes the aliphatic epoxy compound (A) and the aromatic compound (B) containing at least the aromatic epoxy compound (B1) and may contain additional components.

In the present invention, the method of coating carbon fibers with the sizing agent is preferably a method by single coating using a sizing liquid in which the aliphatic epoxy compound (A), the aromatic compound (B) at least containing the aromatic epoxy compound (B1), and other components are simultaneously dissolved or dispersed in a solvent and a method by multiple coating of carbon fibers using sizing liquids in which any of the compounds (A), (B1), and (B) and other components are selected and dissolved or dispersed in corresponding solvents. The present invention more preferably employs one step application of single coating of carbon fibers with a sizing liquid containing all the components of the sizing agent in terms of effect and simple treatment.

The sizing agent of the present invention can be used as a sizing liquid prepared by diluting sizing agent components with a solvent. Examples of the solvent include water, methanol, ethanol, isopropanol, acetone, methyl ethyl ketone, dimethylformamide, and dimethylacetamide. Specifically, an aqueous dispersion emulsified with a surfactant or an aqueous solution is preferably used from the viewpoint of handleability and safety.

The sizing liquid is prepared by emulsifying components at least containing the aromatic compound (B) with a surfactant to yield a water emulsion liquid and mixing a solution at least containing the aliphatic epoxy compound (A). For a water-soluble aliphatic epoxy compound (A), a method of previously dissolving the aliphatic epoxy compound (A) in water to give an aqueous solution and mixing a water emulsion liquid at least containing the aromatic compound (B) is preferably employed from the viewpoint of emulsion stability. Alternatively, the use of a water dispersant in which the aliphatic epoxy compound (A), the aromatic compound (B), and other components are emulsified with a surfactant is preferable from the viewpoint of long-term storage stability of the sizing agent.

The sizing liquid typically contains the sizing agent at a concentration ranging from 0.2% by mass to 20% by mass.

Examples of the method of applying a sizing agent onto carbon fibers (the method of coating carbon fibers with a sizing agent) include a method of immersing carbon fibers in a sizing liquid through a roller, a method of bringing carbon fibers into contact with a roller onto which a sizing liquid adheres, and a method of spraying a sizing liquid onto carbon fibers. The method of applying a sizing agent may be either a batch-wise manner or a continuous manner, and the continuous manner is preferably employed due to good productivity and small variation. During the application, in order to uniformly apply an active component in the sizing agent onto carbon fibers within an appropriate amount, the concentration and temperature of a sizing liquid, the thread tension, and other conditions are preferably controlled. During the application of a sizing agent, carbon fibers are preferably vibrated by ultrasonic waves.

During the coating of carbon fibers with the sizing solution, the sizing liquid preferably has a liquid temperature ranging from 10 to 50° C. in order to suppress a concentration change of the sizing agent due to the evaporation of a solvent. Furthermore, by adjusting a throttle for extracting an excess sizing liquid after applying the sizing liquid, the adhesion amount of the sizing agent can be controlled, and the sizing agent can be uniformly infiltrated into carbon fibers.

After coated with a sizing agent, the carbon fibers are preferably heated at a temperature ranging from 160 to 260° C. for 30 to 600 seconds. The heat treatment conditions are preferably at a temperature ranging from 170 to 250° C. for 30 to 500 seconds and more preferably at a temperature ranging from 180 to 240° C. for 30 to 300 seconds. Heat treatment under conditions at lower than 160° C. and/or for less than 30 seconds fails to accelerate the interaction between the aliphatic epoxy compound (A) in the sizing agent and an oxygen-containing functional group on the surfaces of carbon fibers, and this may result in insufficient adhesion between the carbon fibers and a matrix resin or may insufficiently dry carbon fibers and remove a solvent. Heat treatment under conditions at higher than 260° C. and/or for more than 600 seconds causes the sizing agent to decompose and volatilize and thus fails to accelerate the interaction with carbon fibers, and this may result in insufficient adhesion between the carbon fibers and a matrix resin.

The heat treatment can be performed by microwave irradiation and/or infrared irradiation. When sizing agent-coated carbon fibers are treated with heat by microwave irradiation and/or infrared irradiation, microwaves enter the carbon fibers and are absorbed by the carbon fibers, and this can heat the carbon fibers as an object to be heated to an intended temperature in a short period of time. The microwave irradiation and/or the infrared irradiation can rapidly heat the inside of the carbon fibers. This can reduce the difference in temperature between the inner side and the outer side of carbon fiber bundles, thus reducing the uneven adhesion of a sizing agent.

The sizing agent-coated carbon fibers of the present invention produced as above are characterized by having an (a)/(b) ratio of 0.50 to 0.90 where (a) is the height (cps) of a component at a binding energy (284.6 eV) assigned to CHx, C—C, and C═C and (b) is the height (cps) of a component at a binding energy (286.1 eV) assigned to C—O in a $C_{1s}$ core spectrum of the surface of the sizing agent on the carbon fibers analyzed by X-ray photoelectron spectroscopy at a photoelectron takeoff angle of 15°. When the (a)/(b) ratio is within a particular range, that is, in a range from 0.50 to 0.90, the sizing agent-coated carbon fibers have excellent adhesion to a matrix resin and undergo a small deterioration of mechanical characteristics even when stored in a prepreg state for a long period of time, and on the basis of the findings, the present invention is accomplished.

The sizing agent-coated carbon fibers of the present invention preferably have an (a)/(b) ratio of 0.55 or more and more preferably 0.57 or more where (a) is the height (cps) of a component at a binding energy (284.6 eV) assigned to CHx, C—C, and C═O and (b) is the height (cps) of a component at a binding energy (286.1 eV) assigned to C—O in a $C_{1s}$ core spectrum of the surface of the sizing agent analyzed by X-ray photoelectron spectroscopy at a photoelectron takeoff angle of 15°. The (a)/(b) ratio is preferably 0.80 or less and more preferably 0.74 or less. A larger (a)/(b) ratio indicates that the surface contains larger amounts of compounds derived from aromatics and smaller amounts of compounds derived from aliphatics.

The X-ray photoelectron spectroscopy is an analytical method by irradiating carbon fibers as a sample with X-rays in an ultrahigh vacuum and analyzing the kinetic energy of photoelectrons discharged from the surfaces of carbon fibers with what is called an energy analyzer. By analyzing the kinetic energy of photoelectrons discharged from the surfaces of carbon fibers as the sample, the energy value of X-rays incident on the carbon fibers as the sample is converted to uniquely determine a binding energy, and on the basis of the binding energy and a photoelectron intensity, the types, concentrations, and chemical states of elements present in the outermost layer (the order of nanometers) of the sample can be analyzed.

In the present invention, the peak ratio of (a) and (b) of the surface of the sizing agent on sizing agent-coated carbon fibers can be determined by X-ray photoelectron spectroscopy in accordance with the procedure below. Sizing agent-coated carbon fibers are cut into 20-mm pieces, and the pieces are spread and arranged on a copper sample holder. $AlK\alpha_{1,2}$ is used as the X-ray source, and the measurement is carried out while the inside of a sample chamber is maintained at $1 \times 10^{-8}$ Torr. As the correction for the peak associated with electrification during measurement, the binding energy value of the main peak of $C_{1s}$ is set to 286.1 eV, first. At this time, the $C_{1s}$ peak area is determined by drawing a straight base line in a range from 282 to 296 eV. The straight base line from 282 to 296 eV for calculating the $C_{1s}$ peak area is defined as the origin point (zero point) for photoelectron intensity, then the height (b) (cps: photoelectron intensity per unit time) of the peak at a binding energy of 286.1 eV assigned to a C—O component and the height (a)

(cps) of the peak at a binding energy of 284.6 eV assigned to CHx, C—C, and C=C are determined, and the (a)/(b) ratio is calculated.

The sizing agent-coated carbon fibers of the present invention preferably satisfy the relation (III) where (I) and (II) are determined from the (a)/(b) ratio, (a) is the height (cps) of a component at a binding energy (284.6 eV) assigned to CHx, C—C, and C=C, and (b) is the height (cps) of a component at a binding energy (286.1 eV) assigned to C—O in a $C_{1s}$ core spectrum of the surface of the sizing agent on the carbon fibers analyzed by X-ray photoelectron spectroscopy using an X-ray at 400 eV at a photoelectron takeoff angle of 55°.

$$0.50 \leq (I) \leq 0.90 \text{ and } 0.60 < (II)/(I) < 1.0 \quad \text{(III)}$$

where (I) is the value of (a)/(b) of the surfaces of sizing agent-coated carbon fibers before ultrasonication; and (II) is the value of (a)/(b) of the surfaces of sizing agent-coated carbon fibers that have been washed to have a sizing agent adhesion amount of 0.09 to 0.20% by mass by ultrasonication of the sizing agent-coated carbon fibers in an acetone solvent.

The value (I) as the value of (a)/(b) of the surfaces of sizing agent-coated carbon fibers before ultrasonication falling within the range indicates that the surface of the sizing agent contains larger amounts of compounds derived from aromatics and smaller amounts of compounds derived from aliphatics. The value (I) as the value of (a)/(b) before ultrasonication is preferably 0.55 or more and more preferably 0.57 or more. The value (I) as the value of (a)/(b) before ultrasonication is preferably 0.80 or less and more preferably 0.74 or less.

The ratio (II)/(I) as the ratio of the values of (a)/(b) of the surfaces of sizing agent-coated carbon fibers before and after ultrasonication falling within the range indicates that larger amounts of compounds derived from aliphatics are present in the inner layer of the sizing agent than in the surface of the sizing agent. The ratio (II)/(I) is preferably 0.65 or more. The ratio (II)/(I) is preferably 0.85 or less.

If the values (I) and (II) satisfy the relation (III), the sizing agent-coated carbon fibers have excellent adhesion to a matrix resin and undergo a small deterioration of mechanical characteristics even when stored in a prepreg state for a long period of time. Such carbon fibers are thus preferred.

In the present invention, the sizing agent applied onto carbon fibers preferably has an epoxy equivalent of 350 to 550 g/eq. A sizing agent having an epoxy equivalent of 550 g/eq. or less improves the adhesion between carbon fibers coated with the sizing agent and a matrix resin. When the carbon fibers coated with a sizing agent having an epoxy equivalent of 350 g/eq. or more are used to prepare a prepreg, the reaction between a matrix resin component used in the prepreg and the sizing agent can be suppressed, and thus a carbon fiber reinforced composite material to be produced has good mechanical characteristics even when the prepreg is stored in a long period of time. Such a sizing agent is thus preferred. The sizing agent applied preferably has an epoxy equivalent of 360 g/eq. or more and more preferably 380 g/eq. or more. The sizing agent applied preferably has an epoxy equivalent of 530 g/eq. or less and more preferably 500 g/eq. or less. In order to give a sizing agent applied having an epoxy equivalent within the range, a sizing agent having an epoxy equivalent of 180 to 470 g/eq. is preferably applied. If the epoxy equivalent is 313 g/eq. or less, the adhesion between carbon fibers coated with the sizing agent and a matrix resin is improved. If carbon fibers coated with a sizing agent having an epoxy equivalent of 222 g/eq. or more is used to prepare a prepreg, the reaction between a resin component used in the prepreg and the sizing agent can be suppressed, and thus a carbon fiber reinforced composite material to be produced has good mechanical characteristics even when the prepreg is stored in a long period of time.

The epoxy equivalent of the sizing agent in the present invention can be determined by dissolving a sizing agent from which a solvent is removed in a solvent typified by N,N-dimethylformamide, then cleaving the epoxy group with hydrochloric acid, and carrying out acid-base titration. The epoxy equivalent is preferably 220 g/eq. or more and more preferably 240 g/eq. or more. The epoxy equivalent is preferably 310 g/eq. or less and more preferably 280 g/eq. or less. The epoxy equivalent of the sizing agent applied to carbon fibers in the present invention can be determined by immersing sizing agent-coated carbon fibers in a solvent typified by N,N-dimethylformamide, carrying out ultrasonic cleaning to extract the sizing agent from the fibers, then cleaving the epoxy group with hydrochloric acid, and carrying out acid-base titration. The epoxy equivalent of the sizing agent applied to carbon fibers can be controlled by, for example, the epoxy equivalent of a sizing agent to be applied and heat history during drying or other steps after coating.

In the present invention, the adhesion amount of the sizing agent to carbon fibers is preferably in a range from 0.1 to 10.0 parts by mass and more preferably from 0.2 to 3.0 parts by mass relative to 100 parts by mass of the carbon fibers. If coated with the sizing agent in an amount of 0.1 parts by mass or more, the sizing agent-coated carbon fibers can withstand friction with metal guides or the like through which the carbon fibers pass during preparing a prepreg and weaving, and this prevents fluffs from generating, thus producing a carbon fiber sheet having excellent quality such as smoothness. If the adhesion amount of the sizing agent is 10.0 parts by mass or less, a matrix resin can infiltrate into carbon fibers without interference by a sizing agent coating around the sizing agent-coated carbon fibers. This prevents voids from generating in an intended carbon fiber reinforced composite material, and thus the carbon fiber reinforced composite material has excellent quality and excellent mechanical characteristics.

The adhesion amount of the sizing agent is a value (% by mass) calculated by weighing about 2±0.5 g of sizing agent-coated carbon fibers, subjecting the carbon fibers to heat treatment at 450° C. for 15 minutes in a nitrogen atmosphere, determining the change in mass before and after the heat treatment, and dividing the change in mass by the mass before the heat treatment.

In the present invention, the sizing agent layer applied onto carbon fibers and dried preferably has a thickness ranging from 2.0 to 20 nm and a maximum thickness of less than twice a minimum thickness. A sizing agent layer having such a uniform thickness can stably achieve a large adhesion improvement effect and can stably achieve excellent high-order processability.

In the present invention, the adhesion amount of the aliphatic epoxy compound (A) is preferably in a range from 0.05 to 5.0 parts by mass and more preferably from 0.2 to 2.0 parts by mass relative to 100 parts by mass of the carbon fibers. The amount is more preferably from 0.3 to 1.0 part by mass. When the adhesion amount of the aliphatic epoxy compound (A) is 0.05 part by mass or more, the adhesion between the sizing agent-coated carbon fibers and the matrix resin is improved, and thus such an amount is preferred.

In the process for producing the sizing agent-coated carbon fibers of the present invention, carbon fibers having a polar component of surface free energy of 8 $mJ/m^2$ or more and 50 mJ/m² or less are preferably coated with the sizing agent. Carbon fibers having a polar component of surface free energy of 8 mJ/m² or more are preferred because the aliphatic epoxy compound (A) comes closer to the surfaces of carbon fibers to improve the adhesion, and the sizing layer has an uneven structure. Carbon fibers having a polar component of surface free energy of 50 mJ/m² or less are preferred because the bindability among carbon fibers increases to improve impregnation properties with a matrix resin, and this expands the application of a carbon fiber reinforced composite material to be produced. The polar component of surface free energy of the surfaces of carbon fibers is more preferably 15 mJ/m² or more and 45 mJ/m² or less and most preferably 25 mJ/m² or more and 40 mJ/m² or less.

The prepreg of the present invention contains the sizing agent-coated carbon fibers having the shape of woven fabric or braid. In the present invention, with the sizing agent-coated carbon fibers as a base for molding in the shape of woven fabric or braid, the base for molding having the shape is impregnated with a film formed of a thermosetting resin composition to form a prepreg. The prepreg is stacked, subjected to bagging, and autoclave molded to form a carbon fiber reinforced composite material.

The base is preferably a two-axis woven fabric in which carbon fibers are arranged in two directions of a longitudinal direction and a transverse direction from the viewpoint of drape properties. A woven structure selected from plain weave, twill weave, and satin weave is more preferable.

Plain weave in particular can be used without distinction between the front and the back and is thus easy to be handled. Twill weave and satin weave are preferable, because the resin rich part, in which microcracks are likely to occur, can be reduced by reducing entangled points of fibers.

In the prepreg of the present invention, the range of a cover factor of a carbon fiber woven fabric is preferably 90 to 100%. It is more preferably 95% or more. If the cover factor is small, the resin rich part, in which microcracks are likely to occur when stacked and cured, is likely to become large. If the cover factor is small, voids, in which neither resin nor fibers are present, occur depending on the fluidity of the resin at molding temperature, which may decrease the rigidity and tensile strength of a carbon fiber reinforced composite material to be obtained. If the cover factor is sufficient, the resin is easy to be retained on the prepreg surface, and thus changes of the tack of the prepreg with time can be reduced.

The cover factor of the prepreg of the present invention is a factor related to interstices (resin rich parts) formed in between weaving yarns (carbon fiber bundles) of a carbon fiber woven fabric when formed into the prepreg and refers to a value defined by the equation below when an area with an area $S1$ of the prepreg is set, when the area of interstices formed by the weaving yarns of the carbon fiber woven fabric within the area $S1$ is $S2$. In the present invention, the area $S1$ is set to arbitrary 100 cm² on the plane of the prepreg, and the cover factor is an average value of individual values measured from five positions on five test pieces with dimensions of 10×10 cm cut out of the woven fabric in the width direction.

$$\text{cover factor (\%)}=[(S1-S2)/S1]\times100$$

The carbon fiber woven fabric used in the present invention is preferably an interwoven wire fabric woven by arranging metallic wires on the side faces of the carbon fiber bundles in the longitudinal direction and transverse direction and interlacing the carbon fiber bundles and/or metallic wires and the carbon fiber bundles and/or metallic wires arranged in a different direction. The metallic wires can improve the in-plane electric conductivity of a carbon fiber reinforced composite material obtained by stacking and curing the prepregs. The in-plane electric conductivity indicates electric conductivity in a direction parallel to the face of the carbon fiber woven fabric. When an electric current passes through the carbon fiber reinforced composite material by a lightning strike or the like, the electric current preferentially passes through a mesh formed of the metallic wires or the metallic wires, and thus the electric current diffuses across a wide area along the face of the carbon fiber reinforced composite material. This diffusion dissipates electricity to other parts of the member or discharges electricity to the air, thereby preventing damage to the structure, ignition of fuel, or the like.

From the viewpoint of efficiently diffusing the electric current, the material of the metallic wires preferably has lower electric resistivity than the carbon fibers and is more preferably half of it or less. The electric resistivity can be measured as follows, for example. Five to twenty single yarns or fiber bundles of metallic wires (for a mesh and a nonwoven fabric, metallic wires forming them) and carbon fibers are extracted to prepare test pieces. A volume specific electric resistance value is measured using a commercially available resistivity meter, and electric resistivity is measured using the length and cross section of the test piece. An average value for the used test pieces is determined and is determined to be its electric resistivity. The electric resistivity of the carbon fibers may be measured using single yarns or may be evaluated in the shape of fiber bundle. When evaluated in the shape of fiber bundle, specific electric resistivity can be determined using the length of the test piece, the cross-sectional area of the single yarn, and the number of the single yarns contained in the fiber bundle. Although measurement by the four-terminal method is preferable for evaluating a more accurate electric resistance value, measurement can be performed by the two-terminal method, which is simpler, if differences between materials can be compared to each other. Although the length of extracted short fibers is required to have a length for which a resistance value measurable within the measurement range of a resistivity meter used is obtained, a length of 1 to 10 cm is evaluated from the viewpoint of the simplicity of evaluation. For a nonwoven fabric or a mesh, a shorter length can be evaluated. In other words, any resistivity meter having an appropriate measurement range may be used depending on the length of the test piece. Examples of a commercially available high-performance electric resistivity meter by the four-terminal method include Loresta GP MCP-T610 resistivity meter manufactured by Mitsubishi Chemical Analytech Co., Ltd.

The electric resistivity of carbon materials containing carbon fibers changes depending on structural defects and contained impurities as compared to metal. Electric resistivity in the longitudinal axis of carbon fibers or in the planar direction of graphite is generally in the range of $1\times10^{-5}$ to $1\times10^{-3}$ Ω·m, and the material of the metallic wires preferably has a resistance value smaller than the range.

Specific examples of the material of the metallic wires having such a characteristic include gold, silver, copper, bronze such as aluminum bronze, phosphorous bronze, silicon bronze, beryllium bronze, and tin bronze, brass, aluminum, nickel, steel, titanium, and stainless steel. Other metallic materials having similar electric and thermal characteristics may be used. A plurality of materials selected from these materials may be used in combination. An appropriate material can be selected in accordance with the application of the carbon fiber reinforced composite material considering characteristics such as price, density, specific strength and specific rigidity, corrosion resistance, and coefficient of thermal expansion in addition to electric and thermal characteristics. Aluminum and other similar materials are relatively small in density and excellent in electric conductivity and thermal characteristics. Stainless steel or the like can be used for improving corrosion resistance. Copper and copper alloys such as bronze and brass are excellent in electric conductivity and corrosion resistance, have a good balance in terms of price, and thus are preferably used.

Figure 2:
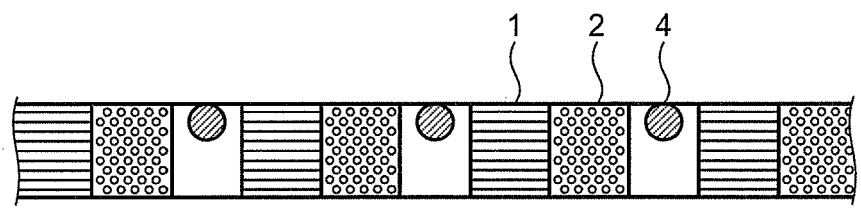
FIG. 2 is an A-A line sectional view of FIG. 1.

FIG. 1 is a plan view illustrating a plain fabric of carbon fibers in which metal leads are interwoven. FIG. 2 is an A-A line sectional view of FIG. 1. As illustrated in FIG. 1, longitudinal metallic wires 3 and transverse metallic wires 4 are arranged on the side faces of longitudinal carbon fiber bundles 1 and transverse carbon fiber bundles 2, respectively, and the longitudinal metallic wires 3 and the transverse metallic wires 4 are plain woven with the longitudinal carbon fiber bundles 1 and the transverse carbon fiber bundles 2. Apart from the woven fabric illustrated in FIG. 1, the woven fabric may be a non-crimp woven fabric, which is woven, with the longitudinal carbon fiber bundles and the transverse carbon fiber bundles arranged on the top and the bottom without being woven, by the longitudinal metallic wires and the transverse metallic wires arranged on the side faces of the longitudinal carbon fiber bundles and the transverse carbon fiber bundles, respectively, and support the carbon fiber bundles.

The prepreg of the present invention may be one formed by forming the sizing agent-coated carbon fibers into a woven fabric, arranging a mesh or a nonwoven fabric formed of metallic wires on one side or both sides of the fabric, and impregnating it with the matrix resin. By arranging the mesh formed of metallic wires or the like on one side or both sides of the woven fabric, the in-plane electric conductivity of a carbon fiber reinforced composite material to be obtained by stacking and curing the prepregs can be improved. The material of the mesh formed of metallic wires may be one similar to the metal used for the interwoven wire fabric (IWWF).

Figure 3:
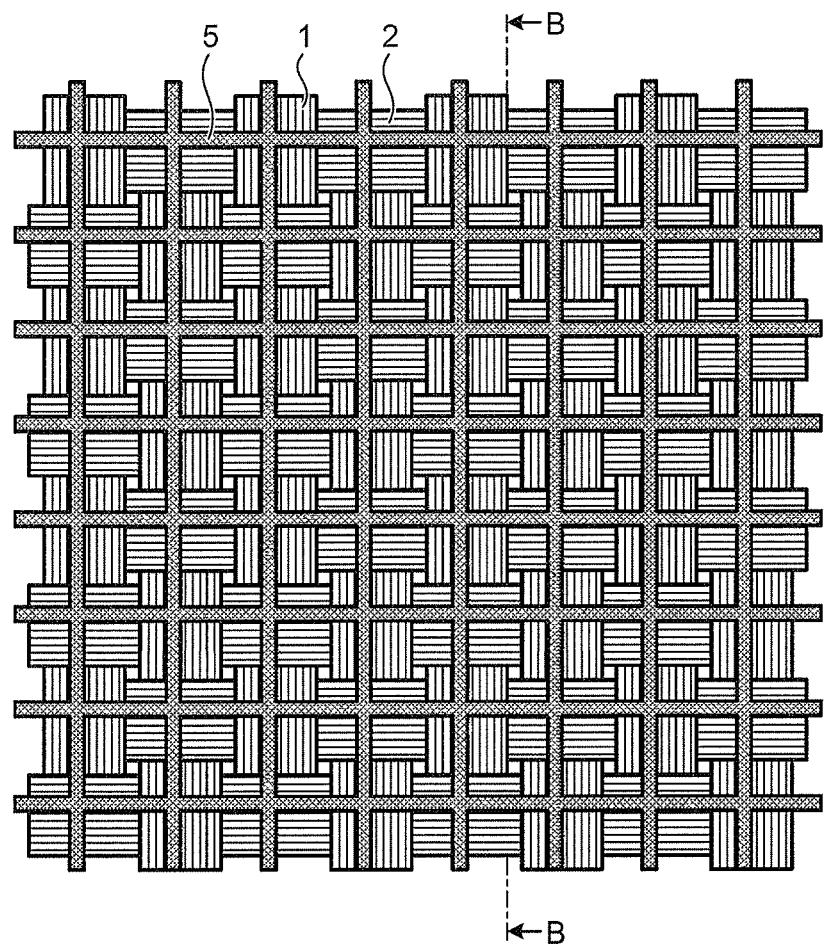
FIG. 3 is a plan view of a state in which a mesh formed of metallic wires is arranged on a plain carbon fiber woven fabric.
Figure 4:
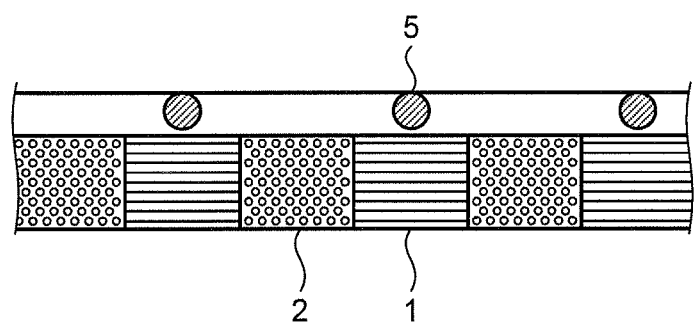
FIG. 4 is a B-B line sectional view of FIG. 3.

FIG. 3 is a plan view of a state in which a mesh formed of metallic wires is arranged on a plain carbon fiber woven fabric. FIG. 4 is a B-B line sectional view of FIG. 3. As illustrated in FIG. 3, a mesh 5 formed of metallic wires is arranged on a woven fabric in which the longitudinal carbon fiber bundles 1 and the transverse carbon fiber bundles 2 are plain woven. The mesh 5 formed of metallic wires may be, in addition to being arranged on one side of the woven fabric, arranged on both sides thereof. The mesh 5 formed of metallic wires may be held between the carbon fiber woven fabrics.

The forms illustrated in FIG. 1 to FIG. 4 are schematic, and in an actual configuration the metallic wires 3, 4 or the mesh 5 formed of metallic wires may be in perfect contact with the carbon fiber woven fabric, may be in partial contact therewith, or may not be in contact therewith. Although the cross section of the metallic wires 3, 4 or the mesh 5 formed of metallic wires is drawn as a perfect circle, the cross section may have any shape other than a perfect circle unless the effect of the present invention is impaired. Although in the state of a prepreg space formed in the carbon fiber woven fabric or between the metallic wires is not necessarily required to be filled with the matrix resin, in a cured and molded carbon fiber reinforced composite material the space formed in the carbon fiber woven fabric or between the metallic wires is required to be sufficiently filled with the matrix resin in order to exhibit sufficient strength and an environmental fatigue characteristic.

The diameter of the metallic wires used together with the woven fabric or the metallic wires forming the mesh or nonwoven fabric formed of metallic wires is preferably from 50 to 200 µm. If the diameter exceeds 200 µm, the mass fraction and the volume fraction of the metallic wires in the prepreg increases, and it is likely not only that a sufficient effect of weight reduction cannot be achieved in using the carbon fiber reinforced composite material in place of metal, but also that sufficient strength and rigidity cannot be exhibited caused by an increase in a part that is not reinforced by the carbon fibers. If the diameter exceeds 200 µm, the resin rich part increases, and microcracks may be more likely to occur. Using a conductive wire with 50 µm or more can prevent the conductive wire from being cut in the manufacture of the prepreg to improve handleability and is thus preferable. An increased cross-sectional area makes a large electric current likely to be diffused instantly.

The metallic wires or the mesh or the nonwoven fabric formed of metallic wires in the prepreg of the present invention is preferably contained in an amount of 0.1 to 40 parts by mass relative to 100 parts by mass of the carbon fiber woven fabric. The amount is more preferably 1 to 40 parts by mass. If the metallic wires are contained in an amount of 0.1 parts by mass or more, a sufficient current diffusion effect can be achieved. If the amount exceeds 40 parts by mass, the mass fraction and the volume fraction of the metallic wires in the prepreg increases, and a sufficient effect of weight reduction may not be achieved in using the carbon fiber reinforced composite material in place of metal, and it is also likely that sufficient strength and rigidity cannot be exhibited caused by an increase in a part that is not reinforced by the carbon fibers.

The sizing agent-coated carbon fibers according to the present invention are formed into the above woven fabric or braid and then is formed into a prepreg by impregnating it with the matrix resin.

Next, the prepreg and the carbon fiber reinforced composite material in the present invention will be described in detail.

In the present invention, the prepreg includes the above sizing agent-coated carbon fibers in the form of woven fabric or braid and the thermosetting resin composition as the matrix resin.

The thermosetting resin composition used in the present invention is a thermosetting resin composition at least containing the following components: a thermosetting resin (D); core-shell rubber particles (E); a thermoplastic resin (F); and a latent hardener (G).

The thermosetting resin (D) used in the present invention may be any resin that undergoes cross-linking reaction by heat and at least partially forms a three-dimensional cross-linked structure. Examples of such a thermosetting resin include unsaturated polyester resins, vinyl ester resins, epoxy resins, benzoxazine resins, phenol resins, urea resins, melamine resins, and polyimide resins and also include modified resins thereof and blending resins of two or more of them. These thermosetting resins may be self-curable by heat and may contain a curing agent, a curing accelerator, and other additives.

Among these thermosetting resins, epoxy resins are preferably used, which are excellent in the balance among heat resistance, mechanical characteristics, and adhesion to the carbon fibers. In particular, epoxy resins whose precursors are amines, phenols, or compounds having a carbon-carbon double bond are preferably used.

Specific examples of the epoxy resin, as glycidylamine epoxy resins whose precursors are amines include tetraglycidyldiaminodiphenylmethane, tetraglycidyldiaminodiphenyl ether, tetraglycidyldiaminodiphenyl sulfone, triglycidyl-p-aminophenol, triglycidyl-m-aminophenol, and various isomers of triglycidylaminocresol. Tetraglycidyldiaminodiphenylmethane is excellent in heat resistance and is thus preferable as a resin for carbon fiber reinforced composite materials as aircraft structural members.

In the use of tetraglycidyldiaminodiphenylmethane, in particular, a tetraglycidyldiaminodiphenylmethane having an epoxy equivalent of 100 to 134 g/eq. is preferably used. The epoxy equivalent is more preferably 100 to 120 g/eq. and even more preferably 100 to 115 g/eq. If the epoxy equivalent is less than 100 g/eq., the manufacture of tetraglycidyldiaminodiphenylmethane is difficult, and its manufacturing yield may be lowered. If the epoxy equivalent exceeds 134 g/eq., the viscosity of tetraglycidyldiaminodiphenylmethane to be obtained is too high; when a thermoplastic resin is dissolved to impart toughness to the thermosetting resin, only a small amount thereof can be dissolved, and a thermosetting resin cured product having high toughness may not be obtained. When the thermoplastic resin is dissolved into a tetraglycidyldiaminodiphenylmethane having an epoxy equivalent of 100 to 120 g/eq. in particular, a large amount of the thermoplastic resin can be dissolved to an extent that there is no influence on the process of prepreg preparation, and high toughness can be imparted to the thermosetting resin cured product without impairing heat resistance, leading to ability to exhibit high tensile strength and microcrack resistance in carbon fiber reinforced composite materials.

Examples of other glycidylamine epoxy resins include N,N-diglycidyl-4-phenoxyaniline, N,N-diglycidyl-4-(4-methylphenoxy)aniline, N,N-diglycidyl-4-(4-tert-butylphenoxy)aniline, and N,N-diglycidyl-4-(4-phenoxyphenoxy) aniline. These resins are obtained by adding epichlorohydrin to a phenoxyaniline derivative and cyclizing by an alkali compound in many cases. Viscosity increases along with an increase in molecular weight, and N,N-diglycidyl-4-phenoxyaniline is particularly preferably used from the viewpoint of handleability.

Specific examples of the phenoxyaniline derivative include 4-phenoxyaniline, 4-(4-methylphenoxy)aniline, 4-(3-methylphenoxy)aniline, 4-(2-methylphenoxy)aniline, 4-(4-ethylphenoxy)aniline, 4-(3-ethylphenoxy)aniline, 4-(2-ethylphenoxy)aniline, 4-(4-propylphenoxy)aniline, 4-(4-tert-butylphenoxy)aniline, 4-(4-cyclohexylphenoxy)aniline, 4-(3-cyclohexylphenoxy)aniline, 4-(2-cyclohexylphenoxy) aniline, 4-(4-methoxyphenoxy)aniline, 4-(3-methoxyphenoxy)aniline, 4-(2-methoxyphenoxy)aniline, 4-(3-phenoxyphenoxy)aniline, 4-(4-phenoxyphenoxy)aniline, 4-[4-(trifluoromethyl)phenoxy]aniline, 4-[3-(trifluoromethyl)phenoxy]aniline, 4-[2-(trifluoromethyl)phenoxy]aniline, 4-(2-naphthyloxyphenoxy)aniline, 4-(1-naphthyloxyphenoxy)aniline, 4-[(1,1'-biphen-4-yl)oxy]aniline, 4-(4-nitrophenoxy)aniline, 4-(3-nitrophenoxy)aniline, 4-(2-nitrophenoxy)aniline, 3-nitro-4-aminophenylphenyl ether, 2-nitro-4-(4-nitrophenoxy)aniline, 4-(2,4-dinitrophenoxy)aniline, 3-nitro-4-phenoxyaniline, 4-(2-chlorophenoxy)aniline, 4-(3-chlorophenoxy)aniline, 4-(4-chlorophenoxy)aniline, 4-(2,4-dichlorophenoxy)aniline, 3-chloro-4-(4-chlorophenoxy)aniline, and 4-(4-chloro-3-tolyloxy)aniline.

Glycidyl ether epoxy resins whose precursors are phenols are also preferably used as the thermosetting resin (D). Examples of such epoxy resins include bisphenol A epoxy resins, bisphenol F epoxy resins, bisphenol S epoxy resins, phenol novolak epoxy resins, cresol novolak epoxy resins, and resorcinol epoxy resins.

Liquid bisphenol A epoxy resins, bisphenol F epoxy resins, and resorcinol epoxy resins are low in viscosity, and they are preferably used in combination with other epoxy resins.

A bisphenol A epoxy resin that is solid at room temperature (around 25° C.) gives a structure having lower cross-linking density in a cured resin than a bisphenol A epoxy resin that is liquid at room temperature (around 25° C.), and thus the cured resin of the former bisphenol A epoxy resin is lower in heat resistance but is higher in toughness. Given this situation, the former bisphenol A epoxy resin is preferably used in combination with a glycidylamine epoxy resin or the liquid bisphenol A epoxy resin or bisphenol F epoxy resin.

Epoxy resins having a naphthalene skeleton gives a cured resin having low water absorptivity and high heat resistance. Biphenyl epoxy resins, dicyclopentadiene epoxy resins, phenol aralkyl epoxy resins, and diphenyl fluorene epoxy resins are also preferably used, because they give cured resins having low water absorptivity.

Urethane-modified epoxy resins and isocyanate-modified epoxy resins give cured resins having high fracture toughness and ductility and thus are preferably used. In addition, resorcinol epoxy resins, glycidylaniline epoxy resins, tetraphenylethane epoxy resins, and triphenylmethane epoxy resins are also preferably used.

These epoxy resins may be used singly or in an appropriate combination. Using at least an epoxy resin having two epoxy groups and an epoxy resin having three or more epoxy groups in combination is preferred, because of the capability of achieving both resin fluidity and heat resistance after curing. Combining a glycidyl amine epoxy and a glycidyl ether epoxy in particular can achieve both heat resistance and water resistance and processability. Combining at least an epoxy resin that is liquid at room temperature and an epoxy resin that is solid at room temperature is effective in appropriately controlling the tackiness and drape properties of a prepreg.

The phenol novolak epoxy resins and the cresol novolak epoxy resins have high heat resistance and low water absorptivity and thus give cured resins having high heat and water resistance. Using these phenol novolak epoxy resins and cresol novolak epoxy resins can adjust the tackiness and drape properties of a prepreg while improving heat and water resistance.

Examples of commercially available products of the bisphenol A epoxy resins include "jER (registered trademark)" 825, 828, 834, 1001, 1002, 1003, 1003F, 1004, 1004AF, 1005F, 1006FS, 1007, 1009, and 1010 (manufactured by Mitsubishi Chemical Corporation). Examples of brominated bisphenol A epoxy resins include jER (registered trademark)" 505, 5050, 5051, 5054, and 5057 (manufactured by Mitsubishi Chemical Corporation). Examples of commercially available hydrogenated bisphenol A epoxy resins include ST5080, ST4000D, ST4100D, and ST5100 (manufactured by Nippon Steel Chemical Co., Ltd).

Examples of commercially available products of the bisphenol F epoxy resins include "jER (registered trademark)" 806, 807, 4002P, 4004P, 4007P, 4009P, and 4010P (manufactured by Mitsubishi Chemical Corporation), "Epiclon (registered trademark)" 830 and 835 (manufactured by DIC Corporation), and "Epotohto (registered trademark)" YDF2001 and YDF2004 (manufactured by Nippon Steel Chemical Co., Ltd). Examples of tetramethyl bisphenol F epoxy resins include YSLV-80XY (manufactured by Nippon Steel Chemical Co., Ltd).

Examples of the bisphenol S epoxy resins include "Epiclon (registered trademark)" EXA-154 (DIC Corporation).

Examples of commercially available products of tetraglycidyldiaminodiphenylmethane include "Sumiepoxy (registered trademark)" ELM434 (manufactured by Sumitomo Chemical Co., Ltd.), YH434L (manufactured by Nippon Steel Chemical Co., Ltd), "jER (registered trademark)" 604 (manufactured by Mitsubishi Chemical Corporation), and "Araldite (registered trademark)" MY720, MY721, and MY725 (manufactured by Huntsman Advanced Materials).

Examples of commercially available products of triglycidylaminophenol and triglycidylaminocresol include "Sumiepoxy (registered trademark)" ELM100 and ELM 120 (manufactured by Sumitomo Chemical Co., Ltd.), "Araldite (registered trademark)" MY0500, MY0510, MY0600, and MY0610 (manufactured by Huntsman Advanced Materials), and "jER (registered trademark)" 630 (manufactured by Mitsubishi Chemical Corporation).

Examples of commercially available products of tetraglycidylxylenediamine and a hydrogenated product thereof include "TETRAD (registered trademark)"-X and "TETRAD (registered trademark)"-C (manufactured by Mitsubishi Gas Chemical Company, Inc.).

Examples of commercially available products of tetraglycidyldiaminodiphenyl sulfone include TG4DAS and TG3DAS (manufactured by Mitsui Fine Chemicals, Inc.)

Examples of commercially available products of diglycidyl-p-phenoxyaniline include PxGAN (manufactured by Toray Fine Chemicals Co., Ltd.) Examples of commercially available products of phenol novolak epoxy resins include "jER (registered trademark)" 152 and 154 (manufactured by Mitsubishi Chemical Corporation) and "Epiclon (registered trademark)" N-740, N-770, and N-775 (manufactured by DIC Corporation).

Examples of commercially available products of the cresol novolak epoxy resins include "Epiclon (registered trademark)" N-660, N-665, N-670, N-673, and N-695 (manufactured by DIC Corporation) and EOCN-1020, EOCN-102S, and EOCN-104S (manufactured by Nippon Kayaku Co., Ltd.).

Examples of commercially available products of the resorcinol epoxy resins include "Denacol (registered trademark)" EX-201 (manufactured by Nagase ChemteX Corporation).

Examples of commercially available products of the glycidylaniline epoxy resins include GAN and GOT (manufactured by Nippon Kayaku Co., Ltd.).

Examples of commercially available products of epoxy resins having a biphenyl skeleton include "jER (registered trademark)" YX4000H, YX4000, and YL6616 (manufactured by Mitsubishi Chemical Corporation) and NC-3000 (manufactured by Nippon Kayaku Co., Ltd.).

Examples of commercially available products of the dicyclopentadiene epoxy resins include "Epiclon (registered trademark)" HP7200L, HP7200, HP7200H, and HP7200HH (manufactured by DIC Corporation), XD-1000-L and XD-1000-2L (manufactured by Nippon Kayaku Co., Ltd.), and "Tactix registered trademark)" 556 (manufactured by Vantico Inc.).

Examples of commercially available products of isocyanate-modified epoxy resins include XAC4151 and AER4152 (manufactured by Asahi Kasei Epoxy Co., Ltd.) and ACR1348 (manufactured by ADEKA Corporation), which have an oxazolidone ring.

Examples of commercially available products of tetraphenylethane epoxy resins include "jER (registered trademark)" 1031 (manufactured by Mitsubishi Chemical Corporation), which is a tetrakis(glycidyloxyphenyl)ethane epoxy resin.

Examples of commercially available products of triphenylmethane epoxy resins include "Tactix registered trademark)" 742 (manufactured by Huntsman Advanced Materials).

The thermosetting resin composition in the prepreg of the present invention can contain the core-shell rubber particles (E). The core-shell rubber particles (E) can improve the microcrack resistance of carbon fiber reinforced composite materials and is thus preferably used. If the thermosetting resin composition contains the core-shell rubber particles (E), it is also effective in improving the mechanical characteristics (tensile strength) of carbon fiber reinforced composite materials passed through a woven fabric prepreg of two or more axes. The core-shell rubber particles mean particles that include particulate core parts with a polymer such as cross-linked rubber as a main component and in which part or the entire of the core surface is covered by a method such as graft polymerizing a polymer different from that of the core parts.

The core part of the core-shell rubber particles (E) may be a polymer polymerized from one or more selected from the group consisting of a conjugated diene monomer, an acrylate monomer, and a methacrylate monomer or a silicone resin. Specific examples thereof include butadiene, isoprene, and chloroprene; the polymer is preferably cross-linked by using one or more of them. In particular, in view of being excellent in the properties of a polymer to be obtained and the easiness of polymerization, the conjugated diene monomer is preferably butadiene, that is, a core component is preferably a polymer polymerized from a monomer containing butadiene. In order to effectively exhibit the environmental fatigue characteristic, that is, microcrack resistance, of the carbon fiber reinforced composite material in the present invention, the glass transition temperature Tg of the core part of the core-shell rubber particles (E) to be contained in the thermosetting resin composition is preferably −50° C. or lower.

A shell component forming the core-shell rubber particles (E) is preferably graft polymerized to the above core component and chemically bonded to polymer particles forming the core component. Examples of the component forming such a shell component include polymers polymerized from one or more selected from (meth)acrylates, aromatic vinyl compounds, and the like. A functional group that reacts with the components contained in the thermosetting resin composition of the present invention, that is, the thermosetting resin (D) or the latent hardener (G), is preferably incorporated into the shell component in order to stabilize a dispersion state. If such a functional group is incorporated, affinity with the thermosetting resin (D) improves, the shell component reacts with the thermosetting resin composition finally to be able to be incorporated into a cured product, and thus favorable dispersibility can be achieved. Consequently, even with a small amount, a sufficient toughness improvement effect can be achieved, and toughness can be improved while maintaining Tg and elastic modulus. Examples of such a functional group include a hydroxy group, a carboxy group, and an epoxy group. Among them, a shell having an epoxy group is preferred.

Examples of a method for incorporating such a functional group into a shell part include a method that graft polymerizes one or more components such as acrylates and methacrylates containing such a functional group to the core surface as a partial component of a monomer.

The volume average particle diameter of the core-shell rubber particles (E) is preferably within the range of 1,000 nm, in particular preferably 50 to 300 nm, and more preferably 50 to 150 nm. The volume average particle diameter can be measured using a Nanotrac particle size distribution measuring apparatus (manufactured by Nikkiso Co., Ltd., the dynamic light scattering method). The volume average particle diameter can also be measured by observing a thin section of a cured product prepared with a microtome with a TEM and using image processing software from the obtained TEM image. In this case, an average value of at least 100 particles is required to be used. If the volume average particle diameter is 50 nm or more, the specific surface area of the core-shell rubber particles (E) is moderately small to provide an energetic advantage, and thus agglomeration is less likely to occur, which gives a high toughness improvement effect. If the volume average particle diameter is 300 nm or less, the distance between the core-shell rubber particles (E) is moderately short, which gives a high toughness improvement effect.

The core-shell rubber particles (E) are manufactured by any known method. Examples of commercially available products of the core-shell rubber particles include "PARALOID (registered trademark)" EXL-2655 (manufactured by Rohm & Haas) formed of a butadiene-alkyl methacrylate-styrene copolymer, "STAPHYLOID (registered trademark)" AC-3355 and TR-2122 (manufactured by Ganz Chemical Co., Ltd.) formed of an acrylate-methacrylate copolymer, and "PARALOID (registered trademark)" EXL-2611 and EXL-3387 (manufactured by Rohm & Haas) formed of a butyl acrylate-methyl methacrylate copolymer. Other examples thereof include core-shell rubber particles having a three-layer structure in which a core layer formed of a glassy polymer having a glass transition temperature of room temperature or more is covered with an intermediate layer formed of a rubbery polymer having a lower Tg, which is further covered with a shell layer such as STAPHYLOID IM-601 and IM-602 (manufactured by Ganz Chemical Co., Ltd.).

These core-shell rubber particles are generally taken out as a bulk and pulverized to be handled as powder. The powdery core-shell rubber is often dispersed in a thermosetting resin composition again. However, this method has a problem in that it is difficult to disperse the particles in an agglomeration-free state, that is, in the state of primary particles stable. With regard to this problem, without taking out the core-shell rubber particles (E) as a bulk in the manufacturing process thereof, they can be finally handled as a component of the thermosetting resin (D), that is, the state of masterbatch dispersed as primary particles within the epoxy resin, for example, thereby giving a favorable dispersion state. The core-shell rubber particles that can be handled as the state of masterbatch can be manufactured by a method disclosed in Japanese Patent Application Laid-open No. 2004-315572, for example. In this manufacturing method, first, a suspension in which core-shell rubber particles are dispersed is obtained using a method that polymerizes core-shell rubber in a water solvent represented by emulsion polymerization, dispersion polymerization, and suspension polymerization. Next, the suspension is mixed with an organic solvent showing partial solubility with water such as ketone solvents such as acetone and methyl ethyl ketone and ether solvents such as tetrahydrofuran and dioxane and is then brought into contact with a water-soluble electrolyte such as sodium chloride and potassium chloride. The organic solvent layer and the water layer are phase separated, and the water layer is isolated and removed to obtain an organic solvent in which the core-shell rubber particles are dispersed. Then, an epoxy resin is mixed therewith, and the organic solvent is evaporated off to obtain masterbatch in which the core-shell rubber particles are dispersed in the epoxy resin as the state of primary particles. Examples of the core-shell rubber particle-dispersing epoxy masterbatch manufactured by the above method include "Kane Ace (registered trademark)" commercially available from Kaneka Corporation.

The amount of the core-shell rubber particles (E) in the thermosetting resin composition is preferably 1 to 12% by mass, more preferably 1 to 10% by mass, and particularly preferably 1 to 5% by mass relative to 100% by mass of the thermosetting resin composition. If the content is 1% by mass or more, a thermosetting resin cured product having higher fracture toughness is obtained. If the content is 12% by mass or less, a cured product having higher elastic modulus is obtained. From the viewpoint of the dispersibility of the core-shell rubber particles (E) in the thermosetting resin composition, the content is preferably 5% by mass or less.

For mixing the core-shell rubber particles (E) with the thermosetting resin composition, methods of dispersion generally used may be used. Examples thereof include methods using a three roll mill, a ball mill, a bead mill, a jet mill, a homogenizer, and a planetary centrifugal mixer, for example. A method mixing the above core-shell rubber particle-dispersing epoxy masterbatch may be preferably used. However, even when they are dispersed in the state of primary particles, heating more than necessary or a decrease in viscosity may cause re-agglomeration. In view of this, in the mixing and kneading of the core-shell rubber particles (E) with other components after dispersion and addition thereof, mixing and kneading are preferably performed within the ranges of temperature and viscosity that do not cause any re-agglomeration of the core-shell rubber particles (E). Specifically, although varying from composition to composition, when kneading is performed at a temperature of 150° C. or more, for example, the viscosity of the composition may decrease to cause agglomeration, and thus kneading is preferably performed at a temperature lower that it. However, when the temperature reaches 150° C. or more during a curing process, the temperature increase is accompanied by gelling, which prevents re-agglomeration, and thus the temperature can exceed 150° C.

The thermosetting resin composition in the prepreg of the present invention can contain at least one block copolymer (H) (hereinafter, may be abbreviated to be referred to as a block copolymer (H)) selected from the group consisting of S-B-M, B-M, and M-B-M. The block copolymer (H) can improve the microcrack resistance of the carbon fiber reinforced composite material and is thus preferably used. Examples of the block copolymer (H) include block copolymers disclosed in Japanese Translation of PCT Application No. 2003-535181 and WO 2006/077153.

The blocks represented by S, B, and M are linked through covalent bond or linked through covalent bond with an intermediate molecule having any chemical structure interposed therebetween.

In the block copolymer (H), the block M is a homopolymer of methyl methacrylate or a copolymer containing methyl methacrylate in an amount of at least 50% by mass. The block B is a polymer block that is incompatible with the block M and has a glass transition temperature (hereinafter, may be denoted by only Tg) of 20° C. or lower. The block S is a polymer block that is incompatible with the blocks B and M and has a glass transition temperature Tg higher than that of the block B.

The glass transition temperature Tg of the thermosetting resin composition and the respective polymer blocks of the block copolymer (H) can be measured by the DMA method using RSAII (manufactured by Rheometrics). Specifically, a traction cycle of 1 Hz is applied to a plate-shaped sample with dimensions of 1×2.5×34 mm at a temperature of from 50 to 250° C., and a maximum tan δ value is determined to be a glass transition temperature Tg. The sample is prepared as follows. In the use of the thermosetting resin composition, an uncured resin composition is defoamed in a vacuum and is then cured in a mold set so as to have a thickness of 1 mm by a 1 mm-thick "Teflon (registered trademark)" spacer at 180° C. (for a case using diaminodiphenyl sulfone) for 2 hours to obtain a voidless plate-shaped cured product. When using the respective block monomers of the block copolymer (H), voidless plates can be obtained similarly using a twin screw extruder. These plate-shaped bodies can be cut out into the above dimensions by a diamond cutter and evaluated.

The fact that any block of S, B, and M is compatible with the thermosetting resin (D) is preferable from the viewpoint of improving toughness. In the present invention, the fact that any block of S, B, and M is compatible with the thermosetting resin (D) can be verified by being dissolved in the thermosetting resin (D) in an uncured state. When all the blocks are not incompatible therewith, they are not dissolved in the thermosetting resin (D) in an uncured state. Verification about such dissolution can be performed by, for example, adding 0.1 parts by mass of the block copolymer (H) of interest to 100 parts by mass of any thermosetting resin (D) and examining whether the block copolymer (H) of interest is dissolved in the thermosetting resin (D) when a mixture of the block copolymer (H) and the thermosetting resin (D) is stirred in an oil bath at 150 to 180° C. for 2 hours.

The amount of the block copolymer (H) in the thermosetting resin composition is preferably 1 to 10 parts by mass, more preferably 2 to 7 parts by mass, and even more preferably 3 to 6 parts by mass relative to 100 parts by mass of the thermosetting resin (D) from the viewpoint of mechanical characteristics and adaptability to a composite production process. If the amount of the block copolymer (H) is less than 1 part by pass, the toughness and plastic deformation performance of the cured product may be insufficient, and the tensile strength of the carbon fiber reinforced composite material may be insufficient. If the amount of the block copolymer (H) exceeds 10 parts by mass, the elastic modulus of the cured product may remarkably decrease to impart insufficient tensile strength to the carbon fiber reinforced composite material, and in addition, resin flow at molding temperature may be insufficient to form the carbon fiber reinforced composite material containing voids.

Incorporating a monomer other than methyl methacrylate into the block M as a copolymerization component in the block copolymer (H) is preferably performed from the viewpoint of compatibility with the thermosetting resin (D) and control of various characteristics of the cured product. The monomer copolymerization component may be any one and can be appropriately selected based on the above viewpoint. In general, in order to obtain compatibility with the thermosetting resin (D) with high polarity, highly polar monomers, especially water-soluble monomer are suitably used. Among them, acrylamide derivatives are suitably used, and dimethylacrylamide is particularly preferable. The copolymerization component of the block M is not limited to an acryl monomer and may be a reactive monomer.

The reactive monomer means a monomer having a functional group that can react with an oxirane group of an epoxy molecule or a functional group of a curing agent. Specific examples include, but not limited to, reactive functional groups such as an oxirane group, an amine group, and a carboxy group. The reactive monomer can be (meth)acrylic acid (compounds including methacrylic acid and acrylic acid are collectively referred to as (meth)acrylic acid)) or any other monomer that produces (meth)acrylic acid) by hydrolysis. The reactive monomer is used as the copolymerization component to improve compatibility with the thermosetting resin (D) and adhesion on epoxy-block copolymer interfaces and is thus preferably used.

Although examples of the other monomer forming the block M include glycidyl methacrylate and tert-butyl methacrylate, the block M preferably contains at least 60% by mass of syndiotactic polymethylmethacrylate (PMMA).

The glass transition temperature Tg of the block B is 20° C. or lower, preferably 0° C. or lower, and more preferably −40° C. or lower. Although a lower glass transition temperature Tg of the block B is preferable from the viewpoint of the toughness of the cured product, a temperature falling short of −100° C. may cause problems in processability, such as roughening on a cut surface, in the use for the carbon fiber reinforced composite material.

The block B is preferably an elastomer block; a monomer for use in synthesizing the elastomer block can be a diene selected from the group consisting of butadiene, isoprene, 2,3-dimethyl-1,3-butadiene, 1,3-pentadiene, and 2-phenyl-1,3-butadiene.

The block B is preferably selected from polydienes, especially polybutadienes, polyisoprenes, and random copolymers thereof and partially or fully hydrogenated polydienes from the viewpoint of the toughness of the cured product. Although examples of polybutadienes include 1,2-polybutadiene (Tg: ca. 0° C.), 1,4-polybutadiene (Tg: ca. −90° C.), which has the lowest glass transition temperature Tg, is more preferably used. This is because using the block M having a lower glass transition temperature Tg is advantageous from the viewpoint of the microcrack resistance of the carbon fiber reinforced composite material and the toughness of the cured product. The block B may be hydrogenated. This hydrogenation is performed in accordance with a normal method.

A monomer for use in synthesizing the elastomer block B is preferably an alkyl(meth)acrylate. Specific examples thereof include ethyl acrylate (−24° C.), butyl acrylate (−54° C.), 2-ethylhexyl acrylate (−85° C.), hydroxyethyl acrylate (−15° C.), and 2-ethylhexyl methacrylate (−10° C.). The numerical values shown in the parentheses following the names of the respective acrylates are Tg of the block B obtained when the respective acrylates are used. Among these, butyl acrylate is preferably used. The acrylate as the monomer for synthesizing the block B is incompatible with the acrylate of the block M containing at least 50% by mass of methyl methacrylate. In particular, the block B preferably contains mainly 1,4-polybutadiene, polybutyl acrylate, and poly(2-ethylhexyl acrylate).

When the triblock copolymer S-B-M is used as the block copolymer (H), the block S is preferably incompatible with the blocks B and M, and its glass transition temperature Tg is preferably higher than that of the block B. Tg or melting point of the block S is preferably 23° C. or more and more preferably 50° C. or more. Examples of the block S include ones obtained from aromatic vinyl compounds such as styrene, α-methyl styrene, and vinyl toluene and ones obtained from alkyl esters of acrylic acids and/or methacrylic acids having 1 to 18 carbon atoms. The block S obtained from the alkyl esters of acrylic acids and/or methacrylic acids having 1 to 18 carbon atoms are incompatible with the block M containing at least 50% by mass of methyl methacrylate.

When the triblock copolymer M-B-M is used as the block copolymer (H), the two blocks M of the triblock copolymer M-B-M may be the same as or different from each other. The same monomer may have different molecular weights.

When both the triblock copolymer M-B-M and a diblock copolymer B-M are used as the block copolymer (H), the block M of the triblock copolymer M-B-M may be the same as or different from the block M of the diblock copolymer B-M, and the block B of the triblock copolymer M-B-M may be the same as or different from the block B of the diblock copolymer B-M.

When both the triblock copolymer S-B-M and the diblock copolymer B-M and/or the triblock copolymer M-B-M are used as the block copolymer (H), the block M of the triblock copolymer S-B-M, each of the blocks M of the triblock copolymer M-B-M, and the block M of the diblock copolymer B-M may be the same as or different from each other, and the respective blocks B of the triblock copolymer S-B-M, the triblock copolymer M-B-M, and the diblock copolymer B-M may be the same as or different from each other.

The block copolymer (H) can be manufactured by anion polymerization and can be manufactured by methods disclosed in European Patent EP 524,054 and European Patent EP 749,987, for example.

Specific examples of the triblock copolymer M-B-M include a copolymer containing methyl methacrylate-butyl acrylate-methyl methacrylate, and examples of commercially available products of the copolymer include "Nanostrength (registered trademark)" M22 and "Nanostrength (registered trademark)" M22N having a polar functional group manufactured by Arkema, Inc. Specific examples of the triblock copolymer S-B-M include a copolymer containing styrene-butadiene-methyl methacrylate, and examples of commercially available products of the copolymer include "Nanostrength (registered trademark)" 123, "Nanostrength (registered trademark)" 250, "Nanostrength (registered trademark)" 012, "Nanostrength (registered trademark)" E20, "Nanostrength (registered trademark)" E20F, "Nanostrength (registered trademark)" E40, and "Nanostrength (registered trademark)" E40F manufactured by Arkema, Inc.

The block copolymer (H) is preferably contained in an amount of 0.1 parts by mass to 30 parts by mass relative to 100 parts by mass of the thermosetting resin (D). The amount is more preferably 1 part by mass to 20 parts by mass, even more preferably 1 part by mass to 10 parts by mass, and particularly preferably 3 to 6 parts by mass. If the amount of the block copolymer (H) is less than 0.1 parts by mass, improvement in toughness may be insufficient. If the amount of the block copolymer (H) exceeds 30 parts by mass, the viscosity of the thermosetting resin composition increases too much, and thus workability may decrease.

The thermosetting resin composition in the prepreg of the present invention is required to contain the thermoplastic resin (F) soluble to the thermosetting resin (D) in order to further improve the microcrack resistance of the carbon fiber reinforced composite material and to improve the mechanical characteristics, especially tensile strength thereof. As described above, the fact that the thermoplastic resin (F) is soluble to the thermosetting resin (D) is important for improving the mechanical characteristics, microcrack resistance, and further solvent resistance of a carbon fiber reinforced composite material to be obtained. If the thermoplastic resin (F) soluble to the thermosetting resin (D) is included, the viscoelasticity of the matrix resin in the prepreg is controlled to improve the handleability of the prepreg.

The thermoplastic resin (F) is in general preferably a thermoplastic resin having a bond selected from the group consisting of a carbon-carbon bond, an amido bond, an imide bond, an ester bond, an ether bond, a carbonate bond, a urethane bond, a thioether bond, a sulfone bond, and a carbonyl bond in its main chain. The thermoplastic resin (F) may partially have a cross-linked structure, may have crystallinity, and may be amorphous. In particular, it is preferable that at least one resin selected from the group consisting of polyamide, polycarbonate, polyacetal, polyphenylene oxide, polyphenylene sulfide, polyalylate, polyester, polyamideimide, polyimide, polyetherimide, polyimide having a phenylene trimethylindan structure, polysulfone, polyethersulfone, polyether ketone, polyether ether ketone, polyaramide, polyether nitrile, and polybenzimidazole be dissolved in the thermosetting resin (D).

In particular, in order to achieve favorable heat resistance, the thermoplastic resin (F) has a glass transition temperature (Tg) of at least 150° C. or more and preferably 170° C. or more. If the glass transition temperature of the thermoplastic resin (F) to be contained is less than 150° C., it may be liable to cause deformation by heat when it is used as a molded body. Furthermore, various terminal groups such as a hydroxy group, an aromatic ring, chloride, a carboxy group, a thiol group, and an acid anhydride can be used as a terminal functional group of the thermoplastic resin (F). Among them, a hydroxy group, a carboxy group, a thiol group, and an acid anhydride, which can react with the thermosetting resin, are excellent in toughness of a cured product to be obtained, resulting in improvement in the microcrack resistance and the mechanical characteristics such as tensile strength of the carbon fiber reinforced composite material, and thus are preferably used. Examples of the thermoplastic resin having a hydroxy group include polyethersulfone, polyvinyl acetal resins such as polyvinyl formal and polyvinyl butyral, and polyvinyl alcohol.

The thermoplastic resin (F) having an aromatic ring and a chlorine terminal has poor affinity with the core-shell rubber particles (E), thereby causing the core-shell rubber particles (E) to be favorably dispersed in the thermosetting resin (D), resulting in improvement in the microcrack resistance of the carbon fiber reinforced composite material, and is thus preferably used. Examples of the thermoplastic resin (F) having an aromatic ring at its terminal include "ULTEM (registered trademark) XH6050 (manufactured by SABIC Innovative Plastics Japan), which is polyether imide. Examples of the thermoplastic resin (F) having a chlorine terminal include "SUMIKAEXCEL (registered trademark)" 3600P, 4100P, 4800P, 5200P, 5400P, and 5900P, which are polyethersulfones.

Among the thermoplastic resin (F) used in the present invention, polyethersulfones having an average molecular weight of 10,000 to 60,000 g/mol are preferably used. The average molecular weight is more preferably 12,000 to 50,000 g/mol and even more preferably 15,000 to 30,000 g/mol. If the average molecular weight is too low, the tack of the prepreg increases too much, and thus handleability may decrease, or the toughness of a cured product may decrease. If the average molecular weight is too high, the tack of the prepreg decreases, and thus handleability may decrease, or when the resin is dissolved in the thermosetting resin, the viscosity of the resin increases, and thus prepreg preparation may be impossible. In particular, when a polyethersulfone having an average molecular weight of 15,000 to 30,000 having high heat resistance is dissolved in the thermosetting resin, a large amount of the thermoplastic resin can be dissolved in the thermosetting resin, and high toughness can be imparted to a cured product to an extent that there is no influence on the process of prepreg preparation, and thus high tensile strength can be imparted to the carbon fiber reinforced composite material while maintaining heat resistance and microcrack resistance.

Specific examples of the thermoplastic resin (F) include "SUMIKAEXCEL (registered trademark)" PES3600P, PES5003P, PES5003PS, PES5200P, PES7600P, and PES7200P (manufactured by Sumitomo Chemical Co., Ltd.), "Ultrason (registered trademark)" E2020P SR and E2021 SR (manufactured by BASF), "GAFONE (registered trademark) 3600RP and 3000RP (manufactured by Solvay Advanced Polymers), and "Virantage" (registered trademark) PESU VW-10200 and PESU VW-10700 (manufactured by Solvay Advanced Polymers), which are commercially available products of polyethersulfone. Other examples include copolymerized oligomers of polyethersulfone and polyether ether sulfone as disclosed in Japanese Translation of PCT Application No. 2004-506789 and "Ultem (registered trademark)" 1000, 1010, 1040, and XH6050 (manufactured by SABIC Innovative Plastics Japan), which are commercially available products of polyether imide. The oligomer indicates a polymer having a relatively low molecular weight in which a finite number of, that is, about 10 to 100 monomers are bonded.

When the thermoplastic resin (F) is dissolved in the thermosetting resin (D), a more favorable result is likely to be given than in a case where they are used singly. The brittleness of the epoxy resin is complemented by the toughness of the thermoplastic resin (F), whereas the difficulty in molding of the thermoplastic resin (F) is complemented by the epoxy resin, thus forming a well-balanced base resin. As for the use ratio (% by mass) of the thermosetting resin (D) and the thermoplastic resin (F), in view of a balance, the thermoplastic resin (F) is preferably contained in a ratio of 1 to 40% by mass, more preferably 5 to 30% by mass, and even more preferably 8 to 20% by mass relative to 100% by mass of the thermosetting resin composition. If the amount of the thermoplastic resin is too large, the thermosetting resin composition increases in viscosity, which may impair the manufacturing processability and handling of the thermosetting resin composition and the prepreg. If the amount of the thermoplastic resin is too small, a cured product of the thermosetting resin has insufficient toughness, and thus a carbon fiber reinforced composite material to be obtained may have insufficient microcrack resistance.

As a combination of the thermosetting resin (D) and the thermoplastic resin (F) of the present invention, a combination of tetraglycidyldiaminodiphenylmethane, which is excellent in heat resistance and adhesion with carbon fibers, and polyethersulfone, which is excellent in heat resistance and toughness, imparts high heat resistance and toughness to a curd product to be obtained and is thus preferably used. A combination of tetraglycidyldiaminodiphenylmethane having an average epoxy equivalent of 100 to 115 g/eq. and polyethersulfone having an average molecular weight of 15,000 to 30,000 g/mol in particular can dissolve a large amount of polyethersulfone having high heat resistance in tetraglycidyldiaminodiphenylmethane, thereby imparting high toughness to the cured product to be obtained without decreasing heat resistance and imparting high tensile strength to the carbon fiber reinforced composite material while maintaining microcrack resistance.

The thermosetting resin composition used in the present invention preferably has an elastic modulus of a thermosetting resin cured product obtained by curing it of 2.5 to 4.5 GPa. The elastic modulus is more preferably 3.0 GPa to 4.5 GPa. If the bending elastic modulus is less than 2.5 GPa, the tensile strength and compressive strength of the carbon fiber reinforced composite material may decrease. If the bending elastic modulus exceeds 4.5 GPa, when a carbon fiber reinforced composite material is formed, residual thermal stress occurring caused by temperature changes increases, which causes interfacial peeling between the carbon fibers and the matrix resin, and consequently, microcracks may not be sufficiently reduced.

The thermosetting resin composition is required to have a high fracture toughness value in order to reduce thermal strain caused by the heat cycle and microcracks starting from interfacial peeling and to prevent, when microcracks occur, them from developing. Specifically, a stress intensity factor K1c in an opening mode of a resin cured product obtained by curing it is preferably 0.65 to 1.5 MPa·m$^{1/2}$. If K1c falls short of 0.65 MPa·m$^{1/2}$, the occurrence of microcracks caused by the heat cycle may not be sufficiently reduced. If K1c exceeds 1.5 MPa·m$^{1/2}$, a decrease in elastic modulus may occur.

The thermosetting resin composition of the present invention is used with the latent hardener (G) contained. The latent hardener (G) described herein is a curing agent for the thermosetting resin (D) used in the present invention. The curing agent is activated by heat to react with a reactive group of the thermosetting resin (D) such as an epoxy group, and the reaction is preferably activated at 70° C. or more. Here, the activation at 70° C. means that a reaction initiation temperature is 70° C. The reaction initiation temperature (hereinafter called activation temperature) can be determined by differential scanning calorimetry (DSC), for example. When an epoxy resin is used as the thermosetting resin (D), specifically, to 100 parts by mass of a bisphenol A epoxy compound having an epoxy equivalent of about 184 to 194, 10 parts by mass of a curing agent to be evaluated is added to produce an epoxy resin composition; the epoxy resin composition is analyzed by differential scanning calorimetry to give an exothermic curve; and the point of intersection of a tangent line at an inflection point of the exothermic curve with a tangent line of the base line is determined to be the reaction initiation temperature.

The latent hardener (G) is preferably an aromatic amine curing agent (G1) or dicyandiamide or a derivative thereof. The aromatic amine curing agent may be any aromatic amines that are used as the epoxy resin curing agent, and specific examples include 3,3'-diaminodiphenyl sulfone (3,3'-DDS), 4,4'-diaminodiphenyl sulfone (4,4'-DDS), diaminodiphenylmethane (DDM), 3,3'-diisopropyl-4,4'-diaminodiphenylmethane, 3,3'-di-t-butyl-4,4'-diaminodiphenylmethane, 3,3'-diethyl-5,5'-dimethyl-4,4'-diaminodiphenylmethane, 3,3'-diisopropyl-5,5'-dimethyl-4,4'-diaminodiphenylmethane, 3,3'-di-t-butyl-5,5'-dimethyl-4,4'-diaminodiphenylmethane, 3,3',5,5'-tetraethyl-4,4'-diaminodiphenylmethane, 3,3'-diisopropyl-5,5'-diethyl-4,4'-diaminodiphenylmethane, 3,3'-di-t-butyl-5,5'-diethyl-4,4'-diaminodiphenylmethane, 3,3',5,5'-tetraisopropyl-4,4'-diaminodiphenylmethane, 3,3'-di-t-butyl-5,5'-diisopropyl-4,4'-diaminodiphenylmethane, 3,3',5,5'-tetra-t-butyl-4,4'- diaminodiphenylmethane, diaminodiphenyl ether (DADPE), bisaniline, benzyldimethylaniline, 2-(dimethyl-aminomethyl)phenol (DMP-10), 2,4,6-tris(dimethylaminomethyl)phenol (DMP-30), and 2,4,6-tris(dimethylaminomethyl)phenol 2-ethylhexanoate. These aromatic amine curing agents may be used singly or as a mixture of two or more of them.

Examples of commercially available products of the aromatic amine curing agent (G1) include SEIKACURE S (manufactured by Wakayama Seika Kogyo Co., Ltd.), MDA-220 (manufactured by Mitsui Chemicals, Inc.), "jER Cure (registered trademark)" W (manufactured by Japan Epoxy Resin Co., Ltd.), 3,3'-DAS (manufactured by Mitsui Chemicals, Inc.), "Lonzacure (registered trademark)" M-DEA, M-DIPA, M-MIPA, and "Lonzacure (registered trademark)" DETDA 80 (manufactured by Lonza).

The dicyandiamide or a derivative thereof is a compound reacted using at least one of an amino group, an imino group, and a cyano group and is a compound obtained by prereacting an epoxy group of an epoxy compound for use in an epoxy resin composition with an amino group, an imino group, or a cyano group of o-tolylbiguanide, diphenylbiguanide, or dicyandiamide, for example. Examples of commercially available products of dicyandiamide include DICY-7 and DICY-15 (manufactured by Japan Epoxy Resin Co., Ltd.).

As the curing agent except the aromatic amine curing agent (G1), amines such as alicyclic amines, phenol compounds, acid anhydrides, polyaminoamides, organic acid hydrazides, and isocyanates may be used in combination with the aromatic amine curing agent.

A preferred combination of the sizing agent of the present invention and the latent hardener (G) is as below. The sizing agent and the latent hardener (G) are mixed so that the amine equivalent/epoxy equivalent rate of the sizing agent to be applied and the latent hardener (G) would be 0.9, and the glass transition point is determined immediately after the mixing and after storage in an environment at a temperature of 25° C. and 60% RH for 20 days. A preferred combination of the sizing agent and the latent hardener (G) has an increase in glass transition point of 25° C. or lower after 20 days. When the combination having an increase in glass transition point of 25° C. or lower is used to produce a prepreg, the reaction of the outer layer of the sizing agent with the inside of a matrix resin is suppressed, and this suppresses the deterioration of mechanical characteristics such as tensile strength of a carbon fiber reinforced composite material produced after the prepreg is stored for a long period of time. Such a combination is thus preferred. The increase in glass transition point is more preferably 15° C. or lower. The increase in glass transition point is even more preferably 10° C. or lower. The glass transition point can be determined by differential scanning calorimetry (DSC).

When the aromatic amine curing agent (G1) is used as the latent hardener (G), it is contained in an amount of preferably 20 to 70 parts by mass and more preferably 30 to 50 parts by mass relative to 100 parts by mass of the thermosetting resin (D) from the viewpoint of heat resistance and mechanical characteristics. If the amount of the aromatic amine curing agent is less than 20 parts by mass, a cured product is insufficiently cured, and thus a carbon fiber reinforced composite material may have decreased mechanical characteristics such as tensile strength and compressive strength. If the amount of the aromatic amine curing agent exceeds 70 parts by mass, the crosslinking density of the thermosetting resin cured product increases too much, and thus the carbon fiber reinforced composite material may have decreased microcrack resistance.

When dicyandiamide or a derivative thereof is used as the latent hardener (G), it is contained in an amount of preferably 1 to 10 parts by mass and more preferably 2 to 8 parts by mass relative to 100 parts by mass of the thermosetting resin (D) from the viewpoint of heat resistance and mechanical characteristics. If the amount of dicyandiamide or a derivative thereof is less than 1 part by mass, a cured product is insufficiently cured, and thus a carbon fiber reinforced composite material may have decreased tensile strength and compressive strength. If the amount of dicyandiamide or a derivative thereof exceeds 10 parts by mass, the crosslinking density of the thermosetting resin cured product increases too much, and thus the carbon fiber reinforced composite material may have decreased microcrack resistance. If dicyandiamide or a derivative thereof is included as powder in the resin, it is preferable from the viewpoint of long-term storage stability at room temperature and viscosity stability at prepreg preparation. When dicyandiamide or a derivative thereof is used as powder, its average particle diameter is preferably 10 μm or less and more preferably 7 μm or less. If it exceeds 10 when it is used for a prepreg, for example, when the carbon fibers are impregnated with the thermosetting resin composition by applying heat and pressure, the powder of dicyandiamide or a derivative thereof does not enter carbon fiber bundles to be left in a carbon fiber bundle surface layer.

When an epoxy resin is used as the thermosetting resin (D), the latent hardener (G) is preferably contained in a total amount so as to give an amount of an active hydrogen group ranging from 0.6 to 1.2 equivalents and more preferably ranging from 0.7 to 0.9 equivalent relative to 1 equivalent of epoxy group in all the epoxy resin components. Here, the active hydrogen group is a functional group that can react with the epoxy group of a curing agent component. If the amount of the active hydrogen group is less than 0.6 equivalent, a cured product may have insufficient reaction rate, heat resistance, and elastic modulus, and a carbon fiber reinforced composite material may have insufficient glass transition temperature and strength. If the amount of the active hydrogen group is more than 1.2 equivalents, a cured product has sufficient reaction rate, glass transition temperature, and elastic modulus but has insufficient plastic deformability, and thus a carbon fiber reinforced composite material may have insufficient microcrack resistance.

A curing accelerator may be contained in order to accelerate the curing.

Examples of the curing accelerator include urea compounds, tertiary amines and salts thereof, imidazole and salts thereof, triphenylphosphine and derivatives thereof, metal carboxylates, and Lewis acids, Bronsted acids, and salts thereof. Among them, urea compounds are suitably used from the viewpoint of the balance between long-term storage stability and catalytic ability. In particular, a combination of a urea compound and dicyandiamide as the latent hardener (G) is suitably used.

Examples of the urea compound include N,N-dimethyl-N'-(3,4-dichlorophenyl)urea, toluene bis(dimethylurea), 4,4'-methylene bis(phenyldimethylurea), and 3-phenyl-1,1-dimethylurea. Examples of commercially available products of the urea compound include DCMU99 (manufactured by Hodogaya Chemical Co., Ltd.) and "Omicure (registered trademark)" 24, 52, and 94 (manufactured by Emerald Performance Materials, LLC).

The urea compound is preferably contained in an amount of 1 to 4 parts by mass relative to 100 parts by mass of all the epoxy resin components. If the urea compound is contained in an amount of less than 1 part by mass, a reaction may insufficiently proceed to give a cured product having insufficient elastic modulus and heat resistance. If the urea compound is contained in an amount of more than 4 parts by mass, the self-polymerization of the thermosetting resin (D) interferes with the reaction between the thermosetting resin (D) and the latent hardener (G), and thus the cured product may have insufficient toughness or a lower elastic modulus.

In addition, the composition may contain the thermosetting resin (D) and the latent hardener (G) or a prereacted product of some of them. The technique may be effective in viscosity control or improvement in long-term storage stability.

Including thermoplastic resin particles in the thermosetting resin composition used in the present invention is also preferable. If the thermoplastic resin particles are included, the toughness of the matrix resin improves, and microcrack resistance improves when the composition is used in a carbon fiber reinforced composite material.

The material of the thermoplastic resin particles used in the present invention can be ones similar to the various thermoplastic resins (F) exemplified above and thermoplastic resins that can be used mixed with the thermosetting resin composition. Among them, polyamides are most preferred. Among the polyamides, nylon 12, nylon 6, nylon 11, nylon 6/12 copolymer, and a nylon (semi-IPN nylon) modified to have a semi-IPN (interpenetrating polymer network) with an epoxy compound disclosed in Example 1 of Japanese Patent Application Laid-open No. 1-104624 impart particularly good adhesive strength with the epoxy resin. The shape of the thermoplastic resin particles may be spherical particles, aspherical particles, or porous particles; spherical ones do not reduce the fluidity of the resin and thus are excellent in viscoelasticity and has no starting point of stress concentration, thereby imparting high microcrack resistance, and thus are preferable. Examples of commercially available products of polyamide particles include SP-500, SP-10, TR-1, TR-2, 842P-48, and 842P-80 (manufactured by Toray Industries Inc.), "Toraypearl (registered trademark)" TN (manufactured by Toray Industries Inc.), and "Orgasol (registered trademark)" 1002D, 2001UD, 2001EXD, 2002D, 3202D, 3501D, and 3502D (manufactured by Arkema, Inc.).

In the present invention, the amount of the thermoplastic resin particles is preferably 0.1 to 30% by mass, more preferably 1 to 20% by mass, and even more preferably 5 to 15% by mass relative to 100% by mass of the thermosetting resin composition. If the amount of the thermoplastic resin particles is too large, mixing with the thermosetting resin (D) as the base resin is difficult, and the tack and drape properties of the prepreg may decrease. If the amount of the thermoplastic resin particles is too small, the impact resistance, microcrack resistance, and interlayer toughness of a carbon fiber reinforced composite material to be obtained may decrease.

The thermosetting resin composition used in the present invention can contain coupling agents, conductive particles such as carbon particles and metal-plated organic particles, thermosetting resin particles, inorganic fillers such as silica gel, nano silica, and clay, and conductive fillers to an extent not impairing the effect of the present invention. The conductive particles and conductive fillers can improve the conductivity of a resin cured product and a carbon fiber reinforced composite material to be obtained and thus are preferably used.

Examples of the conductive fillers include carbon black, carbon nanotubes, vapor grown carbon fibers (VGCF), fullerenes, and metallic nanoparticles; they may be used singly or in combination. Among them, carbon black, which is low-priced and highly effective, is preferably used. Examples of the carbon black include furnace black; acetylene black, thermal black, channel black, and Ketjen black. Carbon black obtained by blending two or more of them is also preferably used.

The thermosetting resin composition used in the present invention, containing the above materials in a certain ratio, can provide a prepreg that is excellent in adhesion between the matrix resin and the carbon fibers and long-term storage stability and has both excellent tensile strength and microcrack resistance.

Next, a method for manufacturing a prepreg of the present invention will be described.

The prepreg of the present invention is prepared by impregnating sizing agent-coated carbon fiber bundles in the form of fabric or braid with a thermosetting resin composition as a matrix resin. The prepreg can be manufactured, for example, by a wet method of dissolving the matrix resin in a solvent such as methyl ethyl ketone and methanol to reduce the viscosity and impregnating carbon fiber bundles with the solution and a hot melting method of heating a thermosetting resin composition to reduce the viscosity and impregnating carbon fiber bundles with the resin.

In the wet method, a prepreg is prepared by immersing sizing agent-coated carbon fiber bundles in a solution containing a matrix resin, then pulling up the carbon fiber bundles, and evaporating the solvent with an oven or other units.

In the hot melting method, a prepreg is prepared by a method of directly impregnating sizing agent-coated carbon fiber bundles with a matrix resin having a viscosity lowered by heat or a method of once preparing a coating film of a thermosetting resin composition on a release paper or the like, next superimposing the film on each side or one side of sizing agent-coated carbon fiber bundles, and applying heat and pressure to the film to impregnate the sizing agent-coated carbon fiber bundles with the thermosetting resin composition. The hot melting method is preferred because no solvent remains in the prepreg.

The method for forming a carbon fiber reinforced composite material by using the prepreg of the present invention is exemplified by a method of stacking prepregs and thermally curing a matrix resin while applying pressure to the laminate.

Examples of the method of applying heat and pressure include press molding, autoclave molding, bagging molding, a wrapping tape method, and internal pressure molding method. To specifically produce sporting goods, the wrapping tape method and the internal pressure molding method are preferably employed. For aircraft application necessitating a high quality and high performance carbon fiber reinforced composite material, the autoclave molding is preferably employed. To produce various vehicle exteriors, the press molding is preferably employed.

The prepreg of the present invention preferably has a carbon fiber mass fraction of 40 to 90% by mass and more preferably 50 to 80% by mass. If the carbon fiber mass fraction is too low, a carbon fiber reinforced composite material to be obtained excessively increases in mass, and thus the advantages of the carbon fiber reinforced composite material being excellent in specific intensity and specific modulus of elasticity may be impaired. If the carbon fiber mass fraction is too high, an impregnation failure of the matrix resin composition occurs, a carbon fiber reinforced composite material to be obtained is liable to have many voids, and thus its mechanical characteristics may largely decrease.

The prepreg of the present invention preferably has a structure in which a layer rich in the thermoplastic resin particles, that is, a layer (hereinafter, may be abbreviated as a particle layer) whose state in which the thermoplastic resin particles are locally present can be clearly verified when its cross section is observed is formed near the surface of the prepreg.

By employing such a structure, when a carbon fiber reinforced composite material is formed by stacking prepregs and curing an epoxy resin, resin layers are likely to be formed between prepreg layers, that is, carbon fiber reinforced composite material layers, thereby improving adhesion between the carbon fiber reinforced composite material layers and causing a carbon fiber reinforced composite material to be obtained to exhibit high impact resistance, microcrack resistance, and interlayer toughness.

The particle layer may be present only on one side or both sides. When it is present only on one side, the prepreg has the front and the back, and caution is necessary. If making mistakes in stacking the prepregs to give an interlayer containing particles and an interlayer not containing particles, a carbon fiber reinforced composite material that is weak to impact is formed. In order to eliminate the distinction between the front and the back and facilitate stacking, the particle layer is preferably present on both sides of the prepregs.

The present ratio of the thermoplastic resin particles present within the particle layer is preferably 90 to 100% by mass and more preferably 95 to 100% by mass relative to a total of 100% by mass of the thermoplastic resin particles in the prepreg.

In the present invention, in addition to the method of using a prepreg, a carbon fiber reinforced composite material can be produced by any molding method such as a hand lay-up method, RTM, "SCRIMP" (registered trademark), filament winding, a pultrusion method, and a resin film infusion method, which are appropriately selected for a purpose. Any of the molding method can be employed to produce a carbon fiber reinforced composite material containing the sizing agent-coated carbon fibers and a cured product of the thermosetting resin composition.

The carbon fiber reinforced composite material of the present invention is preferably used for aircraft structural members, windmill blades, automotive outer panel, computer applications such as IC trays and casings (housings) of notebook computers, and sporting goods such as golf shafts, bats, and rackets for tennis and badminton.

EXAMPLES

The present invention will next be specifically described with reference to examples, but the invention is not limited to these examples. The production environment and evaluation of the prepregs of the following examples were performed in an atmosphere of a temperature of 25±2° C. and 50% RH (relative humidity) unless otherwise specified.

(1) X-Ray Photoelectron Spectroscopy for Sizing Agent Surfaces of Sizing Agent-Coated Carbon Fibers In the present invention, the peak ratio of (a) and (b) on the surface of a sizing agent of sizing agent-coated carbon fibers was determined by X-ray photoelectron spectroscopy in accordance with the procedure below. Sizing agent-coated carbon fibers were cut into 20-mm pieces, and the pieces were spread and arranged on a copper sample holder. AlK$\alpha_{1,2}$ was used as the X-ray source, and the measurement was carried out while the inside of a sample chamber was maintained at $1\times10^{-8}$ Torr. The measurement was carried out at a photoelectron takeoff angle of 15°. As the correction for the peak associated with electrification during measurement, the binding energy value of the main peak of $C_{1s}$ was set to 286.1 eV, first. At this time, the $C_{1s}$ peak area was determined by drawing a straight base line in a range from 282 to 296 eV. The straight base line from 282 to 296 eV for calculating the $C_{1s}$ peak area was defined as the origin point (zero point) for photoelectron intensity, the height (b) (cps: photoelectron intensity per unit time) of the peak at a binding energy of 286.1 eV assigned to a C—O component and the height (a) (cps) of the component at a binding energy of 284.6 eV assigned to CHx, C—C, and C=C were determined, and the (a)/(b) ratio was calculated.

If the peak height (b) is larger than the peak height (a) where the binding energy value of the main peak of $C_{1s}$ is set to 286.1, peaks of $C_{1s}$ do not fall within a range of 282 to 296 eV. In such a case, the binding energy value of the main peak of $C_{1s}$ was set to 284.6 eV, and then the (a)/(b) ratio was calculated in accordance with the procedure above.

(2) Strand Tensile Strength and Elastic Modulus of Carbon Fiber Bundles

The strand tensile strength and the strand elastic modulus of carbon fiber bundles were determined by the test method of resin-impregnated strand described in JIS-R-7608 (2004) in accordance with the procedure below. The resin formulation was "Celloxide (registered trademark)" 2021P (manufactured by Daicel Chemical Industries, Ltd.)/boron trifluoride monoethylamine (manufactured by Tokyo Chemical Industry Co., Ltd.)/acetone=100/3/4 (parts by mass), and the curing conditions were at normal pressure at a temperature of 125° C. for 30 minutes. Ten strands of carbon fiber bundles were tested, and mean values were calculated as the strand tensile strength and the strand elastic modulus.

(3) Washing of Sizing Agent of Sizing Agent-Coated Carbon Fibers

In 50 ml of acetone, 2 g of sizing agent-coated carbon fibers were immersed and subjected to ultrasonic cleaning for 30 minutes three times. Subsequently, the carbon fibers were immersed in 50 ml of methanol and subjected to ultrasonic cleaning for 30 minutes once, and were dried.

(4) X-Ray Photoelectron Spectroscopy of Sizing Agent-Coated Carbon Fibers at 400 eV In the present invention, the peak ratio of (a) and (b) on the surface of a sizing agent of sizing agent-coated carbon fibers was determined by X-ray photoelectron spectroscopy in accordance with the procedure below. Sizing agent-coated carbon fibers and sizing agent-coated carbon fibers from which the sizing agent was washed were cut into 20-mm pieces, and the pieces were spread and arranged on a copper sample holder. Saga synchrotron radiation was used as an X-ray source, and the measurement was carried out at an excitation energy of 400 eV while the inside of a sample chamber was maintained at $1\times10^{-8}$ Torr. The measurement was carried out at a photoelectron takeoff angle of 55°. As the correction for the peak associated with electrification during measurement, the binding energy value of the main peak of $C_{1s}$ was set to 286.1 eV, first. At this time, the $C_{1s}$ peak area was determined by drawing a straight base line in a range from 282 to 296 eV. The straight base line from 282 to 296 eV for calculating the $C_{1s}$ peak area was defined as the origin point (zero point) for photoelectron intensity, the height (b) (cps: photoelectron intensity per unit time) of the peak at a binding energy of 286.1 eV assigned to a C—O component and the height (a) (cps) of the component at a binding energy of 284.6 eV assigned to CHx, C—C, and C=C were determined, and the (a)/(b) ratio was calculated.

If the peak height (b) is larger than the peak height (a) where the binding energy value of the main peak of $C_{1s}$ is set to 286.1, peaks of $C_{1s}$ do not fall within a range of 282 to 296 eV. In such a case, the binding energy value of the main peak of $C_{1s}$ was set to 284.6 eV, and then the (a)/(b) ratio was calculated in accordance with the procedure above.

(5) Surface Oxygen Concentration (O/C) of Carbon Fibers

The surface oxygen concentration (O/C) of carbon fibers was determined by X-ray photoelectron spectroscopy in accordance with the procedure below. First, a solvent was used to remove dust adhering to the surfaces of carbon fibers, then the carbon fibers were cut into about 20-mm pieces, and the pieces were spread on a copper sample holder. Next, the sample holder was set in a sample chamber, and the inside of the sample chamber was maintained at $1\times10^{-8}$ Torr. AlK$\alpha_{1,2}$ was used as the X-ray source, and the measurement was carried out at a photoelectron takeoff angle of 90°. As the correction value of the peak associated with electrification during measurement, the binding energy value of the main peak (peak top) of $C_{1s}$ was set to 284.6 eV. The $C_{1s}$ peak area was determined by drawing a straight base line in a range from 282 to 296 eV. The $O_{1s}$ peak area was determined by drawing a straight base line in a range from 528 to 540 eV. Here, the surface oxygen concentration is determined as an atom number ratio, using a sensitivity correction value inherent in an apparatus, from the ratio of the $O_{1s}$ peak area and the $C_{1s}$ peak area. The X-ray photoelectron spectrometer used was ESCA-1600 manufactured by Ulvac-Phi, Inc., and the sensitivity correction value inherent in the apparatus was 2.33.

(6) Surface Carboxy Group Concentration (COOH/C) and Surface Hydroxy Group Concentration (COH/C) of Carbon Fibers A surface hydroxy group concentration (COH/C) was determined by chemical modification X-ray photoelectron spectroscopy in accordance with the procedure below.

First, carbon fiber bundles from which a sizing agent and the like had been removed with a solvent were cut into pieces, and the pieces were spread and arranged on a platinum sample holder. The pieces were exposed to a dry nitrogen gas containing 0.04 mol/L of trifluoroacetic anhydride gas at room temperature for 10 minutes, undergoing chemical modification treatment. Then, the treated pieces were mounted on an X-ray photoelectron spectrometer at a photoelectron takeoff angle of 35°. AlK$\alpha_{1,2}$ was used as the X-ray source, and the inside of the sample chamber was maintained at a degree of vacuum of $1\times10^{-8}$ Torr. As the correction for the peak associated with electrification during measurement, the binding energy value of the main peak of $C_{1s}$ was set to 284.6 eV, first. The $C_{1s}$ peak area [$C_{1s}$] was determined by drawing a straight base line in a range from 282 to 296 eV, and $F_{1s}$ peak area [$F_{1s}$] was determined by drawing a straight base line in a range from 682 to 695 eV. The reaction rate r was determined from $C_{1s}$ peak splitting of polyvinyl alcohol simultaneously subjected to chemical modification treatment.

The surface hydroxy group concentration (COH/C) is expressed by the value calculated in accordance with the equation below.

$$COH/C=\{[F_{1s}]/(3k[C_{1s}]-2[F_{1s}])r\}\times100(\%)$$

In the equation, k is a sensitivity correction value inherent in the apparatus for the $F_{1s}$ peak area relative to the $C_{1s}$ peak area, and the sensitivity correction value inherent in the apparatus was 3.919 for model SSX-100-206 manufactured by SSI, USA.

A surface carboxy group concentration (COOH/C) was determined by chemical modification X-ray photoelectron spectroscopy in accordance with the procedure below. First, carbon fiber bundles from which a sizing agent and the like had been removed with a solvent were cut into pieces, and the pieces were spread and arranged on a platinum sample holder. The pieces were exposed to air containing 0.02 mol/L of trifluoroethanol gas, 0.001 mol/L of dicyclohexylcarbodiimide gas, and 0.04 mol/L of pyridine gas at 60° C. for 8 hours, undergoing chemical modification treatment. Then, the treated pieces were mounted on an X-ray photoelectron spectrometer at a photoelectron takeoff angle of 35°. AlK$\alpha_{1,2}$ was used as the X-ray source, and the inside of the sample chamber was maintained at a degree of vacuum of $1\times10^{-8}$ Torr. As the correction for the peak associated with electrification during measurement, the binding energy value of the main peak of $C_{1s}$ was set to 284.6 eV, first. The $C_{1s}$ peak area [$C_{1s}$] was determined by drawing a straight base line in a range from 282 to 296 eV, and the $F_{1s}$ peak area [$F_{1s}$] was determined by drawing a straight base line in a range from 682 to 695 eV. The reaction rate r was determined from $C_{1s}$ peak splitting of polyacrylic acid simultaneously subjected to chemical modification treatment, and the residual rate m of a dicyclohexylcarbodiimide derivative was determined from $O_{1s}$ peak splitting.

The surface carboxy group concentration COOH/C is expressed by the value calculated in accordance with the equation below.

$$COOH/C=\{[F_{1s}]/(3k[C_{1s}]-(2+13m)[F_{1s}])r\}\times100(\%)$$

In the equation, k is a sensitivity correction value inherent in the apparatus for the $F_{1s}$ peak area relative to the $C_{1s}$ peak area, and the sensitivity correction value inherent in the apparatus was 3.919 for model SSX-100-206 manufactured by SSI, USA.

(7) Epoxy Equivalent of Sizing Agent and Epoxy Equivalent of Sizing Agent Applied onto Carbon Fibers The epoxy equivalent of a sizing agent was determined by dissolving a sizing agent from which a solvent was removed in N,N-dimethylformamide, then cleaving the epoxy group with hydrochloric acid, and carrying out acid-base titration. The epoxy equivalent of a sizing agent applied onto carbon fibers was determined by immersing sizing agent-coated carbon fibers in N,N-dimethylformamide, carrying out ultrasonic cleaning to extract the sizing agent from the fibers, then cleaving the epoxy group with hydrochloric acid, and carrying out acid-base titration.

(8) Increase in Glass Transition Point

A sizing agent and the latent hardener (G) were mixed so as to give an amine equivalent/epoxy equivalent ratio of 0.9, and the glass transition temperature of the prepared mixture was determined with a differential scanning calorimeter (DSC) in accordance with JIS K7121 (1987). Into a sealable sample container having a volume of 50 μl, 3 to 10 mg of a sample (test piece) was charged, then the temperature was raised at a rate of temperature rise of 10° C./min from 30 to 350° C., and the glass transition temperature was determined. The measurement equipment used here was a differential scanning calorimeter (DSC) manufactured by TA Instruments.

Specifically, in a steplike change area in the DSC curve obtained, a temperature at the intersection point of a straight line vertically equidistant from straight lines extending from base lines, and a curve in the steplike change area of glass transition was regarded as the glass transition temperature.

Next, the prepared mixture was stored in an environment at a temperature of 25° C. and 60% RH for 20 days, and the glass transition temperature was determined by the procedure above. An increase in temperature from the initial state was regarded as the increase in glass transition point (corresponding to "ΔTg with a curing agent" in Tables).

(9) Method of Determining Adhesion Amount of Sizing Agent

About 2 g of sizing agent-coated carbon fiber bundles were weighed (W1) (to the fourth decimal place) and then placed in an electric furnace (a volume of 120 cm$^3$) set at a temperature of 450° C. for 15 minutes in a nitrogen stream of 50 mL/min, and consequently the sizing agent was completely thermally decomposed. Next, the carbon fiber bundles were transferred into a container in a dry nitrogen stream of 20 L/min, then cooled for 15 minutes, and weighed (W2) (to the fourth decimal place). The adhesion amount of the sizing agent was calculated in accordance with the equation, W1−W2. The adhesion amount of the sizing agent was converted into a value (round off the number to the second decimal place) relative to 100 parts by mass of the carbon fiber bundles to be parts by mass of the sizing agent coated. The measurement was carried out twice, and the mean value was regarded as the parts by mass of the sizing agent.

(10) Measurement of Interfacial Shear Strength (IFSS)

The interfacial shear strength (IFSS) was determined in accordance with the procedures (I) to (IV).

(I) Preparation of Resin

Into corresponding containers, 100 parts by mass of bisphenol A epoxy compound "jER (registered trademark)" 828 (manufactured by Mitsubishi Chemical Corporation) and 14.5 parts by mass of m-phenylenediamine (manufactured by Sigma-Aldrich Japan) were placed. Then, in order to reduce the viscosity of jER828 and to dissolve m-phenylenediamine, each was heated at a temperature of 75° C. for 15 minutes. Then, both were mixed, and the mixture was degassed in vacuo at a temperature of 80° C. for about 15 minutes.

(II) Fixation of Single Carbon Fiber onto Special Mold

From carbon fiber bundles, a single fiber was taken out, and both ends of the single fiber were fixed onto the longitudinal ends of a dumbbell mold while a constant tension was applied to the single fiber. Then, in order to remove water on the carbon fiber and the mold, the single fiber and the mold were subjected to vacuum drying at a temperature of 80° C. for 30 minutes or more. The dumbbell mold was made of silicone rubber and had a cast molding shape with a central width of 5 mm, a length of 25 mm, an end width of 10 mm, and a total length of 150 mm.

(III) From Casting to Curing of Resin

Into the mold after vacuum drying in accordance with the procedure (II), the resin prepared in accordance with the procedure (I) was cast. By using an oven, the temperature of the mold was raised at a rate of temperature rise of 1.5° C./min to 75° C., and the temperature was maintained for 2 hours. Next, the temperature was raised at a rate of temperature rise of 1.5° C./min to 125° C., and the temperature was maintained for 2 hours. Then, the temperature was dropped at a rate of temperature drop of 2.5° C./min to 30° C. Subsequently, the mold was removed to give a test piece.

(IV) Measurement of Interfacial Shear Strength (IFSS)

To the test piece obtained in the procedure (III), a tensile force was applied in a fiber axis direction (longitudinal direction) to cause a distortion of 12%, and the number N of fiber breakages was determined in a central region of 22 mm on the test piece. Next, an average length of broken fibers la was calculated in accordance with the equation, la (μm)=22×1,000 (μm)/N. Then, from the average length of broken fibers la, a critical fiber length lc was calculated in accordance with the equation, lc (μm)=(4/3)×la (μm). The strand tensile strength a and the diameter d of a single carbon fiber were determined, and an interfacial shear strength, IFSS, was calculated as an index of the adhesive strength between carbon fibers and a resin interface in accordance with the equation below. In Examples, the test result was the average of results of the measurement number n=5.

Interfacial shear strength IFSS (MPa)=σ (MPa)×$d$ (μm)/(2×$lc$) (μm)

(11) Measurement of Volume Average Particle Diameter of Core-Shell Rubber Particles The volume average particle diameter of the core-shell rubber particles (E) was measured by a Nanotrac particle size distribution measuring apparatus UPA-EX150 (manufactured by Nikkiso Co., Ltd.) in accordance with JIS Z8826 (2005).

(12) Measurement of Bending Elastic Modulus of Cured Product of Thermosetting Resin Composition (I) Preparation of Thermosetting Resin Composition A thermosetting resin composition was prepared in accordance with the procedure below. The epoxy resin (D) and the thermoplastic resin (F) that is soluble to the epoxy resin were mixed while being heated at 150° C. and were uniformly dissolved. The mixture was cooled to 80° C. or lower, the core-shell rubber particles (E), rubber particles other than the core-shell rubber particles (E), and thermoplastic resin particles were added thereto and kneaded, and the latent hardener (G) was added thereto and kneaded to prepare a thermosetting resin composition.

(II) Preparation of Cured Product of Thermosetting Resin Composition

The resin composition prepared by the method in (I) was defoamed in a vacuum, was heated in a mold set so as to have a thickness of 2 mm with a 2 mm-thick "Teflon" (registered trademark) spacer at a rate of temperature rise of 1.5° C./min to 180° C., and was cured for two hours to obtain a 2 mm-thick resin cured plate.

(III) Measurement of Bending Elastic Modulus

A test piece with dimensions of a width of 10 mm and a length of 55 mm was cut out of the resin cured plate obtained in (II), and using an Instron universal tester, with a span length of 32 mm and a crosshead speed of 2.5 ram/min, three-point bending was performed therefor in accordance with JIS K7171 (1999) to obtain bending elastic modulus. For the number of samples n=5, their average value was acquired.

(13) Fracture Toughness Test (K1c) on Cured Product of Thermosetting Resin Composition The resin composition prepared by the method in (12) (I) was defoamed in a vacuum, was heated in a mold set so as to have a thickness of 6 mm with a 6 mm-thick "Teflon" (registered trademark) spacer at a rate of temperature rise of 1.5° C./min to 180° C., and was cured for two hours to obtain a 6 mm-thick resin cured product. The resin cured product was cut with dimension of 12.7×150 mm to obtain a test piece. Using an Instron universal tester, processing of a test piece and an experiment were performed in accordance with ASTM D5045. Introduction of an initial crack to the test pieces was performed by bringing a blade of a razor cooled to the liquid nitrogen temperature into contact with the test piece and applying impact to the razor with a hammer. The fracture toughness of the resin cured product is evaluated with critical stress strength of the deformation mode 1 (opening type).

(14) Measurement of 0° Tensile Strength of Carbon Fiber Reinforced Composite Material (I) Preparation of Prepreg The resin composition prepared by the method in (12) (I) was applied onto a release paper using a knife coater to prepare a resin film. The resin films were laminated onto both sides of a carbon fiber fabric, which was impregnated with the resin by applying heat and pressure, and a prepreg formed of the carbon fiber fabric and the thermosetting resin composition was produced.

(II) 0° Tensile Strength

The prepreg produced in (I) within 24 hours after production was cut into pieces with a predetermined size, with the warp direction of the carbon fiber fabric defined as 0°, [±45/0/±45/90°] as a base was repeated twice and was symmetrically stacked (a total of 16 stacked). This was vacuum bagged, was heated at a rate of temperature rise of 1.5° C./min to 180° C. using an autoclave, and was cured at a pressure of 6 atmospheres for 2 hours to obtain a stacked plate formed of the carbon fiber reinforced composite material. The stacked plate was cut into dimensions of a width of 12.7 mm and a length of 230 mm, and tabs formed of glass fiber reinforced plastic with 1.2 mm and a length of 50 mm were attached to both ends thereof to obtain a test piece. For the thus obtained test piece, a tensile test was performed using an Instron universal tester with a crosshead speed of 1.27 mm/min.

(15) 0° Tensile Strength of Prepreg after Storage

The prepreg of (14) (I) was stored at a temperature of 25° C. and 60% RH for 20 days, and 0° tensile strength measurement therefor was performed in a similar manner to (14) (II).

(16) Microcrack Resistance

A stacked plate of the carbon fiber reinforced composite material obtained by a similar method to (14) (II) was cut into dimensions of 75 mm×50 mm with a diamond cutter to obtain a test piece. The test piece was exposed to environmental conditions as shown in the procedures of a, b, and c below using a thermohygrostat and an environmental tester available in the market.

a. Using the commercially available thermohygrostat, the test piece was exposed to an environment of 49° C. and 95% RH for 12 hours.

b. After being exposed, the test piece was moved to the commercially available environmental tester and was first exposed to an environment of −54° C. for 1 hour. The temperature was then raised at a rate of temperature rise of 10° C.±2° C./rain to 71° C. After the temperature rise, after being held at 71° C. for 5 minutes±1 minute, the temperature was dropped at a rate of temperature drop of 10° C.±2° C./rain to −54° C. and was held at −54° C. for 5 minutes±1 minute. The cycle in which the temperature was raised from −54° C. to 71° C. and was dropped to −54° C. was defined as one cycle, and this cycle was repeated 200 times.

c. The environmental exposure in the thermohygrostat and the cycle in the environmental tester were collectively defined as one block, and five blocks were repeated.

A width of 25 mm was cut out of an area of ±10 mm from the longitudinal center of the test piece subjected to the environmental exposure. A cut-out surface was polished as a surface to be observed. The surface to be observed was observed using a commercially available microscope with a magnification of 200×, and the number of cracks occurring was measured.

Evaluations of microcrack resistance were excellent for the number of microcracks occurring of 0 to 1, good for 2 to 4, fair for 5 to 9, and poor for 10 or more.

The cutting out of the test piece was performed using a diamond cutter with a speed of 23 cm/min (When processing is performed with a speed of 50 cm/min or more, large abrasive vibration occurs between the test piece and the diamond cutter, which may cause cracks in test piece caused by abrasive load, and the speed of 23 cm/min was employed.).

(17) Average Particle Diameter of Thermoplastic Resin Particles

The average particle diameter of the thermoplastic resin particles was calculated by measuring arbitrary 100 particle diameters from a photograph and determining their arithmetic average. The average particle diameter indicates a number average particle diameter. The individual particle diameter of the resin particles was measured by observing the fine particles with a scanning electron microscope (scanning electron microscope JSM-6301NF manufactured by JEOL Ltd.) with a magnification of 1,000×. When a particle was not a perfect circle, its major axis was measured as its particle diameter.

The materials and the components shown below were used in each example and each comparative example.

Component (A): A-1 to A-3

A-1: "Denacol (registered trademark)" EX-810 (manufactured by Nagase ChemteX Corporation)

Diglycidyl ether of ethylene glycol

Epoxy equivalent: 113 g/eq., the number of epoxy groups: 2

A-2: "Denacol (registered trademark)" EX-611 (manufactured by Nagase ChemteX Corporation)

Sorbitol polyglycidyl ether

Epoxy equivalent: 167 g/eq., the number of epoxy groups: 4

The number of hydroxy groups: 2

A-3: "Denacol (registered trademark)" EX-521 (manufactured by Nagase ChemteX Corporation)

Polyglycerin polyglycidyl ether

Epoxy equivalent: 183 g/eq., the number of epoxy groups: 3 or more

Component (B1): B-1 to B-4

B-1: "jER (registered trademark)" 152 (manufactured by Mitsubishi Chemical Corporation)

Glycidyl ether of phenol novolac

Epoxy equivalent: 175 g/eq., the number of epoxy groups: 3

B-2: "jER (registered trademark)" 828 (manufactured by Mitsubishi Chemical Corporation)

Diglycidyl ether of bisphenol A

Epoxy equivalent: 189 g/eq., the number of epoxy groups: 2

B-3: "jER (registered trademark)" 1001 (manufactured by Mitsubishi Chemical Corporation)

Diglycidyl ether of bisphenol A

Epoxy equivalent: 475 g/eq., the number of epoxy groups: 2

B-4: "jER (registered trademark)" 807 (manufactured by Mitsubishi Chemical Corporation)

Diglycidyl ether of bisphenol F

Epoxy equivalent: 167 g/eq., the number of epoxy groups: 2

Component (D) Epoxy Resin: D-1 to D-5

D-1: "Sumiepoxy (registered trademark)" ELM434 (tetraglycidyldiaminodiphenylmethane, manufactured by Sumitomo Chemical Co., Ltd., epoxy equivalent: 125 g/eq.)

D-2: "Araldite (registered trademark)" MY721 (tetraglycidyldiaminodiphenylmethane, manufactured by Huntsman Advanced Materials, epoxy equivalent: 113 g/eq.).

D-3: "Epiclon (registered trademark)" 830 (a bisphenol F epoxy resin having two or more functional groups, manufactured by DIC Corporation, epoxy equivalent: 172 g/eq.).

D-4: OPP-G (o-phenylphenyl glycidyl ether, manufactured by Sanko Co., Ltd., epoxy equivalent: 226 g/eq.)

D-5: N,N-diglycidyl-4-phenoxyaniline synthesized by the method below

Into a four-necked flask equipped with a thermometer, a dropping funnel, a cooling pipe, and a stirrer, 610.6 g (6.6 eq.) of epichlorohydrin was charged, and its temperatures was raised up to 70° C. while performing nitrogen purge, into which 203.7 g (1.1 eq.) of p-phenoxyaniline dissolved in 1,020 g of ethanol was added dropwise four 4 hours. A mixture in the flask was further stirred for 6 hours, and an addition reaction was completed to obtain 4-phenoxy-N,N-bis(2-hydroxy-3-chloropropyl) aniline. Then, the temperature within the flask was dropped to 25° C., 229 g (2.75 eq.) of a 48% NaOH aqueous solution was added dropwise thereto, and the mixture was stirred further for 1 hour. After completion of a cyclization reaction, ethanol was distilled off, and the reaction product was extracted with 408 g of toluene and washed with a 5% saline solution twice. After removing toluene and epichlorohydrin from the organic layer under reduced pressure, 308.5 g (a yield of 94.5%) of brown viscous liquid was obtained. The purity of N,N-diglycidyl-4-phenoxyaniline as a main product was 91% (GC area %).

Component (E) Core-Shell Rubber Particles: E-1 and E-2

E-1: "Kane Ace (registered trademark)" MX416 (masterbatch containing 75% by mass of "Araldite (registered trademark)" MY721 (tetraglycidyldiaminodiphenylmethane manufactured by Huntsman) as an epoxy resin and 25% by mass of core-shell rubber particles (volume average particle diameter: 100 nm, core part: cross-linked polybutadiene [Tg: −70° C.], shell part: a methyl methacrylate/glycidyl methacrylate/styrene copolymer), epoxy equivalent: 150 g/eq., manufactured by Kaneka Corporation)

E-2: "Kane Ace (registered trademark)" MX136 (masterbatch containing 75% by mass of "Araldite (registered trademark)" GY285 (a bisphenol F epoxy resin manufactured by Huntsman) as an epoxy resin and 25% by mass of core-shell rubber particles (volume average particle diameter: 100 nm, core part: cross-linked polybutadiene [Tg: −70° C.], shell part: a methyl methacrylate/glycidyl methacrylate/styrene copolymer), epoxy equivalent: 220 g/eq., manufactured by Kaneka Corporation)

Component (H) Block Copolymer: H-1

H-1: "Nanostrength (registered trademark)" M22N (triblock copolymer M-B-M: methyl methacrylate (Tg: 130° C.)-butyl acrylate (Tg: −54° C.)-methyl methacrylate (Tg: 130° C.), manufactured by Arkema, Inc.)

Thermoplastic Resin (F): F-1 to F-3

F-1: "SUMIKAEXCEL (registered trademark)" PES5003P (polyethersulfone, manufactured by Sumitomo Chemical Co., Ltd., average molecular weight: 47,000 g/mol)

F-2: "Virantage (registered trademark)" PESU VW-10700 (polyethersulfone, manufactured by Solvay Specialty Polymers, average molecular weight: 21,000 g/mol)

F-3: "ULTEM (registered trademark)" 1010 (polyetherimide, manufactured by SABIC Innovative Plastics, average molecular weight: 47,000 g/mol)

Component (G) Latent Hardener: G-1 and G-2

G-1: "SEIKACURE (registered trademark)" S (4,4'-diaminodiphenyl sulfone, manufactured by Wakayama Seika Kogyo Co., Ltd.)

G-2: 3,3'-DAS (3,3'-diaminodiphenyl sulfone, manufactured by Mitsui Fine Chemicals, Inc.)

Thermoplastic Resin Particles

"Toraypearl (registered trademark)" TN (manufactured by Toray Industries Inc., average particle diameter: 13.0 μm)

"Orgasol (registered trademark)" 1002DNAT1 (nylon 6 fine particles, manufactured by Arkema, Inc., average particle diameter: 20 μm)

Example 1

Example includes Process I, Process II, Process III, and Process IV.

Process I: Process for Producing Carbon Fibers as Raw Material

A copolymer made from 99% by mole of acrylonitrile and 1% by mole of itaconic acid was spun and burned to give carbon fibers having a total filament number of 6,000, a total fineness of 250 tex, a specific gravity of 1.8, a strand tensile strength of 5.9 GPa, and a strand tensile elastic modulus of 295 GPa. Next, the carbon fibers were subjected to electrolytic surface treatment using an aqueous ammonium hydrogen carbonate solution having a concentration of 0.1 mol/L as an electrolytic solution at a quantity of electricity of 80 coulomb per gram of carbon fibers. The electrolytic surface-treated carbon fibers were subsequently washed with water and dried in hot air at a temperature of 150° C. to yield carbon fibers as a raw material. At this time, the surface oxygen concentration O/C was 0.15, the surface carboxylic acid concentration COOH/C was 0.005, and the surface hydroxy group concentration COH/C was 0.018. The obtained carbon fibers were regarded as carbon fibers A.

Process II: Process for Bonding Sizing Agent to Carbon Fibers

An aqueous dispersion emulsion containing 20 parts by mass of (B-1) as a component (B1), 20 parts by mass of a component (C), and 10 parts by mass of an emulsifier was produced, and then 50 parts by mass of (A-3) was mixed as the component (A) to produce a sizing solution. The component (C) used was a condensate of 2 mol of an adduct of bisphenol A with 2 mol of EO, 1.5 mol of maleic acid, and 0.5 mol of sebacic acid, and the emulsifier used was polyoxyethylene (70 mol) styrenated (5 mol) cumylphenol. Both the component (C) and the emulsifier are aromatic compounds and correspond to the component (B). The epoxy equivalent of the sizing agent except the solutions in the sizing solution is as shown in Table 1. The sizing agent was applied onto surface-treated carbon fibers by immersing. The coated carbon fibers were then treated with heat at a temperature of 210° C. for 75 seconds to yield sizing agent-coated carbon fiber bundles. The adhesion amount of the sizing agent was adjusted so as to be 1.0% by mass relative to 100 parts by mass of the sizing agent-coated carbon fibers. Subsequently, the epoxy equivalent of the sizing agent, the X-ray photoelectron spectrum of the sizing agent surface, the interfacial shear strength (IFSS) of the sizing agent-coated carbon fibers, and the temperature increase of glass transition point (ΔTg) of a mixture of the sizing agent and a latent hardener (G) were determined. The results are listed in Table 1. The results indicated that all of the epoxy equivalent of the sizing agent, the chemical composition of the sizing agent surface, and ΔTg were as expected. The IFSS measurement also revealed sufficiently high adhesion.

Process III: Production of Carbon Fiber Fabric

The sizing agent-coated carbon fibers were used for both the warp and the weft, metallic wires (phosphor bronze wires manufactured by Mie Senco Co., Ltd., JIS H-3270, wire diameter: 0.1 mm) were arranged on the side faces of the carbon fiber bundles of the warp and the weft, and the carbon fiber bundles and the metallic wires were interlaced with the carbon fiber bundles and the metallic wires arranged in a different direction to obtain a plain weave having carbon fiber areal weight (a carbon fiber mass per 1 m$^2$) of 196 g/m$^2$. This was referred to as a carbon fiber fabric A.

Process IV: Production, Molding, and Evaluation of Prepreg

In a kneader, 49 parts by mass of (D-1) and 40 parts by mass of (D-4) as the thermosetting resin components (D) and 10 parts by mass of (F-1) as the thermoplastic resin component (F) were mixed, and the whole was dissolved. Then, 15 parts by mass of (E-1) as the core-shell rubber particles (E), 20 parts by mass of "Toraypearl (registered trademark)" TN as the thermoplastic resin particles, and 45 parts by mass of (G-1) as the latent hardener component (G) to produce a thermosetting resin composition. The obtained thermosetting resin composition was applied onto a release paper with a knife coater so as to give a resin areal weight of 65 g/m$^2$, thus producing a film formed of the thermosetting resin composition. The film formed of the thermosetting resin composition was superimposed on both sides of the carbon fiber fabric A, and heat and pressure were applied with a heat roll at a temperature of 100° C. and a pressure of 1 atm to impregnate the carbon fiber fabric A with the thermosetting resin composition, thus yielding a prepreg. Using the obtained prepreg, the 0° tensile strength measurement, 0° tensile test after long-term storage, and the evaluation of microcrack resistance of the carbon Fiber reinforced composite material were performed. Table 1 shows the results. The thermosetting resin compositions having the proportions shown in Table 1 were prepared and cured, and resin bending elastic modulus and resin K1C were evaluated. Table 1 shows the results. The results revealed a sufficiently high initial 0° tensile strength and a sufficiently high microcrack resistance and a small decrease in the tensile strength after 20 days.

Examples 2 to 8

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as in Example 1 except that the component (A) and the component (B1) shown in Table 1 were used as the sizing agent. Subsequently, the epoxy equivalent of the sizing agent, the X-ray photoelectron spectrum of the sizing agent surface, and the interfacial shear strength (IFSS), and ΔTg of the sizing agent-coated carbon fibers were measured. All of the epoxy equivalent of the sizing agent, the chemical composition of the sizing agent surface, and ΔTg were as expected, and the IFSS measurement also revealed sufficiently high adhesion. Table 1 shows the results.

Process III

Production of Carbon Fiber Fabric

A carbon fiber fabric was produced in the same manner as in Example 1

Process IV

Production, Molding, and Evaluation of Prepreg

A prepreg was produced, molded, and evaluated in the same manner as in Example 1. The results revealed a sufficiently high initial 0° tensile strength and a sufficiently high microcrack resistance and a small decrease in the tensile strength after 20 days. Table 1 shows the results.

TABLE 1

| | | | Example 1 | Example 2 | Example 3 | Example 4 | Example 5 | Example 6 | Example 7 | Example 8 |
|---|---|---|---|---|---|---|---|---|---|---|
| Carbon fibers | | Carbon fibers | A | A | A | A | A | A | A | A |
| Sizing agent | (A) | EX-810 | | | | | | 50 | | |
| | | EX-611 | | | | | | | 50 | 25 |
| | | EX-521 | 50 | 50 | 50 | 50 | 50 | | | 25 |
| | (B1) | jER152 | 20 | | | | | | | |
| | | jER828 | | 20 | | | 10 | 20 | 20 | 20 |
| | | jER1001 | | | 20 | | 10 | | | |
| | | jER807 | | | | 20 | | | | |
| | (C) | Aromatic polyester | 20 | 20 | 20 | 20 | 20 | 20 | 20 | 20 |
| | Other | Emulsifier (nonionic surfactant) | 10 | 10 | 10 | 10 | 10 | 10 | 10 | 10 |
| | Ratio | (A) (mass %) | 71 | 71 | 71 | 71 | 71 | 71 | 71 | 71 |
| | | (B1) (mass %) | 29 | 29 | 29 | 29 | 29 | 29 | 29 | 29 |
| | | (A) (mass %) | 50 | 50 | 50 | 50 | 50 | 50 | 50 | 50 |
| | | (B) (mass %) | 50 | 50 | 50 | 50 | 50 | 50 | 50 | 50 |
| | | Epoxy equivalent (g/eq.) | 260 | 265 | 320 | 250 | 290 | 255 | 290 | 275 |
| Carbon fiber fabric or braid | | Carbon fiber fabric | A | A | A | A | A | A | A | A |
| Thermosetting resin composition | Epoxy resin (D) | ELM434 | 49 | 49 | 49 | 49 | 49 | 49 | 49 | 49 |
| | | MY721 | | | | | | | | |
| | | Epiclon 830 | | | | | | | | |
| | | OPP-G N,N-Diglycidyl-4-phenoxyanilin | 40 | 40 | 40 | 40 | 40 | 40 | 40 | 40 |

TABLE 1-continued

|  |  |  | Example 1 | Example 2 | Example 3 | Example 4 | Example 5 | Example 6 | Example 7 | Example 8 |
|---|---|---|---|---|---|---|---|---|---|---|
|  | Core-shell rubber particles (E) | Kane Ace MX416 Kane Ace MX136 | 15 | 15 | 15 | 15 | 15 | 15 | 15 | 15 |
|  | Thermoplastic resin (F) | SUMIKAEXCEL 5003P VW-10700RP Ultem 1010 | 10 | 10 | 10 | 10 | 10 | 10 | 10 | 10 |
|  | Latent hardener (G) | 4,4'-Diaminodiphenyl sulfone 3,3'-Diaminodiphenyl sulfone | 45 | 45 | 45 | 45 | 45 | 45 | 45 | 45 |
|  | Thermoplastic Resin Particles | Toraypearl TN Orgasol 1002D | 20 | 20 | 20 | 20 | 20 | 20 | 20 | 20 |
| Evaluation items | Sizing agent-coated carbon fibers | Epoxy equivalent of sizing agent (g/eq.) | 420 | 430 | 530 | 410 | 470 | 415 | 475 | 450 |
|  |  | X-ray photoelectron spectrum of sizing agent surface (a)/(b) | 0.65 | 0.64 | 0.71 | 0.63 | 0.67 | 0.56 | 0.60 | 0.62 |
|  |  | ΔTg with curing agent | 19 | 20 | 18 | 20 | 19 | 16 | 21 | 21 |
|  |  | Interfacial adhesion: IFSS (MPa) | 43 | 44 | 40 | 46 | 43 | 39 | 43 | 44 |
|  | Physical properties of cured resin | Bending elastic modulus of resin (GPa) | 3.7 | 3.7 | 3.7 | 3.7 | 3.7 | 3.7 | 3.7 | 3.7 |
|  |  | Resin K1c (MPa · m$^{1/2}$) | 0.86 | 0.86 | 0.86 | 0.86 | 0.86 | 0.86 | 0.86 | 0.86 |
|  | Carbon fiber reinforced composite material | 0° Tensile test (0 day) (MPa) | 1005 | 1010 | 999 | 1026 | 1006 | 987 | 1004 | 1012 |
|  |  | 0° Tensile test (20 days) (MPa) | 954 | 971 | 979 | 954 | 955 | 977 | 955 | 971 |
|  |  | Microcrack resistance | 4 GOOD | 3 GOOD | 4 GOOD | 4 GOOD | 3 GOOD | 4 GOOD | 4 GOOD | 3 GOOD |

Examples 9 to 13

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as in Example 2 except that the sizing agent had the mass ratio shown in Table 2. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected, and the IFSS measurement also revealed sufficiently high adhesion. Table 2 shows the results.

Process III

Production of Carbon Fiber Fabric

A carbon fiber fabric was produced in the same manner as in Example 1.

Process IV

Production, Molding, and Evaluation of Prepreg

A prepreg was produced, molded, and evaluated in the same manner as in Example 1. The results revealed a sufficiently high initial 0° tensile strength and a sufficiently high microcrack resistance and a small decrease in the tensile strength after 20 days.
Table 2 shows the results.

Example 14

Process I

Process for Producing Carbon Fibers as Raw Material

Carbon fibers were produced in the same manner as in Example 1.

Process II

Process for Bonding Sizing Agent to Carbon Fibers

In DMF, 55 parts by mass of (A-3) as the component (A), 22.5 parts by mass of (B-2) as the component (B1), and 22.5 parts by mass of the component (C) were dissolved to yield a sizing solution. The component (C) used was a condensate of 2 mol of an adduct of bisphenol A with 2 mol of EO, 1.5 mol of maleic acid, and 0.5 mol of sebacic acid. The epoxy equivalent of the sizing agent except the solutions in the sizing solution is as shown in Table 2. In the same manner as in Example 1, the sizing agent was applied onto surface-treated carbon fibers by immersing. The coated carbon fibers were then treated with heat at a temperature of 210° C. for 75 seconds to yield sizing agent-coated carbon fiber bundles. The amount of the sizing agent adhered was adjusted so as to be 1.0 part by mass relative to 100 parts by mass of the surface-treated carbon fibers. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. As shown in Table 2, the result indicated that all of the epoxy equivalent of the sizing agent, the chemical composition of the sizing agent surface, and ΔTg were as expected. The IFSS measurement also revealed sufficiently high adhesion.

Process III

Production of Carbon Fiber Fabric

A carbon fiber fabric was produced in the same manner as in Example 1.

Process IV

Production, Molding, and Evaluation of Prepreg

A prepreg was produced, molded, and evaluated in the same manner as in Example 1. The results revealed a sufficiently high initial 0° tensile strength and a sufficiently high microcrack resistance and a small decrease in the tensile strength after 20 days.
Table 2 shows the results.

Example 15

Process I

Process for Producing Carbon Fibers as Raw Material

Carbon fibers were produced in the same manner as in Example 1.

Process II

Process for Bonding Sizing Agent to Carbon Fibers

In DMF, 60 parts by mass of (A-3) as the component (A) and 40 parts by mass of (B-2) as the component (B1) were dissolved to yield a sizing solution. The epoxy equivalent of the sizing agent except the solutions in the sizing solution is as shown in Table 2. In the same manner as in Example 1, the sizing agent was applied onto surface-treated carbon fibers by immersing. The coated carbon fibers were then treated with heat at a temperature of 210° C. for 75 seconds to yield sizing agent-coated carbon fiber bundles. The amount of the sizing agent adhered was adjusted so as to be 1.0 part by mass relative to 100 parts by mass of the surface-treated carbon fibers. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. As shown in Table 2, the result indicated that all of the epoxy equivalent of the sizing agent, the chemical composition of the sizing agent surface, and ΔTg were as expected. The IFSS measurement also revealed sufficiently high adhesion.

Process III

Production of Carbon Fiber Fabric

A carbon fiber fabric was produced in the same manner as in Example 1.

Process IV

Production, Molding, and Evaluation of Prepreg

A prepreg was produced, molded, and evaluated in the same manner as in Example 1. The results revealed a sufficiently high initial 0° tensile strength and a sufficiently high microcrack resistance and a small decrease in the tensile strength after 20 days. Table 2 shows the results.

TABLE 2

|  |  |  | Example 9 | Example 10 | Example 11 | Example 12 | Example 13 | Example 14 | Example 15 |
|---|---|---|---|---|---|---|---|---|---|
| Carbon fibers |  | Carbon fibers | A | A | A | A | A | A | A |
| Sizing agent | (A) | EX-810 |  |  |  |  |  |  |  |
|  |  | EX-611 |  |  |  |  |  |  |  |
|  |  | EX-521 | 37 | 35 | 40 | 55 | 60 | 55 | 60 |
|  | (B1) | jER152 |  |  |  |  |  |  |  |
|  |  | jER828 | 33 | 45 | 30 | 15 | 15 | 22.5 | 40 |
|  |  | jER1001 |  |  |  |  |  |  |  |
|  |  | jER807 |  |  |  |  |  |  |  |
|  | (C) | Aromatic polyester | 20 | 10 | 20 | 20 | 20 | 22.5 |  |
|  | Other | Emulsifier (nonionic surfactant) | 10 | 10 | 10 | 10 | 5 |  |  |
|  | Ratio | (A) (mass %) | 53 | 44 | 57 | 79 | 80 | 71 | 60 |
|  |  | (B1) (mass %) | 47 | 56 | 43 | 21 | 20 | 29 | 40 |
|  |  | (A) (mass %) | 37 | 35 | 40 | 55 | 60 | 55 | 60 |
|  |  | (B) (mass %) | 63 | 65 | 60 | 45 | 40 | 45 | 40 |
|  |  | Epoxy equivalent (g/eq.) | 265 | 230 | 265 | 260 | 245 | 240 | 185 |
| Carbon fiber fabric or braid |  | Carbon fiber fabric | A | A | A | A | A | A | A |
| Thermosetting resin composition | Epoxy resin (D) | ELM434 | 49 | 49 | 49 | 49 | 49 | 49 | 49 |
|  |  | MY721 |  |  |  |  |  |  |  |
|  |  | Epiclon 830 |  |  |  |  |  |  |  |
|  |  | OPP-G | 40 | 40 | 40 | 40 | 40 | 40 | 40 |
|  |  | N,N-Diglycidyl-4-phenoxyanilin |  |  |  |  |  |  |  |
|  | Core-shell rubber particles (E) | Kane Ace MX416 | 15 | 15 | 15 | 15 | 15 | 15 | 15 |
|  |  | Kane Ace MX136 |  |  |  |  |  |  |  |
|  | Thermoplastic resin (F) | SUMIKAEXCEL 5003P | 10 | 10 | 10 | 10 | 10 | 10 | 10 |
|  |  | VW-10700RP |  |  |  |  |  |  |  |
|  |  | Ultem 1010 |  |  |  |  |  |  |  |
|  | Latent hardener (G) | 4,4'-Diaminodiphenyl sulfone | 45 | 45 | 45 | 45 | 45 | 45 | 45 |
|  |  | 3,3'-Diaminodiphenyl sulfone |  |  |  |  |  |  |  |
|  | Thermoplastic Resin Particles | Toraypearl TN | 20 | 20 | 20 | 20 | 20 | 20 | 20 |
|  |  | Orgasol 1002D |  |  |  |  |  |  |  |

TABLE 2-continued

| | | | Example 9 | Example 10 | Example 11 | Example 12 | Example 13 | Example 14 | Example 15 |
|---|---|---|---|---|---|---|---|---|---|
| Evaluation items | Sizing agent-coated carbon fibers | Epoxy equivalent of sizing agent (g/eq.) | 430 | 370 | 430 | 430 | 400 | 439 | 280 |
| | | X-ray photoelectron spectrum of sizing agent surface (a)/(b) | 0.77 | 0.79 | 0.76 | 0.66 | 0.57 | 0.70 | 0.81 |
| | | ΔTg with curing agent | 17 | 16 | 18 | 21 | 22 | 20 | 25 |
| | | Interfacial adhesion: IFSS (MPa) | 41 | 40 | 45 | 45 | 45 | 45 | 45 |
| | Physical properties of cured resin | Bending elastic modulus of resin (GPa) | 3.7 | 3.7 | 3.7 | 3.7 | 3.7 | 3.7 | 3.7 |
| | | Resin K1c (MPa · m$^{1/2}$) | 0.86 | 0.86 | 0.86 | 0.86 | 0.86 | 0.86 | 0.86 |
| | Carbon fiber reinforced composite material | 0° Tensile test (0 day) (MPa) | 1001 | 993 | 1020 | 1025 | 1022 | 1019 | 1023 |
| | | 0° Tensile test (20 days) (MPa) | 980 | 984 | 947 | 955 | 951 | 956 | 954 |
| | | Microcrack resistance | 4 GOOD | 4 GOOD | 4 GOOD | 4 GOOD | 3 GOOD | 4 GOOD | 3 GOOD |

Example 16

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as in Example 2. Subsequently, the epoxy equivalent of the sizing agent, the X-ray photoelectron spectrum of the sizing agent surface, and the interfacial shear strength (IFSS) and ΔTg of the sizing agent-coated carbon fibers were measured. All of the epoxy equivalent of the sizing agent, the chemical composition of the sizing agent surface, and ΔTg were as expected, and the IFSS measurement revealed moderate adhesion. Table 3 shows the results.

Process III

Production of Carbon Fiber Fabric

The sizing agent-coated carbon fibers were used for both the warp and the weft, and the carbon fiber bundles were interlaced with the carbon fiber bundles arranged in a different direction to obtain a plain weave having a carbon fiber areal weight of 196 g/m². This was referred to as a carbon fiber fabric B.

Process IV

Production, Molding, and Evaluation of Prepreg

A prepreg was produced, molded, and evaluated in the same manner as in Example 1 except that the epoxy resin (D), the core-shell rubber particles (E), the thermoplastic resin (F), the latent hardener (G), and the thermoplastic resin particles were used in the mass ratio shown in Table 3. The results revealed an extremely high initial 0° tensile strength and an extremely high microcrack resistance and a small decrease in the tensile strength after 20 days. Table 3 shows the results.

Examples 17 to 27

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as in Example 2. Subsequently, the epoxy equivalent of the sizing agent, the X-ray photoelectron spectrum of the sizing agent surface, and the interfacial shear strength (IFSS) and ΔTg of the sizing agent-coated carbon fibers were measured. All of the epoxy equivalent of the sizing agent, the chemical composition of the sizing agent surface, and ΔTg were as expected, and the IFSS measurement revealed moderate adhesion. Table 3 shows the results.

Process III

Production of Carbon Fiber Fabric

The carbon fiber fabric shown in Table 3 was used.

Process IV

Production, Molding, and Evaluation of Prepreg

A prepreg was produced, molded, and evaluated in the same manner as in Example 1 except that the epoxy resin (D), the core-shell rubber particles (E), the thermoplastic resin (F), the latent hardener (G), and the thermoplastic resin particles were used in the mass ratio shown in Table 3. The results revealed a sufficiently high initial 0° tensile strength and a sufficiently high microcrack resistance and a small decrease in the tensile strength after 20 days. Table 3 shows the results.

TABLE 3

|  |  |  | Example 16 | Example 17 | Example 18 | Example 19 | Example 20 | Example 21 | Example 22 |
|---|---|---|---|---|---|---|---|---|---|
| Carbon fibers |  | Carbon fibers | A | A | A | A | A | A | A |
| Sizing agent | (A) | EX-810 |  |  |  |  |  |  |  |
|  |  | EX-611 |  |  |  |  |  |  |  |
|  |  | EX-521 | 50 | 50 | 50 | 50 | 50 | 50 | 50 |
|  | (B1) | jER152 |  |  |  |  |  |  |  |
|  |  | jER828 | 20 | 20 | 20 | 20 | 20 | 20 | 20 |
|  |  | jER1001 |  |  |  |  |  |  |  |
|  |  | jER807 |  |  |  |  |  |  |  |
|  | (C) | Aromatic polyester | 20 | 20 | 20 | 20 | 20 | 20 | 20 |
|  | Other | Emulsifier (nonionic surfactant) | 10 | 10 | 10 | 10 | 10 | 10 | 10 |
|  | Ratio | (A) (mass %) | 71 | 71 | 71 | 71 | 71 | 71 | 71 |
|  |  | (B1) (mass %) | 29 | 29 | 29 | 29 | 29 | 29 | 29 |
|  |  | (A) (mass %) | 50 | 50 | 50 | 50 | 50 | 50 | 50 |
|  |  | (B) (mass %) | 50 | 50 | 50 | 50 | 50 | 50 | 50 |
|  |  | Epoxy equivalent (g/eq.) | 265 | 265 | 265 | 265 | 265 | 265 | 265 |
| Carbon fiber fabric or braid |  | Carbon fiber fabric | B | A | A | B | B | A | B |
| Thermosetting resin composition | Epoxy resin (D) | ELM434 | 49 | 34 | 54 | 34 | 54 | 60 | 60 |
|  |  | MY721 |  |  |  |  |  |  |  |
|  |  | Epiclon 830 |  |  |  |  |  | 29 | 29 |
|  |  | OPP-G N,N-Diglycidyl-4-phenoxyanilin | 40 | 40 | 40 | 40 | 40 |  |  |
|  | Core-shell rubber particles (E) | Kane Ace MX416 | 15 | 35 | 8 | 35 | 8 |  |  |
|  |  | Kane Ace MX136 |  |  |  |  |  | 15 | 15 |
|  | Thermoplastic resin (F) | SUMIKAEXCEL 5003P | 10 | 10 | 10 | 10 | 10 | 10 | 10 |
|  |  | VW-10700RP |  |  |  |  |  |  |  |
|  |  | Ultem 1010 |  |  |  |  |  |  |  |
|  | Latent hardener (G) | 4,4'-Diaminodiphenyl sulfone | 45 | 45 | 45 | 45 | 45 | 45 | 45 |
|  |  | 3,3'-Diaminodiphenyl sulfone |  |  |  |  |  |  |  |
|  | Thermoplastic Resin Particles | Toraypearl TN | 20 | 20 | 20 | 20 | 20 | 20 | 20 |
|  |  | Orgasol 1002D |  |  |  |  |  |  |  |
| Evaluation items | Sizing agent-coated carbon fibers | Epoxy equivalent of sizing agent (g/eq.) | 430 | 430 | 430 | 430 | 430 | 430 | 430 |
|  |  | X-ray photoelectron spectrum of sizing agent surface (a)/(b) | 0.64 | 0.64 | 0.64 | 0.64 | 0.64 | 0.64 | 0.64 |
|  |  | ΔTg with curing agent | 20 | 20 | 20 | 20 | 20 | 20 | 20 |
|  |  | Interfacial adhesion: IFSS (MPa) | 44 | 44 | 44 | 44 | 44 | 44 | 44 |
|  | Physical properties of cured resin | Bending elastic modulus of resin (GPa) | 3.7 | 3.5 | 3.8 | 3.5 | 3.8 | 3.2 | 3.2 |
|  |  | Resin K1c (MPa·m$^{1/2}$) | 0.86 | 1.0 | 0.81 | 1.0 | 0.81 | 0.82 | 0.82 |
|  | Carbon fiber reinforced composite material | 0° Tensile test (0 day) (MPa) | 1065 | 1015 | 1020 | 1058 | 1069 | 972 | 1018 |
|  |  | 0° Tensile test (20 days) (MPa) | 1012 | 963 | 961 | 1005 | 1017 | 921 | 960 |
|  |  | Microcrack resistance | 0 EXCELLENT | 1 EXCELLENT | 4 GOOD | 0 EXCELLENT | 0 EXCELLENT | 4 GOOD | 0 EXCELLENT |

|  |  |  | Example 23 | Example 24 | Example 25 | Example 26 | Example 27 |
|---|---|---|---|---|---|---|---|
| Carbon fibers |  | Carbon fibers | A | A | A | A | A |
| Sizing agent | (A) | EX-810 |  |  |  |  |  |
|  |  | EX-611 |  |  |  |  |  |
|  |  | EX-521 | 50 | 50 | 50 | 50 | 50 |
|  | (B1) | jER152 |  |  |  |  |  |
|  |  | jER828 | 20 | 20 | 20 | 20 | 20 |
|  |  | jER1001 |  |  |  |  |  |
|  |  | jER807 |  |  |  |  |  |
|  | (C) | Aromatic polyester | 20 | 20 | 20 | 20 | 20 |
|  | Other | Emulsifier (nonionic surfactant) | 10 | 10 | 10 | 10 | 10 |
|  | Ratio | (A) (mass %) | 71 | 71 | 71 | 71 | 71 |
|  |  | (B1) (mass %) | 29 | 29 | 29 | 29 | 29 |
|  |  | (A) (mass %) | 50 | 50 | 50 | 50 | 50 |
|  |  | (B) (mass %) | 50 | 50 | 50 | 50 | 50 |
|  |  | Epoxy equivalent (g/eq.) | 265 | 265 | 265 | 265 | 265 |
| Carbon fiber fabric or braid |  | Carbon fiber fabric | A | A | A | A | A |
| Thermosetting resin composition | Epoxy resin (D) | ELM434 | 49 | 41 | 49 | 49 | 49 |
|  |  | MY721 |  |  |  |  |  |
|  |  | Epiclon 830 |  |  |  |  |  |
|  |  | OPP-G N,N-Diglycidyl-4-phenoxyanilin | 40 | 40 | 40 | 40 | 40 |
|  | Core-shell rubber particles (E) | Kane Ace MX416 | 15 | 25 | 15 | 15 | 15 |
|  |  | Kane Ace MX136 |  |  |  |  |  |

TABLE 3-continued

|  |  |  |  |  |  |  |  |  |
|---|---|---|---|---|---|---|---|---|
| Evaluation items | Thermoplastic resin (F) | SUMIKAEXCEL 5003P | 2 |  | 10 | 10 | 10 |
|  |  | VW-10700RP |  | 30 |  |  |  |
|  |  | Ultem 1010 |  |  |  |  |  |
|  | Latent hardener (G) | 4,4'-Diaminodiphenyl sulfone | 45 | 45 | 45 |  | 45 |
|  |  | 3,3'-Diaminodiphenyl sulfone |  |  |  | 45 |  |
|  | Thermoplastic Resin Particles | Toraypearl TN | 20 | 20 |  | 20 |  |
|  |  | Orgasol 1002D |  |  | 20 |  |  |
|  | Sizing agent-coated carbon fibers | Epoxy equivalent of sizing agent (g/eq.) | 430 | 430 | 430 | 430 | 430 |
|  |  | X-ray photoelectron spectrum of sizing agent surface (a)/(b) | 0.64 | 0.64 | 0.64 | 0.64 | 0.64 |
|  |  | ΔTg with curing agent | 20 | 20 | 20 | 20 | 24 |
|  |  | Interfacial adhesion: IFSS (MPa) | 44 | 44 | 44 | 44 | 44 |
|  | Physical properties of cured resin | Bending elastic modulus of resin (GPa) | 3.7 | 3.5 | 3.7 | 4.1 | 3.7 |
|  |  | Resin K1c (MPa · m½) | 0.85 | 1.04 | 0.86 | 0.84 | 0.76 |
|  | Carbon fiber reinforced composite material | 0° Tensile test (0 day) (MPa) | 1017 | 1009 | 1011 | 1007 | 1012 |
|  |  | 0° Tensile test (20 days) (MPa) | 962 | 953 | 957 | 951 | 962 |
|  |  | Microcrack resistance | 4 GOOD | 2 GOOD | 3 GOOD | 3 GOOD | 4 GOOD |

Examples 28 to 37

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as in Example 2. Subsequently, the epoxy equivalent of the sizing agent, the X-ray photoelectron spectrum of the sizing agent surface, and the interfacial shear strength (IFSS) and ΔTg of the sizing agent-coated carbon fibers were measured. All of the epoxy equivalent of the sizing agent, the chemical composition of the sizing agent surface, and ΔTg were as expected, and the IFSS measurement revealed moderate adhesion. Table 4 shows the results.

Process III

Production of Carbon Fiber Fabric

The carbon fiber fabric shown in Table 4 was used.

Process IV

Production, Molding, and Evaluation of Prepreg

A prepreg was produced, molded, and evaluated in the same manner as in Example 1 except that the epoxy resin (D), the core-shell rubber particles (E), the block copolymer (H), the thermoplastic resin (F), the latent hardener (G), and the thermoplastic resin particles were used in the mass ratio shown in Table 4. Table 4 shows the results. The results revealed a sufficiently high initial 0° tensile strength and a sufficiently high microcrack resistance and a small decrease in the tensile strength after 20 days.

TABLE 4

|  |  |  | Example 28 | Example 29 | Example 30 | Example 31 | Example 32 | Example 33 |
|---|---|---|---|---|---|---|---|---|
| Carbon fibers |  | Carbon fibers | A | A | A | A | A | A |
| Sizing agent | (A) | EX-810 |  |  |  |  |  |  |
|  |  | EX-611 |  |  |  |  |  |  |
|  |  | EX-521 | 50 | 50 | 50 | 50 | 50 | 50 |
|  | (B1) | jER152 |  |  |  |  |  |  |
|  |  | jER828 | 20 | 20 | 20 | 20 | 20 | 20 |
|  |  | jER1001 |  |  |  |  |  |  |
|  |  | jER807 |  |  |  |  |  |  |
|  | (C) | Aromatic polyester | 20 | 20 | 20 | 20 | 20 | 20 |
|  | Other | Emulsifier (nonionic surfactant) | 10 | 10 | 10 | 10 | 10 | 10 |
|  | Ratio | (A) (mass %) | 71 | 71 | 71 | 71 | 71 | 71 |
|  |  | (B1) (mass %) | 29 | 29 | 29 | 29 | 29 | 29 |
|  |  | (A) (mass %) | 50 | 50 | 50 | 50 | 50 | 50 |
|  |  | (B) (mass %) | 50 | 50 | 50 | 50 | 50 | 50 |
|  |  | Epoxy equivalent (g/eq.) | 265 | 265 | 265 | 265 | 265 | 265 |
| Carbon fiber fabric or braid |  | Carbon fiber fabric | A | A | A | B | B | B |

TABLE 4-continued

| | | | | | | | | |
|---|---|---|---|---|---|---|---|---|
| Thermosetting resin composition | Epoxy resin (D) | ELM434 | | | | | | |
| | | MY721 | 49 | 41 | 34 | 49 | 41 | 34 |
| | | Epiclon 830 | | | | | | |
| | | OPP-G | | | | | | |
| | | N,N-Diglycidyl-4-phenoxyanilin | 40 | 40 | 40 | 40 | 40 | 40 |
| | Core-shell rubber particles (E) | Kane Ace MX416 | 15 | 25 | 35 | 15 | 25 | 35 |
| | | Kane Ace MX136 | | | | | | |
| | Block copolymer (H) | M22N | | | | | | |
| | Thermoplastic resin (F) | SUMIKAEXCEL 5003P | 10 | 10 | 10 | 10 | 10 | 10 |
| | | VW-10700RP | | | | | | |
| | | Ultem 1010 | | | | | | |
| | Latent hardener (G) | 4,4'-Diaminodiphenyl sulfone | 45 | 45 | 45 | 45 | 45 | 45 |
| | | 3,3'-Diaminodiphenyl sulfone | | | | | | |
| | Thermoplastic Resin Particles | Toraypearl TN | 20 | 20 | 20 | 20 | 20 | 20 |
| | | Orgasol 1002D | | | | | | |
| Evaluation items | Sizing agent-coated carbon fibers | Epoxy equivalent of sizing agent (g/eq.) | 430 | 430 | 430 | 430 | 430 | 430 |
| | | X-ray photoelectron spectrum of sizing agent surface (a)/(b) | 0.64 | 0.64 | 0.64 | 0.64 | 0.64 | 0.64 |
| | | ΔTg with curing agent | 20 | 20 | 20 | 20 | 20 | 20 |
| | | Interfacial adhesion: IFSS (MPa) | 44 | 44 | 44 | 44 | 44 | 44 |
| | Physical properties of cured resin | Bending elastic modulus of resin (GPa) | 3.7 | 3.6 | 3.5 | 3.7 | 3.6 | 3.5 |
| | | Resin K1c (MPa·m$^{1/2}$) | 0.87 | 0.95 | 1.02 | 0.87 | 0.95 | 1.02 |
| | Carbon fiber reinforced composite material | 0° Tensile test (0 day) (MPa) | 1031 | 1028 | 1029 | 1082 | 1078 | 1077 |
| | | 0° Tensile test (20 days) (MPa) | 978 | 971 | 969 | 1028 | 1021 | 1023 |
| | | Microcrack resistance | 3 GOOD | 1 EXCELLENT | 0 EXCELLENT | 0 EXCELLENT | 0 EXCELLENT | 0 EXCELLENT |

| | | | | Example 34 | Example 35 | Example 36 | Example 37 |
|---|---|---|---|---|---|---|---|
| Carbon fibers | | Carbon fibers | | A | A | A | A |
| Sizing agent | (A) | EX-810 | | | | | |
| | | EX-611 | | | | | |
| | | EX-521 | | 50 | 50 | 50 | 50 |
| | (B1) | jER152 | | | | | |
| | | jER828 | | 20 | 20 | 20 | 20 |
| | | jER1001 | | | | | |
| | | jER807 | | | | | |
| | (C) | Aromatic polyester | | 20 | 20 | 20 | 20 |
| | Other | Emulsifier (nonionic surfactant) | | 10 | 10 | 10 | 10 |
| | Ratio | (A) (mass %) | | 71 | 71 | 71 | 71 |
| | | (B1) (mass %) | | 29 | 29 | 29 | 29 |
| | | (A) (mass %) | | 50 | 50 | 50 | 50 |
| | | (B) (mass %) | | 50 | 50 | 50 | 50 |
| | | Epoxy equivalent (g/eq.) | | 265 | 265 | 265 | 265 |
| Carbon fiber fabric or braid | | Carbon fiber fabric | | A | A | A | A |
| Thermosetting resin composition | Epoxy resin (D) | ELM434 | | | | | |
| | | MY721 | | 49 | 49 | 49 | 60 |
| | | Epiclon 830 | | | | | |
| | | OPP-G | | | | | |
| | | N,N-Diglycidyl-4-phenoxyanilin | | 40 | 40 | 40 | 40 |
| | Core-shell rubber particles (E) | Kane Ace MX416 | | 15 | 15 | 15 | |
| | | Kane Ace MX136 | | | | | |
| | Block copolymer (H) | M22N | | | | | 5 |
| | Thermoplastic resin (F) | SUMIKAEXCEL 5003P | | | | | 10 |
| | | VW-10700RP | | 20 | 30 | | |
| | | Ultem 1010 | | | | 10 | |
| | Latent hardener (G) | 4,4'-Diaminodiphenyl sulfone | | 45 | 45 | 45 | 45 |
| | | 3,3'-Diaminodiphenyl sulfone | | | | | |
| | Thermoplastic Resin Particles | Toraypearl TN | | 20 | 20 | 20 | 20 |
| | | Orgasol 1002D | | | | | |
| Evaluation items | Sizing agent-coated carbon fibers | Epoxy equivalent of sizing agent (g/eq.) | | 430 | 430 | 430 | 430 |
| | | X-ray photoelectron spectrum of sizing agent surface (a)/(b) | | 0.64 | 0.64 | 0.64 | 0.64 |
| | | ΔTg with curing agent | | 20 | 20 | 20 | 20 |
| | | Interfacial adhesion: IFSS (MPa) | | 44 | 44 | 44 | 44 |

TABLE 4-continued

| | | | | | |
|---|---|---|---|---|---|
| Physical properties of cured resin | Bending elastic modulus of resin (GPa) | 3.7 | 3.7 | 3.6 | 3.5 |
| | Resin K1c (MPa · m$^{1/2}$) | 0.91 | 0.94 | 0.84 | 0.83 |
| Carbon fiber reinforced composite material | 0° Tensile test (0 day) (MPa) | 1045 | 1051 | 1008 | 1005 |
| | 0° Tensile test (20 days) (MPa) | 987 | 999 | 950 | 962 |
| | Microcrack resistance | 2 GOOD | 1 EXCELLENT | 4 GOOD | 4 GOOD |

Comparative Examples 1 and 2

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as in Example 2 except that the sizing agent had the mass ratio shown in Table 5. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed low adhesion.

Process III

Production of Carbon Fiber Fabric

A carbon fiber fabric was produced in the same manner as in Example 1.

Process IV

Production, Molding, and Evaluation of Prepreg

A prepreg was produced, molded, and evaluated in the same manner as in Example 1. The result revealed a low initial 0° tensile strength.

Comparative Example 3

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as in Example 15 except that the sizing agent had the mass ratio shown in Table 5. Subsequently, the epoxy equivalent of the sizing agent, the X-ray photoelectron spectrum of the sizing agent surface, and the interfacial shear strength (IFSS) and ΔTg of the sizing agent-coated carbon fibers were measured. In the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed low adhesion.

Process III

Production of Carbon Fiber Fabric

A carbon fiber fabric was produced in the same manner as in Example 1.

Process IV

Production, Molding, and Evaluation of Prepreg

A prepreg was produced, molded, and evaluated in the same manner as in Example 1.
The result revealed a low initial 0° tensile strength.

Comparative Example 4

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as in Example 2 except that the sizing agent had the mass ratio shown in Table 5. Subsequently, the epoxy equivalent of the sizing agent, the X-ray photoelectron spectrum of the sizing agent surface, and the interfacial shear strength (IFSS) and ΔTg of the sizing agent-coated carbon fibers were measured. In the $C_{1s}$ core spectrum of the surface of the sizing agent analyzed by X-ray photoelectron spectroscopy at a photoelectron takeoff angle of 15°, the (a)/(b) ratio was smaller than 0.50 where (a) is the height (cps) of a component at a binding energy (284.6 eV) assigned to CHx, C—C, and C=C and (b) is the height (cps)

of a component at a binding energy (286.1 eV) assigned to C—O, and the ratio was out of the range in the present invention. The IFSS measurement also revealed sufficiently high adhesion.

Process III

Production of Carbon Fiber Fabric

A carbon fiber fabric was produced in the same manner as in Example 1.

Process IV

Production, Molding, and Evaluation of Prepreg

A prepreg was produced, molded, and evaluated in the same manner as in Example 1.
The results revealed a favorable initial 0° tensile strength and a favorable microcrack resistance but a decrease in the 0° tensile strength after 20 days.

Comparative Examples 5 and 6

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as in Example 2 except that no aromatic epoxy compound (B1) was used but an aliphatic epoxy compound (A) alone was used as the epoxy compound in the sizing agent. Subsequently, the epoxy equivalent of the sizing agent, the X-ray photoelectron spectrum of the sizing agent surface, and the interfacial shear strength (IFSS) and ΔTg of the sizing agent-coated carbon fibers were measured. In the $C_{1s}$ core spectrum of the surface of the sizing agent analyzed by X-ray photoelectron spectroscopy at a photoelectron takeoff angle of 15°, the (a)/(b) ratio was smaller than 0.50 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement also revealed sufficiently high adhesion.

Process III

Production of Carbon Fiber Fabric

A carbon fiber fabric was produced in the same manner as in Example 1.

Process IV

Production, Molding, and Evaluation of Prepreg

A prepreg was produced, molded, and evaluated in the same manner as in Example 1. The results revealed a high initial 0° tensile strength and a high microcrack resistance but a large decreasing rate of the tensile strength after 20 days.

Comparative Example 7

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as in Example 2 except that no aliphatic epoxy compound (A) was used but an aromatic epoxy compound (B1) alone was used as the epoxy compound in the sizing agent. Subsequently, the epoxy equivalent of the sizing agent, the X-ray photoelectron spectrum of the sizing agent surface, and the interfacial shear strength (IFSS) and ΔTg of the sizing agent-coated carbon fibers were measured. In the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed low adhesion.

Process III

Production of Carbon Fiber Fabric

A carbon fiber fabric was produced in the same manner as in Example 1.

Process IV

Production, Molding, and Evaluation of Prepreg

A prepreg was produced, molded, and evaluated in the same manner as in Example 1. The result revealed a low initial 0° tensile strength.

TABLE 5

| | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Carbon fibers | | Carbon fibers | A | A | A | A | A | A | A |
| Sizing agent | (A) | X-810 | | | | | | | |
| | | X-611 | | | | | | 50 | |
| | | X-521 | 20 | 30 | 50 | 70 | 100 | 50 | |

TABLE 5-continued

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
|  | (B1) | jER152 |  |  |  |  |  |  |  |
|  |  | jER828 | 35 | 60 | 50 | 12 |  |  | 45 |
|  |  | jER1001 |  |  |  |  |  |  |  |
|  |  | jER807 |  |  |  |  |  |  |  |
|  | (C) | Aromatic polyester | 35 | 5 |  | 12 |  |  | 45 |
|  | Other | Emulsifier (nonionic surfactant) | 10 | 5 |  | 6 |  |  | 10 |
|  |  | (A) (mass %) | 36 | 33 | 50 | 85 | 100 | 100 | 0 |
|  |  | (B1) (mass %) | 64 | 67 | 50 | 15 | 0 | 0 | 100 |
|  |  | (A) (mass %) | 20 | 30 | 50 | 70 | 100 | 100 | 0 |
|  |  | (B) (mass %) | 80 | 70 | 50 | 30 | 0 | 0 | 100 |
|  |  | Epoxy equivalent (g/eq.) | 270 | 210 | 230 | 224 | 180 | 180 | 420 |
| Carbon fiber fabric or braid |  | Carbon fiber fabric | A | A | A | A | A | A | A |
| Thermosetting resin composition | Epoxy resin (D) | ELM434 | 49 | 49 | 49 | 49 | 49 | 49 | 49 |
|  |  | MY721 |  |  |  |  |  |  |  |
|  |  | Epiclon 830 |  |  |  |  |  |  |  |
|  |  | OPP-G | 40 | 40 | 40 | 40 | 40 | 40 | 40 |
|  |  | N,N-Diglycidyl-4-phenoxyanilin |  |  |  |  |  |  |  |
|  | Core-shell rubber particles (E) | Kane Ace MX416 | 15 | 15 | 15 | 15 | 15 | 15 | 15 |
|  |  | Kane Ace MX136 |  |  |  |  |  |  |  |
|  | Thermoplastic resin (F) | SUMIKAEXCEL PES5003P | 10 | 10 | 10 | 10 | 10 | 10 | 10 |
|  |  | VW-10700RP |  |  |  |  |  |  |  |
|  |  | Ultem 1010 |  |  |  |  |  |  |  |
|  | Latent hardener (G) | 4,4'-Diaminodiphenyl sulfone | 45 | 45 | 45 | 45 | 45 | 45 | 45 |
|  |  | 3,3'-Diaminodiphenyl sulfone |  |  |  |  |  |  |  |
|  | Thermoplastic Resin Particles | Toraypearl TN | 20 | 20 | 20 | 20 | 20 | 20 | 20 |
|  |  | Orgasol 1002D |  |  |  |  |  |  |  |
| Evaluation items | Sizing agent-coated carbon fibers | Epoxy equivalent of sizing agent (g/eq.) | 430 | 320 | 370 | 350 | 270 | 260 | 900 |
|  |  | X-ray photoelectron spectrum of sizing agent surface (a)/(b) | 0.91 | 0.93 | 0.91 | 0.49 | 0.29 | 0.26 | 1.01 |
|  |  | ΔTg with curing agent | 15 | 17 | 18 | 27 | 32 | 27 | 10 |
|  |  | Interfacial adhesion: IFSS (MPa) | 34 | 34 | 36 | 45 | 46 | 41 | 25 |
|  | Physical properties of cured resin | Bending elastic modulus of resin (GPa) | 3.7 | 3.7 | 3.7 | 3.7 | 3.7 | 3.7 | 3.7 |
|  |  | Resin K1c (MPa·m$^{1/2}$) | 0.86 | 0.86 | 0.86 | 0.86 | 0.86 | 0.86 | 0.86 |
|  | Carbon fiber reinforced composite material | 0° Tensile test (0 day) (MPa) | 925 | 925 | 930 | 1015 | 1021 | 1001 | 900 |
|  |  | 0° Tensile test (20 days) (MPa) | 921 | 924 | 922 | 894 | 895 | 890 | 898 |
|  |  | Microcrack resistance | 4 GOOD | 3 GOOD | 4 GOOD | 4 GOOD | 4 GOOD | 4 GOOD | 4 GOOD |

Example 38

In 50 ml of acetone, 2 g of the sizing agent-coated carbon fibers obtained in Example 1 were collected, and immersed and subjected to ultrasonic cleaning for 30 minutes three times. Next, the carbon fibers were immersed in 50 ml of methanol, then subjected to ultrasonic cleaning for 30 minutes once, and dried. The adhesion amount of sizing agent remaining after the cleaning was determined. The results are as shown in Table 6.

Subsequently, the surface of the sizing agent on the sizing agent-coated carbon fibers before cleaning and the surface of the sizing agent on the sizing agent-coated carbon fibers obtained after the cleaning were analyzed by X-ray photoelectron spectroscopy at 400 eV. The height (b) of the peak at a binding energy of 286.1 eV assigned to a C—O component and the height (a) (cps) of the component at a binding energy of 284.6 eV assigned to CHx, C—C, and C=C were determined. The ratio (I) of (a)/(b) of the surface of the sizing agent on the sizing agent-coated carbon fibers before cleaning and the ratio (II) of (a)/(b) of the surface of the sizing agent on the sizing agent-coated carbon fibers after cleaning were calculated. (I) and (II)/(I) were as shown in Table 6.

Examples 39 to 42

In the same manner as in Example 38, the sizing agent-coated carbon fibers obtained in Example 2, Example 6, Example 10, and Example 13 were used, and X-ray photoelectron spectroscopic analysis was carried out by using an X ray at 400 eV before and after the cleaning. The (a)/(b) ratio was calculated where (a) is the height (cps) of a component at a binding energy (284.6 eV) assigned to CHx, C—C, and C=C and (b) is the height (cps) of a component at a binding energy (286.1 eV) assigned to C—O in the $C_{1s}$ core spectrum. Table 6 shows the results.

Comparative Example 8

In the same manner as in Example 38, the sizing agent-coated carbon fibers obtained in Comparative Example 5 were used, and X-ray photoelectron spectroscopic analysis was carried out by using an X ray at 400 eV before and after the cleaning. The (a)/(b) ratio was calculated where (a) is the height (cps) of a component at a binding energy (284.6 eV) assigned to CHx, C—C, and C=C and (b) is the height (cps) of a component at a binding energy (286.1 eV) assigned to C—O in the $C_{1s}$ core spectrum. Table 6 shows the results, which indicates a large (II/I) ratio. This revealed that no inclined structure was achieved in the sizing agent.

Comparative Example 9

In the same manner as in Example 38, the sizing agent-coated carbon fibers obtained in Comparative Example 7 were used, and X-ray photoelectron spectroscopic analysis was carried out by using an X ray at 400 eV before and after the cleaning. The (a)/(b) ratio was calculated where (a) is the height (cps) of a component at a binding energy (284.6 eV) assigned to CHx, C—C, and C=C and (b) is the height (cps) of a component at a binding energy (286.1 eV) assigned to C—O in the $C_{1s}$ core spectrum. Table 6 shows the results, which indicates a large (II/I) ratio. This revealed that no inclined structure was achieved in the sizing agent.

TABLE 6

|  |  | Example 38 | Example 39 | Example 40 | Example 41 | Example 42 | Comparative Example 8 | Comparative Example 9 |
|---|---|---|---|---|---|---|---|---|
| Sizing agent-coated carbon fibers | | Example 1 | Example 2 | Example 6 | Example 10 | Example 13 | Comparative Example 5 | Comparative Example 7 |
| Adhesion amount of sizing agent after the sizing agent was cleaned | | 0.18 | 0.18 | 0.18 | 0.18 | 0.18 | 0.18 | 0.12 |
| XPS (400 eV) | (I) | 0.67 | 0.67 | 0.57 | 0.8 | 0.58 | 0.29 | 1.01 |
| | (II)/(I) | 0.7 | 0.7 | 0.8 | 0.74 | 0.74 | 1 | 1 |

INDUSTRIAL APPLICABILITY

The prepreg of the present invention has excellent adhesion between the carbon fibers and the matrix resin, microcrack resistance, and also has high long-term storage stability and thus are suitably used in various fields including aircraft members, spacecraft members, automobile members, ship members, constructional materials, and sporting goods.

REFERENCE SIGNS LIST

1 Longitudinal carbon fiber bundle
2 Transverse carbon fiber bundle
3 Longitudinal metallic wire
4 Transverse metallic wire
5 Mesh formed of metallic wires

The invention claimed is:

1. A prepreg comprising:
   sizing agent-coated carbon fibers coated with a sizing agent; and
   a thermosetting resin composition impregnated into the sizing agent-coated carbon fibers, wherein
   the sizing agent includes an aliphatic epoxy compound (A) and an aromatic compound (B) at least containing an aromatic epoxy compound (B1),
   the sizing agent-coated carbon fibers have an (a)/(b) ratio of 0.50 to 0.90 where (a) is a height (cps) of a component at a binding energy (284.6 eV) assigned to CHx, C—C, and C=C and (b) is a height (cps) of a component at a binding energy (286.1 eV) assigned to C—O in a $C_{1s}$ core spectrum of a surface of the sizing agent applied onto the carbon fibers analyzed by X-ray photoelectron spectroscopy using $AlK\alpha_{1,2}$ as an X-ray source at a photoelectron takeoff angle of 15°,
   the sizing agent-coated carbon fibers are in a shape of woven fabric or braid,
   the thermosetting resin composition at least includes the following components:
   (D): a thermosetting resin;
   (F): a thermoplastic resin soluble to the thermosetting resin (D); and
   (G): a latent hardener.

2. The prepreg according to claim 1, wherein the thermosetting resin composition further includes the following component:
   (E): core-shell rubber particles that include particulate core parts and in which at least part of a surface of each of the core parts is covered with a shell.

3. The prepreg according to claim 2, wherein such shells of the core-shell rubber particles (E) are formed of a resin having a functional group that is capable of reacting with the latent hardener (G) or a functional group that is capable of reacting with the thermosetting resin (D).

4. The prepreg according to claim 1, wherein the thermosetting resin composition further includes the following component:
   (H): at least one block copolymer selected from the group consisting of S-B-M, B-M, and M-B-M (where the blocks represented by S, B, and M are linked through covalent bond or linked through covalent bonds with an intermediate molecule having any chemical structure interposed therebetween, the block M is a homopolymer of methyl methacrylate or a copolymer containing methyl methacrylate in an amount of at least 50% by mass, the block B is incompatible with the block M and has a glass transition temperature of 20° C. or lower, and the block S is incompatible with the blocks B and M and has a glass transition temperature higher than that of the block B).

5. The prepreg according to claim 1, wherein a mesh or a nonwoven fabric formed of metallic wires is arranged on one side or both sides of a woven fabric or a braid formed of the sizing agent-coated carbon fibers.

6. The prepreg according to claim 5, wherein the woven fabric or the braid formed of the sizing agent-coated carbon fibers is a woven fabric or a braid formed of sizing agent-coated carbon fibers of two or more axes.

7. The prepreg according to claim 1, wherein the woven fabric or the braid formed of the sizing agent-coated carbon fibers is woven by arranging metallic wires on side faces of carbon fiber bundles in a longitudinal direction and a transverse direction and interlacing the carbon fiber bundles and/or the metallic wires and carbon fiber bundles and/or metallic wires arranged in a different direction.

8. The prepreg according to claim 1, wherein the thermoplastic resin (F) is polyethersulfone.

9. The prepreg according to claim 1, wherein K1c of a thermosetting resin cured product obtained by curing the thermosetting resin composition is 0.65 to 1.5 MPa·m$^{1/2}$.

10. The prepreg according to claim 1, wherein an epoxy equivalent of the applied sizing agent is 350 to 550 g/eq.

11. The prepreg according to claim 1, wherein the sizing agent at least contains the aliphatic epoxy compound (A) in an amount of 35 to 65% by mass and the aromatic compound (B) in an amount of 35 to 60% by mass relative to a total amount of the sizing agent except a solvent.

12. The prepreg according to claim 1, wherein a mass ratio of the aliphatic epoxy compound (A) and the aromatic epoxy compound (B1) is 52/48 to 80/20.

13. The prepreg according to claim 1, wherein the aliphatic epoxy compound (A) is a polyether polyepoxy compound having two or more epoxy groups in a molecule and/or a polyol polyepoxy compound having two or more epoxy groups in a molecule.

14. The prepreg according to claim 13, wherein the aliphatic epoxy compound (A) is a glycidyl ether epoxy compound obtained by a reaction of epichlorohydrin with a compound selected from ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, glycerol, diglycerol, polyglycerol, trimethylolpropane, pentaerythritol, sorbitol, and arabitol.

15. The prepreg according to claim 1, wherein the aromatic epoxy compound (B1) is a bisphenol A epoxy compound or a bisphenol F epoxy compound.

16. The prepreg according to claim 1, wherein the sizing agent contains an ester compound (C) having no epoxy group in a molecule in an amount of 2 to 35% by mass relative to the total amount of the sizing agent except the solvent.

17. The prepreg according to claim 1, wherein relation (III) is satisfied with (I) and (II) obtained from a ratio (a)/(b):

$$0.50 \leq (I) \leq 0.90 \text{ and } 0.60 < (II)/(I) < 1.0 \quad \text{(III)}$$

where (I) is a value of (a)/(b) of surfaces of the sizing agent-coated carbon fibers before ultrasonication, (II) is the value of (a)/(b) of the surfaces of the sizing agent-coated carbon fibers where an adhesion amount of the sizing agent is reduced to 0.09 to 0.20% by mass by ultrasonic cleaning of the sizing agent-coated carbon fibers in an acetone solvent, and in a $C_{1s}$ core spectrum of the sizing agent-coated carbon fibers analyzed by X-ray photoelectron spectroscopy using an X-ray at 400 eV at a photoelectron takeoff angle of 55°, (a) is a height (cps) of a component at a binding energy (284.6 eV) assigned to CHx, C—C, and C=C, and (b) is a height (cps) of a component at a binding energy (286.1 eV) assigned to C—O.

18. The prepreg according to claim 1, wherein the sizing agent is a mixture of a water emulsion liquid containing at least the aromatic epoxy compound (B1) and a composition containing at least the aliphatic epoxy compound (A).

19. The prepreg according to claim 1, wherein the sizing agent and the latent hardener (G) are used in a combination that gives an increase in glass transition point of 25° C. or lower when the sizing agent and the latent hardener (G) are stored in an atmosphere of 25° C. and 60% RH for 20 days after being mixed at an amine equivalent/epoxy equivalent rate of 0.9.

20. A carbon fiber reinforced composite material formed by molding a prepreg comprising:
    sizing agent-coated carbon fibers coated with a sizing agent; and
    a thermosetting resin composition impregnated into the sizing agent-coated carbon fibers, wherein
    the sizing agent includes an aliphatic epoxy compound (A) and an aromatic compound (B) at least containing an aromatic epoxy compound (B1),
    the sizing agent-coated carbon fibers have an (a)/(b) ratio of 0.50 to 0.90 where (a) is a height (cps) of a component at a binding energy (284.6 eV) assigned to CHx, C—C, and C=C and (b) is a height (cps) of a component at a binding energy (286.1 eV) assigned to C—O in a $C_{1s}$ core spectrum of a surface of the sizing agent applied onto the carbon fibers analyzed by X-ray photoelectron spectroscopy using AlK$\alpha_{1,2}$ as an X-ray source at a photoelectron takeoff angle of 15°,
    the sizing agent-coated carbon fibers are in a shape of woven fabric or braid,
    the thermosetting resin composition at least includes the following components:
    (D): a thermosetting resin;
    (F): a thermoplastic resin soluble to the thermosetting resin (D); and
    (G): a latent hardener.

* * * * *